US012665658B2

(12) United States Patent
Kusashima et al.

(10) Patent No.: US 12,665,658 B2
(45) Date of Patent: Jun. 23, 2026

(54) COMMUNICATION DEVICE, COMMUNICATION METHOD, BASE STATION, AND METHOD PERFORMED BY BASE STATION

(71) Applicant: SONY GROUP CORPORATION, Tokyo (JP)

(72) Inventors: Naoki Kusashima, Tokyo (JP); Hiromasa Uchiyama, Tokyo (JP); Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 419 days.

(21) Appl. No.: 18/253,232

(22) PCT Filed: Nov. 16, 2021

(86) PCT No.: PCT/JP2021/041989
§ 371 (c)(1),
(2) Date: May 17, 2023

(87) PCT Pub. No.: WO2022/113089
PCT Pub. Date: Jun. 2, 2022

(65) Prior Publication Data
US 2024/0022315 A1      Jan. 18, 2024

(30) Foreign Application Priority Data

Nov. 27, 2020      (JP) ................................. 2020-197097

(51) Int. Cl.
*H04B 7/155*      (2006.01)
*H04W 16/26*      (2009.01)
(Continued)

(52) U.S. Cl.
CPC ........ *H04B 7/15528* (2013.01); *H04W 16/26* (2013.01); *H04W 16/28* (2013.01); *H04W 72/0453* (2013.01)

(58) Field of Classification Search
CPC ........... H04B 7/15528; H04B 7/06952; H04W 16/26; H04W 16/28; H04W 72/0453; H04W 84/047; H04L 5/0023
See application file for complete search history.

(56) References Cited

U.S. PATENT DOCUMENTS

2020/0366363 A1*   11/2020   Li ......................... H04L 5/0094
2021/0127368 A1*    4/2021   Abedini ............. H04B 7/15528
(Continued)

FOREIGN PATENT DOCUMENTS

JP      2012-521120 A      9/2012

OTHER PUBLICATIONS

International Search Report and Written Opinion of PCT Application No. PCT/JP2021/041989, issued on Feb. 22, 2022, 08 pages of ISRWO.

(Continued)

*Primary Examiner* — Yu-Wen Chang
(74) *Attorney, Agent, or Firm* — CHIP LAW GROUP

(57) ABSTRACT
A communication device includes a reception unit that receives, from the base station, a physical control signal used to control a physical layer of the communication device, the physical control signal including beam information about a beam used for communication between the communication device and the terminal device; and a communication control unit that controls a beam used for communication between the communication device and the terminal device based on the beam information.

17 Claims, 27 Drawing Sheets

(51) Int. Cl.
    *H04W 16/28*       (2009.01)
    *H04W 72/0453*    (2023.01)

(56)                References Cited

U.S. PATENT DOCUMENTS

2022/0086820 A1*   3/2022  Dallal .................. H04W 16/28
2022/0393756 A1* 12/2022  Matsumura ........ H04B 7/15514
2022/0400478 A1* 12/2022  Du ......................... H04B 7/026
2023/0209510 A1*  6/2023  Iwabuchi ............. H04L 5/0044
                                         370/329
2023/0262482 A1*  8/2023  Liu ................... H04B 7/06952
                                         370/329
2023/0318695 A1* 10/2023  Tsai ..................... H04L 5/0051
                                         370/315

OTHER PUBLICATIONS

"NR Repeaters Motivation AI: 9.1.2", Qualcomm, 3GPP TSG RAN, 89th Meeting, RP-201831, Sep. 14-18, 2020, 11 pages.

* cited by examiner

| RRC |
|:---:|
| PDCP |
| RLC |
| MAC |
| PHY |
| RF | gNB
(donner)

| RRC |
|:---:|
| PDCP |
| RLC |
| MAC |
| PHY |
| RF |

Smart
Repeater

FIG.26

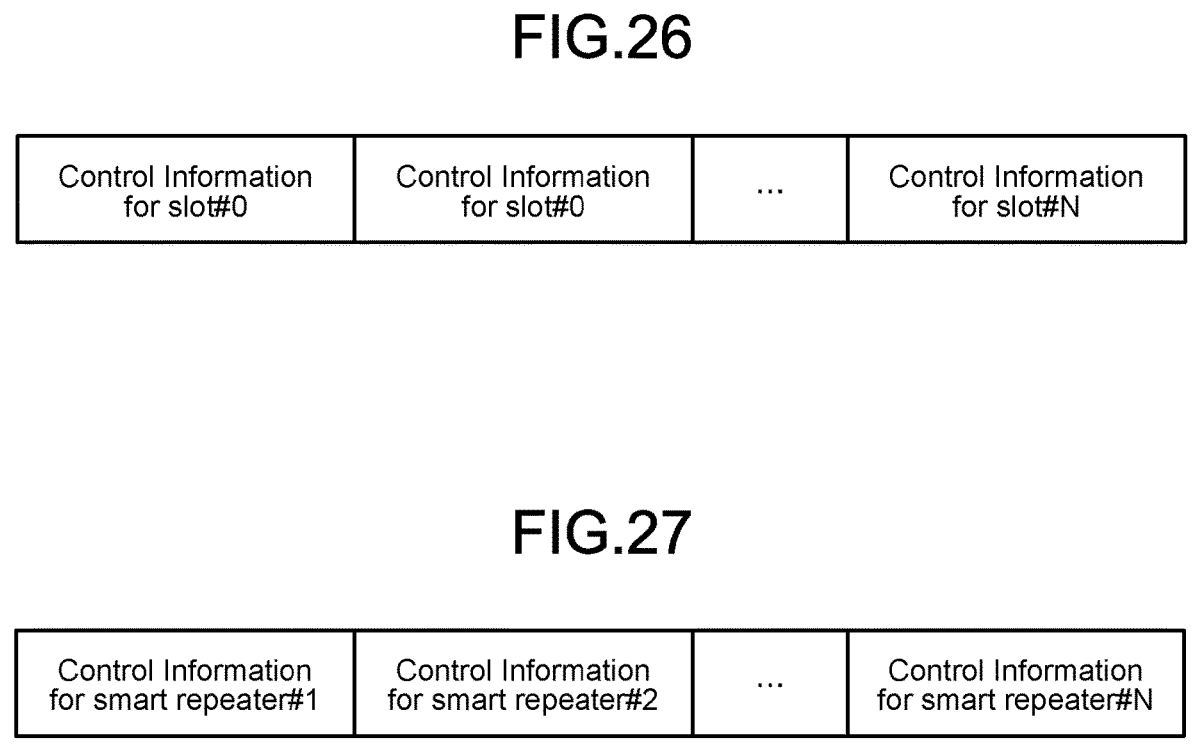

| Control Information for slot#0 | Control Information for slot#0 | ... | Control Information for slot#N |
|---|---|---|---|

FIG.27

| Control Information for smart repeater#1 | Control Information for smart repeater#2 | ... | Control Information for smart repeater#N |
|---|---|---|---|

FIG.32

COMMUNICATION DEVICE, COMMUNICATION METHOD, BASE STATION, AND METHOD PERFORMED BY BASE STATION

CROSS REFERENCE TO RELATED APPLICATIONS

This application is a U.S. National Phase of International Patent Application No. PCT/JP2021/041989 filed on Nov. 16, 2021, which claims priority benefit of Japanese Patent Application No. JP 2020-197097 filed in the Japan Patent Office on Nov. 27, 2020. Each of the above-referenced applications is hereby incorporated herein by reference in its entirety.

FIELD

The present disclosure relates to a communication device, a communication method, a base station, and a method performed by a base station.

BACKGROUND

There is an increasing demand for coverage enhancement for efficient wireless communication operation. In order to satisfy the demand for the coverage enhancement, introduction of a relay technology has been expected in recent years. As representative relay technologies, an Integrated Access and Backhaul link (IAB) and an RF Repeater are known. The IAB is classified as layer 3 relay (or regenerative relays). However, in the layer 3 relay, a relay node needs to decode all packets up to layer 3, and re-encode the packets for transmission to a destination. To implement such a complicated function (e.g., a function equivalent to that of a base station), cost is required. Meanwhile, the above-described RF Repeater is also referred to as layer 1 relay. The RF Repeater includes only an Analog-to-Digital Converter (ADC)/Digital-to-Analog Converter (DAC) and a power amplifier circuit, having a simple device function, the inexpensive layer 1 relay having a small delay in relay processing. Meanwhile, the layer 1 relay has minimal device functions, and fine resource control cannot be performed. Therefore, Non Patent Literature 1 discloses Smart Repeater. In fronthaul, between Smart Repeater and a base station, communication of control information can be performed. Therefore, it is alleged that substantial performance advantages can be obtained for the RF Repeater.

CITATION LIST

Non Patent Literature

Non Patent Literature 1: RP-201831 "Motivation paper for NR Repeaters," QUALCOMM Europe Inc.—Spain, RAN plenary #89e, September 2020.

SUMMARY

Technical Problem

However, Non Patent Literature 1 does not disclose details such as the contents and procedures of the control information in the fronthaul between the base station and the Smart Repeater. Therefore, there is a possibility that the performance advantages could not be sufficiently obtained for the RF Repeater.

Therefore, the present disclosure proposes a communication device, a communication method, a base station, and a method performed by a base station that are configured to contribute to the performance advantages in communication relay between the base station and a terminal device.

Note that the above problem or object is merely one of a plurality of problems or objects that can be solved or achieved by a plurality of embodiments disclosed herein.

Solution to Problem

In order to solve the above problem, a communication device according to one aspect of the present disclosure is the communication device that relays communication between a base station and a terminal device, the communication device includes: a reception unit that receives, from the base station, a physical control signal used to control a physical layer of the communication device, the physical control signal including beam information about a beam used for communication between the communication device and the terminal device; and a communication control unit that controls a beam used for communication between the communication device and the terminal device based on the beam information.

BRIEF DESCRIPTION OF DRAWINGS

FIG. 11 is a diagram illustrating another example of a control plane protocol stack between a base station and a smart repeater.

FIG. 26 is a diagram illustrating an exemplary configuration of beam setting information according to terminal device-specific DCI.

FIG. 27 is a diagram illustrating an exemplary configuration of beam setting information according to terminal device group common DCI.

FIG. 32 is a diagram illustrating how an application duration where beam setting is applied is specified on the basis of DCI transmission timing.

DESCRIPTION OF EMBODIMENTS

Figure 1:
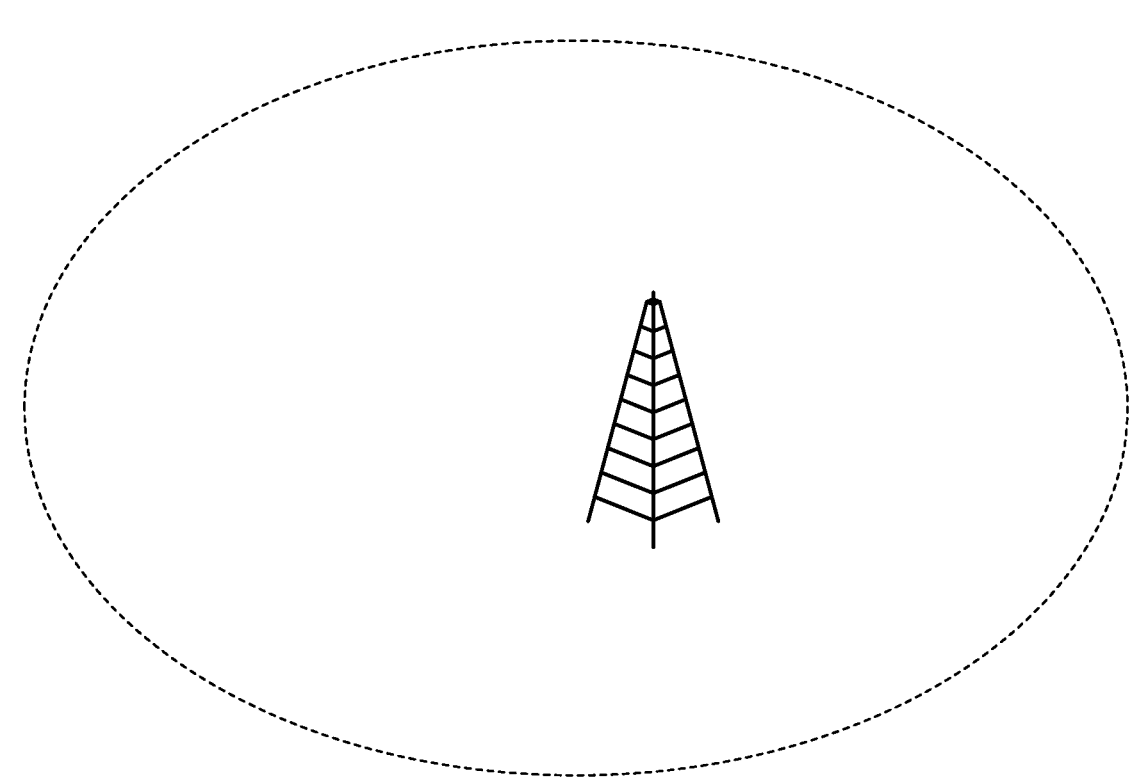
FIG. 1 is a diagram illustrating an example of a single-beam operation method.

Embodiments of the present disclosure will be described in detail below with reference to the drawings. Note that in the following embodiments, the same portions are denoted by the same reference numerals or symbols, and a repetitive description thereof will be omitted.

Furthermore, in the present description and the drawings, a plurality of component elements having substantially the same functional configurations will be distinguished by giving the same reference numerals or symbols followed by different numerals in some cases. For example, a plurality of configurations having substantially the same functional configurations is distinguished as necessary, such as terminal devices $40_1$, $40_2$, and $40_3$. However, in a case where there is no need to particularly distinguish the plurality of component elements having substantially the same functional configuration, the component elements are denoted by only the same reference numerals or symbols. For example, when it is not necessary to particularly distinguish the terminal devices $40_1$, $40_2$, and $40_3$ from each other, the terminal devices are simply referred to as terminal devices 40.

One or more embodiments (including examples and modifications) which are described below can be implemented independently. Meanwhile, in the embodiments described below, at least some of the embodiments may be appropriately combined with at least some of the other embodiments. These embodiments can include novel features different from each other. Therefore, the embodiments can contribute to solving different objects or problems, and can have different effects.

1. Underlying Technology Appearing in Present Embodiment

Radio Access Technologies (RATS) such as Long Term Evolution (LTE) and New Radio (NR) are standardized in 3rd Generation Partnership Project (3GPP). Each of LTE and NR is a type of cellular communication technology and a plurality of areas covered by base stations, arranged in the form of cells, enables mobile communication of a terminal device. Note that a single base station may manage a plurality of cells.

Note that in the following description, "LTE" includes LTE-Advanced (LTE-A), LTE-Advanced Pro (LTE-A Pro), and Evolved Universal Terrestrial Radio Access (EUTRA). In addition, NR includes New Radio Access Technology (NKAT) and Further EUTRA (FEUTRA). Note that a single base station may manage a plurality of cells. In the following description, a cell corresponding to LTE is referred to as an LTE cell, and a cell corresponding to NR is called an NR cell.

NR is a next generation (fifth generation) Radio Access Technology (RAT) that follows LTE. The NR is a Radio Access Technology that is configured to support various use cases including Enhanced Mobile Broadband (eMBB), Massive Machine Type Communications (mMTC), and Ultra-Reliable and Low Latency Communications (URLLC). The NR has been studied for a technical framework that addresses usage scenarios, requirement conditions, and deployment scenarios in these use cases.

There is an increasing demand for coverage enhancement for efficient wireless communication operation. In order to satisfy the demand for the coverage enhancement, introduction of a relay technology has been expected in recent years. However, merely introducing the relay technology does not necessarily achieve efficient wireless communication operation, from a comprehensive viewpoint including an Operating Expense (OPEX). In the present embodiment, a communication device that enables efficient wireless communication operation will be described.

For ease of understanding the present embodiment, an underlying technology appearing in the present embodiment will be described below, before a detailed description of the present embodiment.

<1-1. Beamforming>

First, beamforming in NR will be described.

(1) Beam Operation Method in NR in Present Embodiment

In NR, two types of methods, that is, a single-beam operation method and a multi-beam operation method, are assumed.

FIG. 1 is a diagram illustrating an example of a single-beam operation method. The single-beam operation method is a method in which predetermined cell coverage is operated using a single beam (e.g., omnidirectional beam). In the single-beam operation method, within the predetermined cell coverage, a cell-specific physical channel or physical signal is transmitted using the single beam. Here, LTE can be considered as the single-beam operation method.

Figure 2:
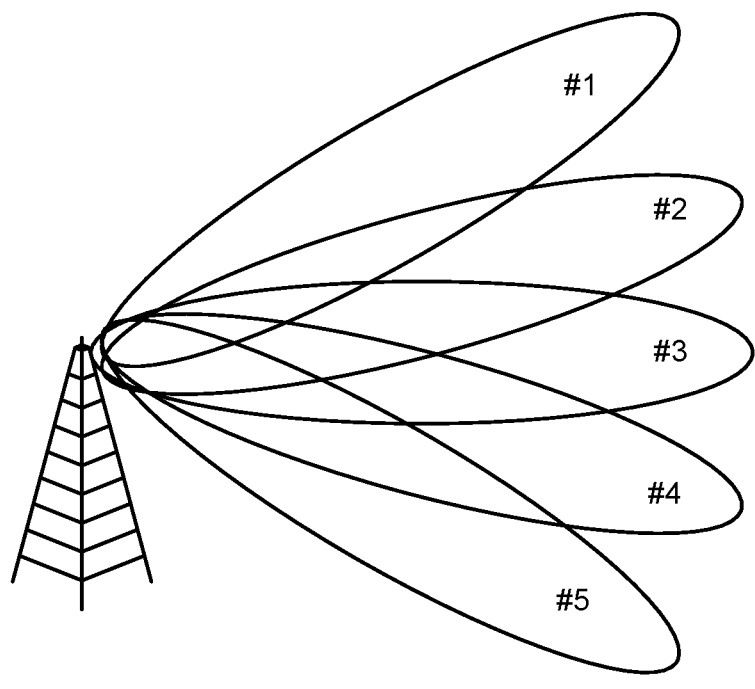
FIG. 2 is a diagram illustrating an example of a multi-beam operation method.

FIG. 2 is a diagram illustrating an example of a multi-beam operation method. The multi-beam operation method is a method in which predetermined cell coverage is operated using one or more beams (e.g., directional beam). In the multi-beam operation method, within the predetermined cell coverage, a cell-specific physical channel or physical signal is transmitted using the multi-beams. For example, in analog beamforming or hybrid beamforming, a communication device (e.g., base station) transmits a beam in a predetermined direction but it is difficult for it to transmit a beam in a direction other than the predetermined direction, in a predetermined time instance. Therefore, switching of time instances switches beams in a plurality of directions, making it possible for the communication device to cover a wide area. In other words, a predetermined beam with which the cell-specific physical channel or physical signal is transmitted is transmitted in one time instance (time resource). In different time instances, different beams can be transmitted. In this way, in the multi-beam operation method, the beams are switched depending on the time instance. Switching of the beams depending on the time instance is referred to as a beam sweep. Note that the multi-beam operation method may be performed even in a digital antenna configuration.

Note that the beam can be also referred to as a channel, a path, an antenna, an antenna port, or the like. In other words, transmission using different beams can be also referred to as transmission using different channels, paths, antennas, or antenna ports. Furthermore, the beam can also be assumed as a virtual cell. The terminal device can recognize different beams transmitted from the same cell as different virtual cells or virtual carriers.

(2) Appropriate Beam Selection in NR in Present Embodiment

In NR, a system preferably selects an appropriate beam for each of a downlink and an uplink. Specifically, an appropriate beam is preferably selected for each of a downlink transmission beam for the base station and a downlink reception beam for the terminal device. In addition, an appropriate beam is preferably selected for each of an uplink transmission beam for the terminal device and an uplink reception beam for the base station.

The appropriate downlink transmission beam for the base station can be obtained on the basis of report or feedback information from the terminal device that receives the downlink transmission beam. An example of a process of obtaining the appropriate downlink transmission beam is shown below. The base station transmits a predetermined known signal a plurality of times by using different downlink transmission beams. The terminal device determines the appropriate downlink transmission beam from among the known signals transmitted the plurality of times, on the basis of the reception strength, reception quality, and the like thereof, and reports or feeds back information corresponding to the appropriate downlink transmission beam to the base station. Therefore, the base station can recognize the appropriate downlink transmission beam. Here, the known signal includes a Synchronization Signal (SS)/Physical Broadcast Channel (PBCH) block (also referred to as Synchronization Signal Block (SSB)), a Channel State Information-Reference Signal (CSI-RS), a Physical Downlink Control Channel (PDCCH) Demodulation Reference Signal (DMRS), a Physical Downlink Shared Channel (PDSCH) DMRS, or a Phase Tracking Reference Signal (PTRS), or a combination of at least two thereof.

Alternatively, the appropriate downlink transmission beam for the base station can be obtained on the basis of the appropriate uplink reception beam for the base station.

The appropriate uplink transmission beam for the terminal device may be obtained on the basis of report or feedback information from the base station that receives the uplink transmission beam. An example of a process of obtaining the appropriate uplink transmission beam is shown below. The terminal device transmits a predetermined known signal a plurality of times by using different uplink transmission beams. The base station determines the appropriate uplink transmission beam from among the known signals transmitted the plurality of times, on the basis of the reception strength, reception quality, and the like thereof, and reports or give notification about information corresponding to the appropriate uplink transmission beam to the terminal device. Therefore, the terminal device can recognize the appropriate uplink transmission beam. Here, the known signal includes a Random Access Channel (RACH) preamble, a Sounding Reference Signal (SRS), a Physical Uplink Control Channel (PUCCH) DMRS, a Physical Uplink Shared Channel (PUSCH) DMRS, or the like.

Alternatively, the proper uplink transmission beam for the terminal device can be obtained on the basis of the proper downlink reception beam for the terminal device.

(3) QCL in NR

In NR, a Quasi-Co-Location (QCL) that represents a channel characteristic is defined. For example, if it can be assumed that channel characteristics of two different signals (physical channels, physical signals, and antenna ports) are the same, the two signals are QCL. The channel characteristics represented by the QCL include a Doppler shift, a Doppler spread, an average delay, a delay spread, a spatial Rx parameter, and the like.

The QCL between the antenna ports is defined in a Transmission Configuration Indicator (TCI) state. The TCI state includes a parameter that sets a QCL relationship between a downlink reference signal and a PDSCH DMRS port, a QCL relationship between the downlink reference signal and a PDCCH DMRS port, or a QCL relationship between the downlink reference signal and a CSI-RS port in a Non-Zero-Power (NZP) CSI-RS resource. The TCI state is defined between the following types (1) to (4).

(1) QCL-TypeA: {Doppler shift, Doppler spread, average delay, and delay spread}

(2) QCL-TypeB: {Doppler shift and Doppler spread}

(3) QCL-TypeC: {Doppler spread and average delay}

(4) QCL-TypeD: {spatial Rx (Receiver, Reception) parameter}

In the terminal device, the TCI state is indicated by Downlink Control Information (DCI), Medium Access Control Control Element (MAC CE), or Radio Resource Control (RRC) signaling. Specifically, the terminal device receives information about activation/deactivation of the TCI state of a terminal device-specific PDSCH by using the MAC CE. The terminal device receives a TCI state indication for terminal device-specific PDCCH by using the MAC CE. The terminal device receives the TCI state indication for the PDSCH by using the DCI.

(4) Details of Downlink Transmission Beam in NR

In NR, a downlink transmission beam is defined by a predetermined signal index and the Quasi-Co-Location (QCL). The predetermined signal includes an SS/PBCH block. For example, a plurality of the SS/PBCH blocks having the same information but having different indexes can be transmitted. The SS/PBCH blocks having different indexes may be transmitted by different transmission beams. The TCI state between an SS/PBCH block having a predetermined index and another reference signal or physical channel DMRS determines a relationship in beam between the other reference signal and the physical channel.

An example of the predetermined signal includes NZP CSI-RS. A plurality of the NZP CSI-RS resources are set. The CSI-RS ports in different CSI-RS resources may be transmitted by different transmission beams. The TCI state between the CSI-RS port in the CSI-RS resource and another reference signal or physical channel DMRS determines a relationship in beam between the other reference signal and the physical channel beam.

<1-2. Relay>

In NR, introduction of the relay technology is expected due to the increasing demand for coverage enhancement. A layer 1 relay (e.g., RF Repeater) and a layer 3 relay will be briefly described below as the relay technology.

(1) Conventional Layer 1 Relay (e.g., RF Repeater)

Figure 3:
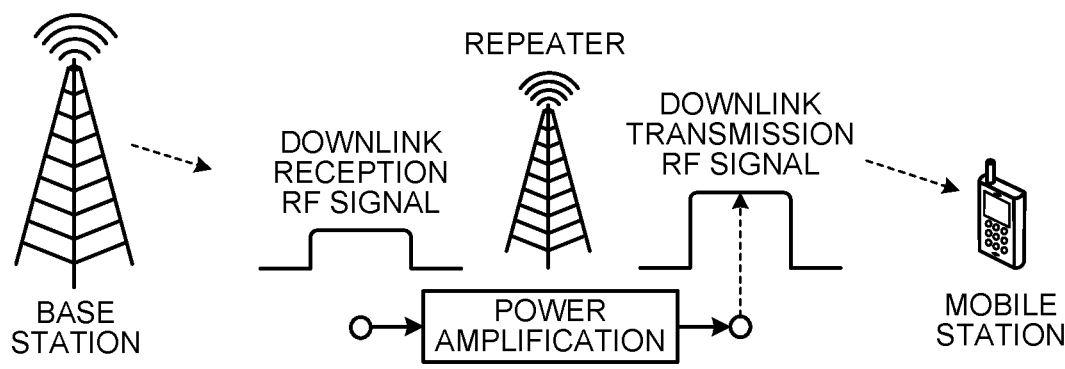
FIG. 3 is a diagram illustrating an overview of a layer 1 relay.
Figure 4:
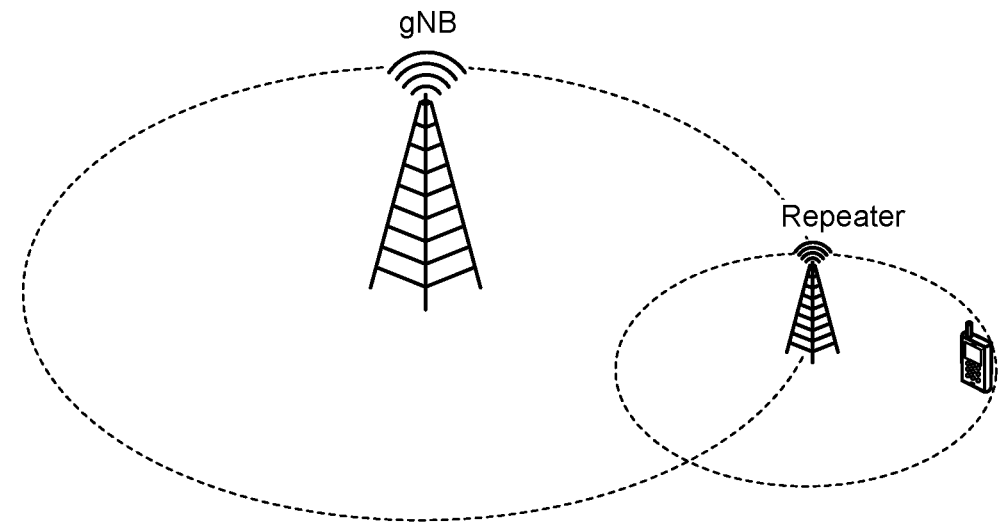
FIG. 4 is a diagram illustrating an overview of a repeater system.

The layer 1 relay is a relay that performs power amplification without decoding a downlink reception Radio Frequency (RF) signal transmitted from a base station and that transmits the downlink reception RF signal to a terminal device. The layer 1 relay is also referred to as AF (Amplifier and Forward). FIG. 3 is a diagram illustrating an overview of the layer 1 relay. In FIG. 3, the layer 1 relay in downlink is illustrated, but the layer 1 relay is also applicable to uplink. In the layer 1 relay in the uplink, as in the layer 1 relay in the downlink, an uplink reception RF signal transmitted from the terminal device is subjected to power amplification and transmitted to the base station. As specific examples of the layer 1 relay, a booster and a repeater (e.g., RF Repeater) are known. FIG. 4 is a diagram illustrating an overview of a repeater system.

A conventional layer 1 relay includes only an Analog-to-Digital Converter (ADC)/Digital-to-Analog Converter (DAC) and a power amplifier circuit, and has a simple device function. Therefore, the layer 1 relay has low cost with a small delay in relay processing. Meanwhile, the layer 1 relay has minimal device functions, and disadvantageously, fine resource control cannot be performed. For example, the layer 1 relay amplifies interference as well, simultaneously, limiting a system efficiency improvement effect.

(2) Layer 3 Relay

Figure 5:
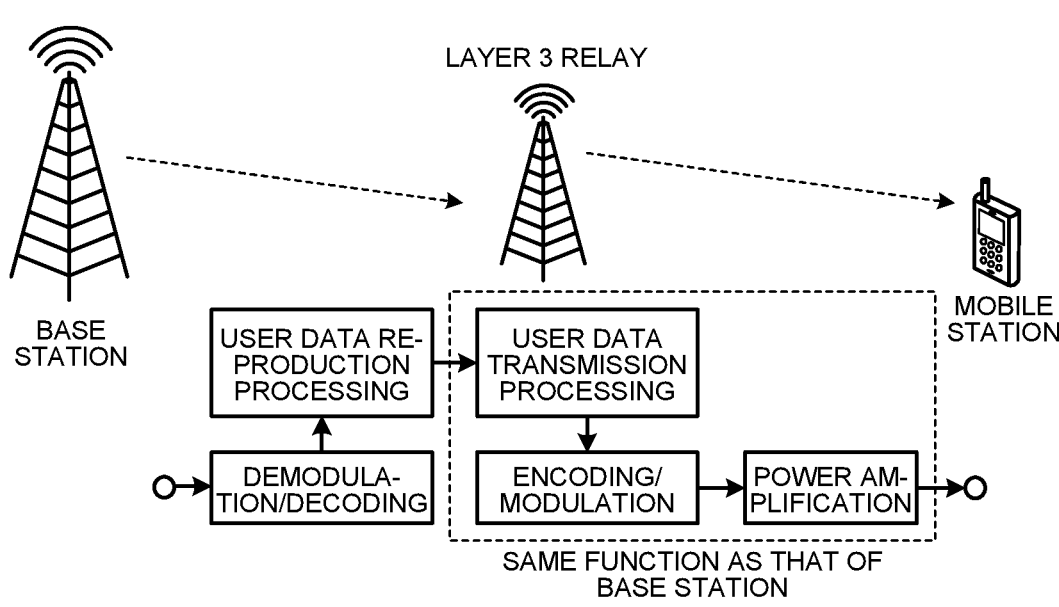
FIG. 5 is a diagram illustrating an overview of a layer 3 relay.
Figure 6:
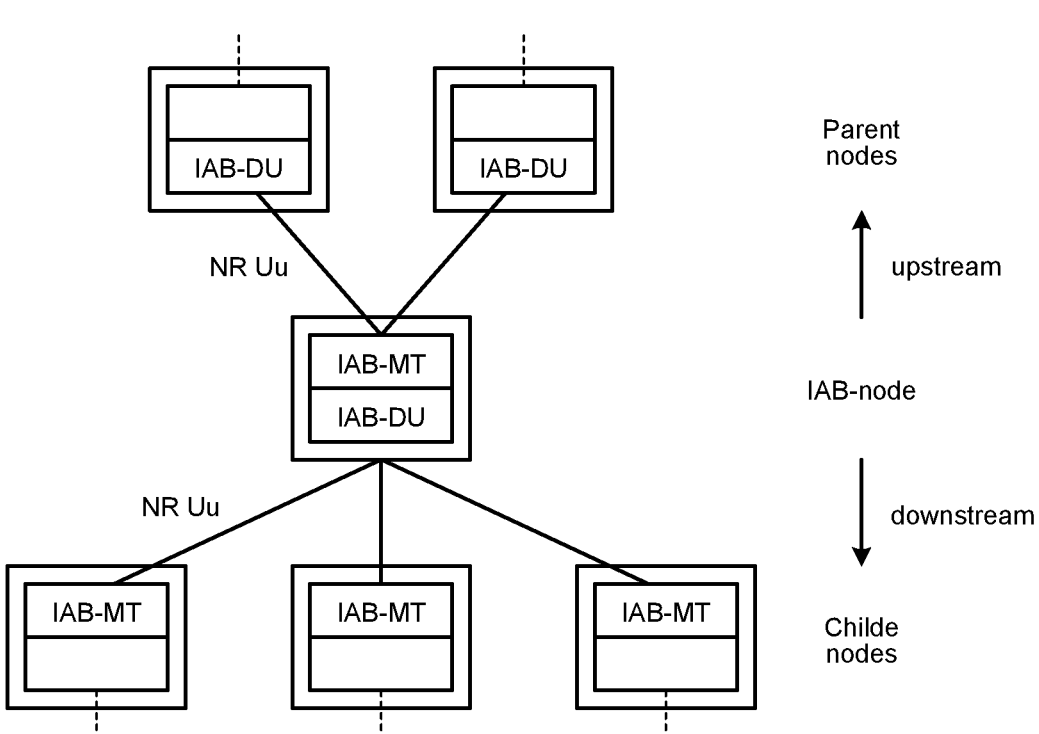
FIG. 6 is a diagram illustrating an overview of IAB.
Figure 7:
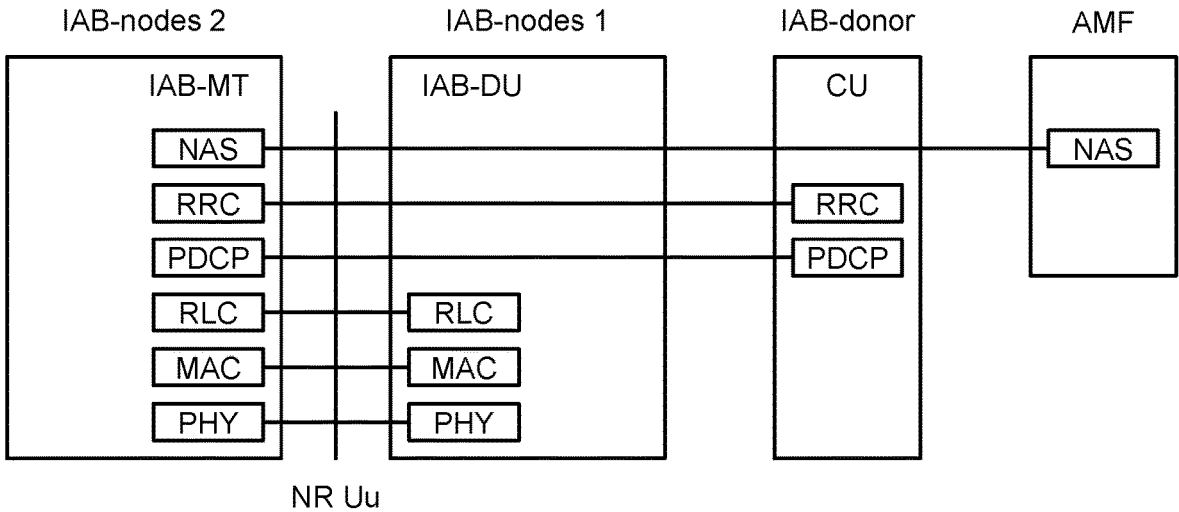
FIG. 7 is a diagram illustrating a protocol stack for RRC and NAS connections in IAB-MT.

Meanwhile, unlike the layer 1 relay, the layer 3 relay decodes (decodes) and re-encodes (encodes) the layers up to the layer 3. FIG. 5 is a diagram illustrating an overview of the layer 3 relay. An Integrated Access and Backhaul link (IAB) is known as one of the layer 3 relays. FIG. 6 is a diagram illustrating an overview of IAB. FIG. 7 is a diagram illustrating a protocol stack for RRC and NAS connections in IAB-Mobile Termination (MT). IAB operates as the IAB-Mobile Termination (MT) for an IAB donor node providing backhaul, and operates as an IAB-Distributed Unit (DU) for a terminal device 40 providing access. The IAB donor node may be, for example, a base station 20, and operates as an IAB-Central Unit (CU). IAB that decodes data to be relayed up to layer 3 is classified as the layer 3 relay. Although the layer 3 relay can perform communication control and the like such as resource management, the layer 3 relay expensively requires implementation of functions equivalent to those of the base station.

<1-3. Smart Repeater>

As described above, the conventional layer 1 relay has the minimal device functions, and fine resource control cannot be performed. On the other hand, the layer 3 relay can perform communication control such as resource management, but the layer 3 relay expensively requires implementation of functions equivalent to those of the base station. Therefore, in recent years, the layer 1 relay (repeater) that is inexpensive and has a beam control function has been studied. The layer 1 relay having the beam control function is also referred to as smart repeater.

(1) Overview of Smart Repeater

The smart repeater is a layer 1 relay that can further perform Physical Layer (PHY layer or Physical Layer) level control, compared with the conventional layer 1 relay (e.g., RF Repeater). Examples of Physical Layer level control include uplink/downlink resource allocation, beamforming control, and the like. The smart repeater performs dynamic Physical Layer level control to reduce interference. Therefore, system efficiency by the layer 1 relay is further improved.

Figure 8:
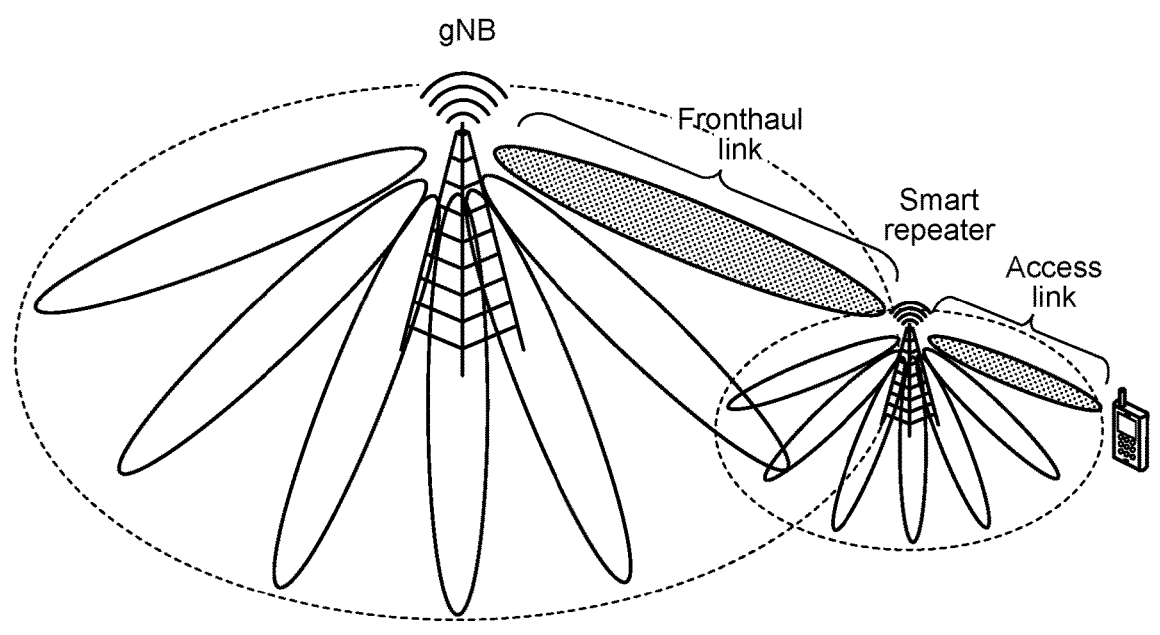
FIG. 8 is a diagram illustrating an overview of a smart repeater system.

FIG. 8 is a diagram illustrating an overview of a smart repeater system. The smart repeater has no resource control unit, requiring control from outside (e.g., base station). In the example of FIG. 8, the smart repeater operates under the control of the base station (gNB). Note that in the following description, for ease of understanding, a link between the base station (e.g., eNB, eNodeB, gNB, or gNodeB) and the smart repeater is distinguished from a Fronthaul link, and a link between the smart repeater and a terminal device is distinguished from an access link. Note that the access link may not be the link between the smart repeater and the terminal device. For example, a link between the terminal device and the base station may be referred to as the access link. In other words, the terminal device may be configured to simply recognize the access link to the base station from the terminal device without recognizing the smart repeater.

(2) Protocol Stack of Smart Repeater

It is assumed that the smart repeater has different protocol stack configurations according to information to be transferred (user plane (U-Plane) or control plane (C-Plane)).

Figure 9:
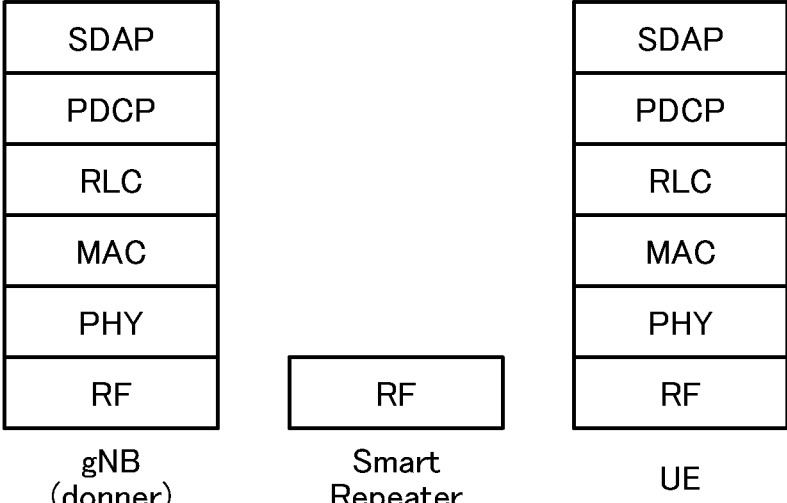
FIG. 9 is a diagram illustrating an example of a user plane protocol stack between a base station and a terminal device via a smart repeater.

FIG. 9 is a diagram illustrating an example of a user plane (U-plane) protocol stack between a base station and a terminal device via a smart repeater. The smart repeater receives, for processing, a downlink physical channel up to a Radio Frequency (RF) layer from the base station, and transfers the physical channel to the terminal device. Similarly, the smart repeater receives, for processing, an uplink physical signal/physical channel up to the RF layer from the terminal device, and transfers the uplink physical signal/physical channel to the base station.

Figure 10:
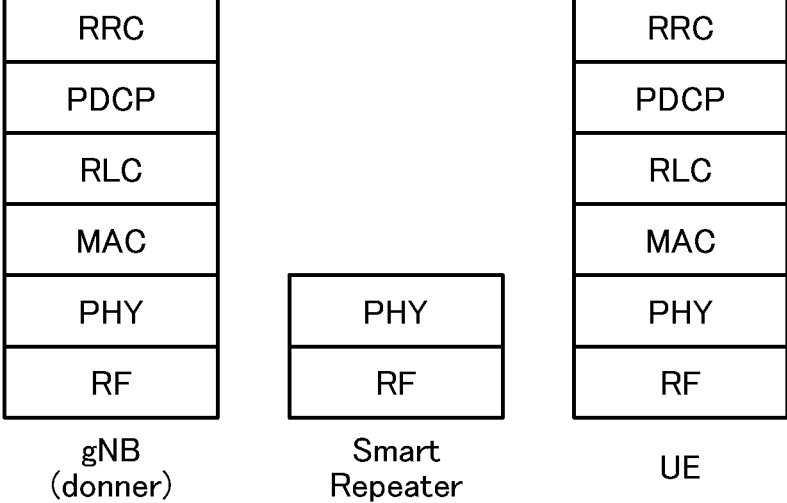
FIG. 10 is a diagram illustrating another example of the user plane protocol stack between a base station and a terminal device via a smart repeater.

FIG. 10 is a diagram illustrating another example of the user plane (C-plane) protocol stack between the base station and the terminal device via the smart repeater. The smart repeater receives the downlink physical channel up to Physical Layer from the base station, and transfers the downlink physical channel to the terminal device. Similarly, the smart repeater receives the uplink physical channel up to Physical Layer from the terminal device, and transfers the uplink physical channel to the base station. In other words, the smart repeater terminates C-Plane information up to the Physical Layer, but does not terminate information of layers (upper layers) (e.g., MAC layer, RLC layer, PDCP layer, SDAP layer, and RRC layer) above the Physical Layer.

At this time, the smart repeater can also rewrite (re-generate) the control information (e.g., beam control information and TDD configuration information) of Physical Layer. For example, the smart repeater may receive the control information (DCI etc.) of Physical Layer transmitted from the base station upon transmission of the downlink physical channel, and may rewrite (re-generate) the control information to appropriate information upon transfer to the terminal device.

Figure 11:
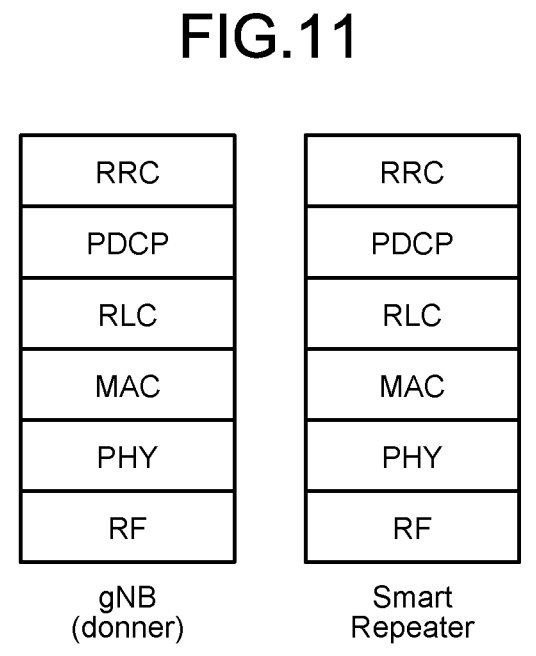

FIG. 11 is a diagram illustrating another example of a control plane (C-Plane) protocol stack between the base station and the smart repeater. The control plane of the smart repeater has a protocol stack equivalent to that of the terminal device.

(3) SSB of Smart Repeater

When the base station and the smart repeater have the same cell IDs (e.g., Physical Cell Identifier (PCI)), it is necessary to distinguish whether the terminal device is connected to the base station or the smart repeater. Therefore, indexes different from those of the base station are allocated to SSBs and CSI-RSs of the smart repeater. The setting of SSB and CSI-RS having different indexes to a combination of transmission beams of the base station and the smart repeater makes it possible for the base station to recognize an appropriate beam to the terminal device even when the terminal device is connected to the smart repeater.

Figure 12:
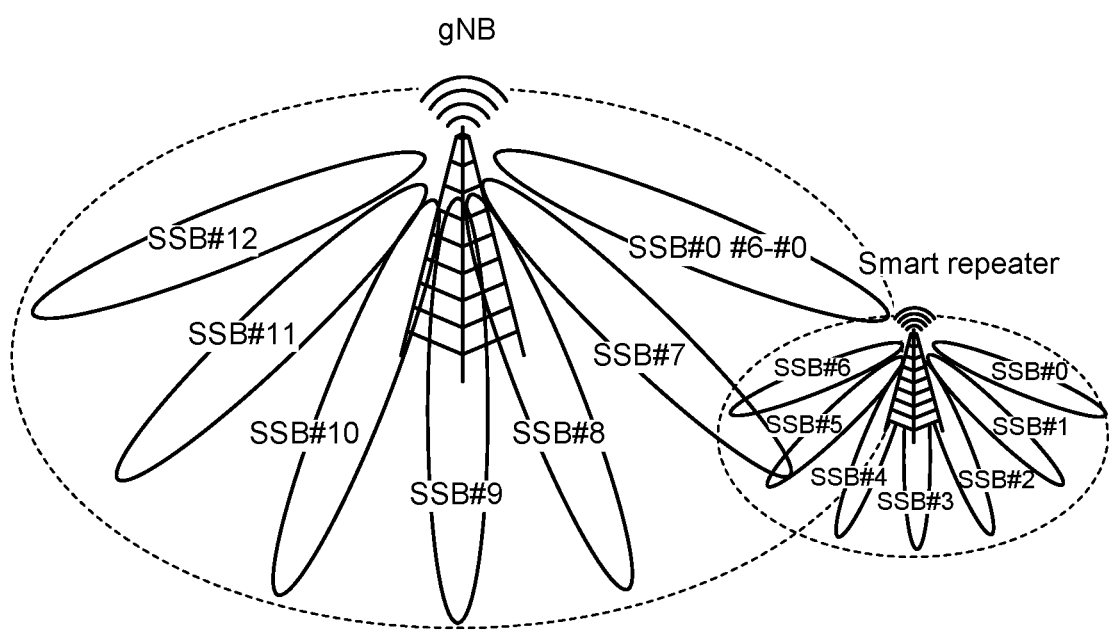
FIG. 12 is a diagram illustrating an example of a relevance between beams of a smart repeater and SSBs.

FIG. 12 is a diagram illustrating an example of a relevance between beams of the smart repeater and SSBs. In the example of FIG. 12, the base station provides SSB #0 to SSB #6 to the smart repeater. The smart repeater transfers the SSB #0 to the SSB #6 transferred from the base station by using different transmission beams. This configuration makes it possible for the base station to recognize that the terminal device connected to any of the SSB #0 to the SSB #6 is connected to the smart repeater.

Association between each transmission beam of the smart repeater and each SSB/CSI-RS is desirably performed by RRC signaling. In other words, information (e.g., Information Element (IE)) indicating Association between one or a plurality of transmission beams of the smart repeater and the SSB/CSI-RS can be included in an RRC message (e.g., RRC Reconfiguration message and RRC Setup message). Note that the association between the transmission beams of the smart repeater and the SSB/CSI-RSs may be set as fixed patterns, upon installation or maintenance of the smart repeater.

(4) Intelligent Surface

Figure 13:
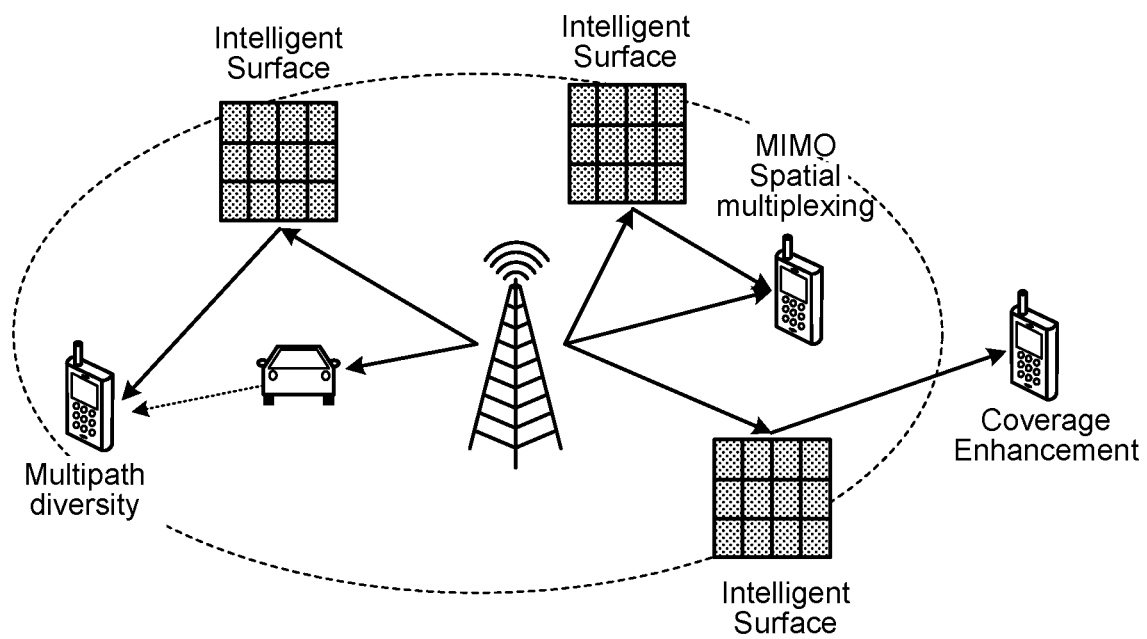
FIG. 13 is a diagram illustrating an overview of an Intelligent Surface system.

A reflection plate (surface) is known as one of devices for relaying data. A conventional reflection plate re-radiates a radio wave at a reflection angle the same as an incident angle of the radio wave on the reflection plate. Meanwhile, in recent years, a reflection plate called Intelligent Surface has also been studied. FIG. 13 is a diagram illustrating an overview of an Intelligent Surface system. Intelligent Surface is a metamaterial (meta-surface) including a plurality of Reflecting elements capable of controlling a reflection characteristic. The phase of each of the Reflecting elements is changed upon re-radiation of the radio wave to control the reflection direction regardless of the incident angle. Compared with the repeater, the Intelligent Surface does not require the Digital-to-Analog Converter (DAC)/Analog-to-Digital Converter (ADC) and the power amplifier circuit, or only requires a simple circuit. Therefore, the Intelligent Surface advantageously has no amplification noise, low price, low power consumption, a small delay in relay processing, and the like. The Intelligent Surface is also referred to as Large Intelligent Surface, Reflecting Surface, Reconfigurable Surface, or meta-material Surface.

The Intelligent Surface has no radio resource control unit, and therefore, the Intelligent Surface is controlled from outside, similarly to the smart repeater. For example, in the Intelligent Surface, characteristics (phase, radiation intensity, reflection angle, amplitude, frequency, polarization, etc.) of the Reflecting element are controlled by an external device (e.g., base station).

In one example, the Intelligent Surface is configured to include a transmitter and a receiver. As a specific example, the Intelligent Surface includes an antenna 413 that is also used as a reflection plate, a transmission processing unit 411, and a reception processing unit 412. In the present configuration, the Intelligent Surface is configured to generate and transmit a physical signal and/or a physical channel. The Intelligent Surface having this configuration facilitates control plane (C-Plane) communication with another device (the base station 20, a repeater device 30, or the terminal device 40).

In another example of the Intelligent Surface, the Intelligent Surface is configured to include a receiving circuit but includes no transmitter. As a specific example, the Intelligent Surface includes the antenna 413 that is also used as the reflection plate and the reception processing unit 412, but does not include the transmission processing unit 411. The present configuration not including the transmission processing unit 411 enables only reception of the control information, leading to simpler device configuration, facilitating suppression of manufacturing cost.

Hereinafter, in the present embodiment, the Intelligent Surface will be described as a type of smart repeater as well. In other words, the repeater device 30 which is described later may be the Intelligent Surface.

3. Overview of Present Embodiment

Although the underlying technology appearing in the present embodiment has been described above, an overview of the present embodiment will be described below.
<3-1. Problem>

There is an increasing demand for coverage enhancement for efficient wireless communication operation. In order to satisfy the demand for the coverage enhancement, introduction of a relay technology has been expected in recent years.

It is assumed that the layer 3 relay such as IAB is introduced as the relay. In the layer 3 relay, the relay node needs to decode all packets up to layer 3, and re-encode packets for transmission to a destination. To implement such a complicated function (e.g., a function equivalent to that of the base station), cost is required. The introduction of the IAB as the relay technology may increase operation cost. This may not achieve efficient operation of wireless communication.

In addition, it is assumed that the layer 1 relay (e.g., RF Repeater) is introduced as the relay. The layer 1 relay has a low cost with a small delay in relay processing. For example, the RF Repeater includes only the Analog-to-Digital Converter (ADC)/Digital-to-Analog Converter (DAC) and the power amplifier circuit, having a simple device function, low cost, and a small delay in relay processing. However, the conventional layer 1 relay directly transmits a received signal for coverage enhancement, and therefore, precise resource control cannot be performed. In addition, the band in which the conventional layer 1 relay is used is FR1 FDD band, and the uplink and the downlink cannot be adjusted.

Meanwhile, also in an FR1 TDD band and FR2, the layer 1 relay is required as an inexpensive relay device. installation of the conventional layer 1 relay causes interference between the fronthaul and the access link and amplification of unnecessary inter-cell interference, lowering system efficiency. Introduction of Smart Repeater is assumed, but in Smart Repeater, the contents of the control information and details of procedures or the like in the fronthaul between the base station and Smart Repeater are unknown. Only the introduction of Smart Repeater may not sufficiently improve performance.

<3-2. Solution>

Therefore, in the present embodiment, the smart repeater is introduced for inexpensive and ready coverage enhancement (in particular, FR2 coverage). More specifically, the smart repeater of the present embodiment receives a physical control signal including beam information about beam between the smart repeater and the terminal device. Here, the physical control signal is Downlink Control Information (DCI) from the base station to the smart repeater. On the basis of the beam information, the smart repeater controls the beam between the smart repeater and the terminal device. The introduction of the smart repeater of the present embodiment facilitates coverage enhancement inexpensively and readily, enabling efficient operation of wireless communication.

<3-3. Difference Between Smart Repeater and IAB (Layer 3 Relay)>

Note that for ease of understanding of the present embodiment, a difference between the smart repeater and IAB (layer 3 relay) will be described.

The IAB has a resource management function, and therefore, an IAB access link beam can be determined by an IAB node. On the other hand, the smart repeater has no resource management function, and therefore, an access link beam from the smart repeater is determined by the base station.

The IAB nodes have distinct cell IDs. Different cell IDs make it possible for the terminals to recognize the respective SSBs even if SSB indexes are the same. Meanwhile, the smart repeater may have no distinct cell ID. Therefore, in order to perform appropriate beam control, it may be necessary to distinguish between SSB from the base station and SSB from the smart repeater.

The IAB node supports gNB-DU functions. Meanwhile, the smart repeater may not support part of the gNB-DU functions. As a specific example, the smart repeater hosts only some (e.g., PHY) of a plurality of lower layers supported by a gNB-DU in Access Stratum for communication with UE. A plurality of the other upper layers (e.g., RRC, SDAP, PDCP, RLC, and MAC) that are not hosted by the smart repeater are hosted by the base station.

In addition, the IAB node supports part of UE functions. Meanwhile, the smart repeater may not support part of the UE functions supported by the IAB node.

4. Configuration of Communication System

Although the overview of the present embodiment has been described above, a communication system according to the present embodiment will be described in detail below. Hereinafter, the configuration of the communication system 1 will be described in detail with reference to the drawings.

<4-1. Overall Configuration of Communication System>

Figure 14:
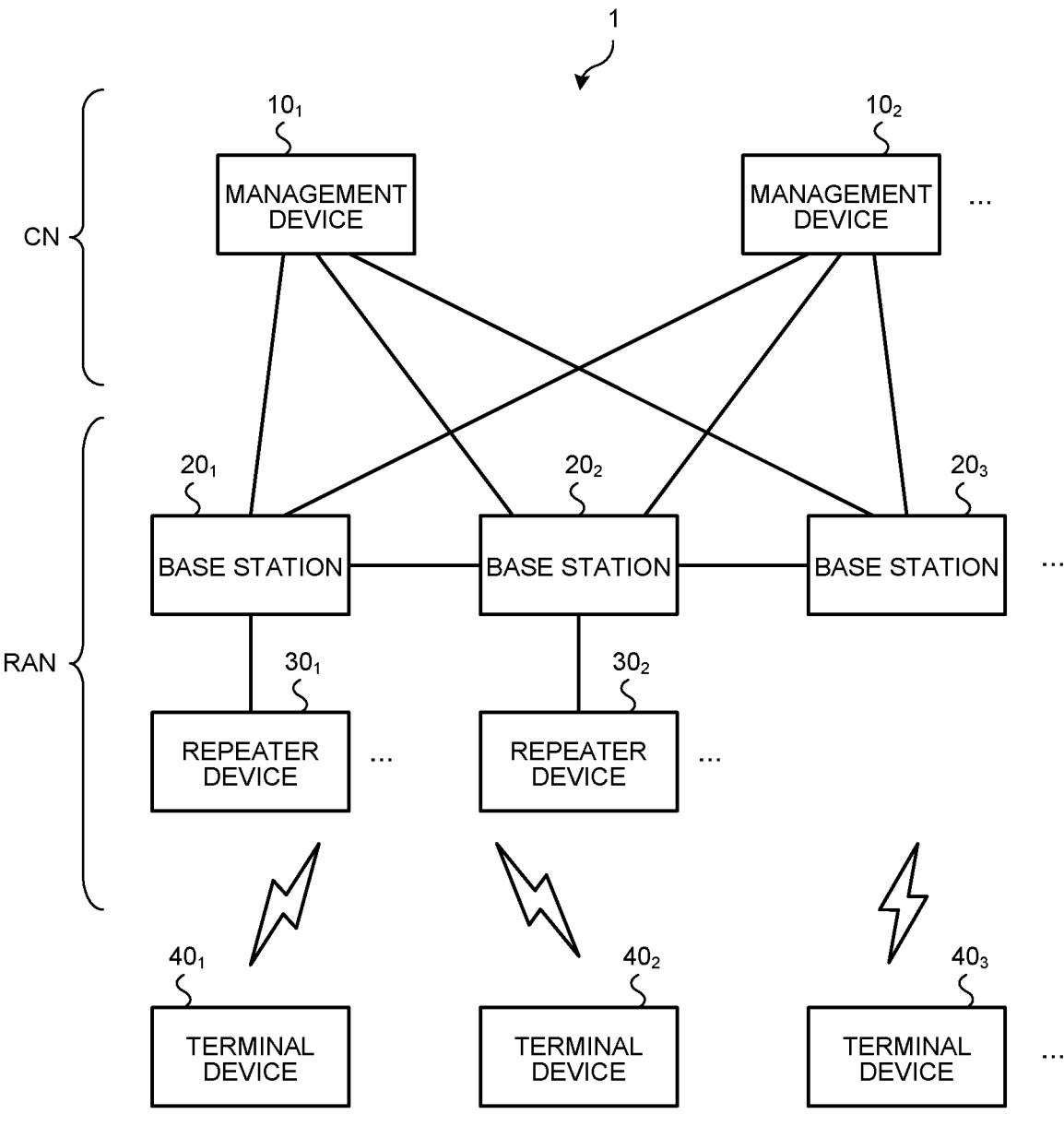
FIG. 14 is a diagram illustrating an exemplary configuration of a communication system according to an embodiment of the present disclosure.

FIG. 14 is a diagram illustrating an exemplary configuration of the communication system 1 according to an embodiment of the present disclosure. The communication system 1 includes a management device 10, the base station the repeater device 30, and the terminal device 40. In the communication system 1, wireless communication devices constituting the communication system 1 operate in association with each other, providing a radio network through which mobile communication can be performed for the user. The radio network of the present embodiment includes a radio access network and a core network. Note that in the present embodiment, the wireless communication devices are each a device having a wireless communication function, and in the example of FIG. 14, the base station 20, the repeater device 30, and the terminal device 40 correspond to the wireless communication devices.

The communication system 1 may include a plurality of the management devices 10, the base stations the repeater devices 30, and the terminal devices 40. In the example of FIG. 14, the communication system 1 includes management devices $10_1$, $10_2$, and the like as the management devices 10, and includes base stations $20_1$, $20_2$, and the like as the base stations 20. In addition, the communication system 1 includes repeater devices $30_1$, $30_2$, and the like as the repeater devices 30, and includes terminal devices $40_1$, $40_2$, and $40_3$, and the like as the terminal devices 40.

Note that the devices in the drawing may be considered as logical devices. In other words, some of the devices in the drawing may be implemented by a Virtual Machine (VM), Container, Docker, or the like to be implemented physically on the same hardware.

Note that the communication system 1 may support Radio Access Technology (RAT) such as Long Term Evolution (LTE) and New Radio (NR). Each of LTE and NR is a type of cellular communication technology and a plurality of areas covered by base stations, arranged in the form of cells, enables mobile communication of a terminal device.

Note that a radio access method used by the communication system 1 is not limited to LTE or NR, and may use another radio access method such as Wideband Code Division Multiple Access (W-CDMA) or Code Division Multiple Access 2000 (cdma2000).

Furthermore, the base station or a relay station that constitute the communication system 1 may be a terrestrial station or a non-terrestrial station. The non-terrestrial station may be a satellite station or an aeronautical station. If the non-terrestrial station is the satellite station, the communication system 1 may be a Bent-pipe (Transparent) satellite mobile communication system.

Note that in the present embodiment, the terrestrial station (also referred to as terrestrial base station) refers to a base station (including relay station) installed on the ground. Here "ground" represents not only on land but also under the ground, on water, and under water in a broad sense. Note that, in the following description, the description of "terrestrial station" may be replaced with "gateway."

Note that an LTE base station may be referred to as Evolved Node B (eNodeB) or eNB. Furthermore, an NR base station may be referred to as gNodeB or gNB. Still furthermore, in LTE and NR, the terminal device (also referred to as mobile station or terminal) may be referred to as User Equipment (UE). Note that the terminal device is a type of communication device and is also referred to as mobile station or terminal.

In the present embodiment, the concept of the communication device includes not only a portable mobile device (terminal device) such as a mobile terminal but also a device installed at a structure or mobile object. The structure or the mobile object itself may be regarded as the communication device. Furthermore, the concept of the communication device includes not only the terminal device but also the base station and the relay station. The communication device is a type of processing device and information processing device. Furthermore, the communication device can also be referred to as transmission device or reception device.

Hereinafter, the configurations of respective devices constituting the communication system 1 will be specifically described. Note that the configurations of the devices described below are merely examples. The configurations of the devices may be different from the following configurations.

<4-2. Configuration of Management Device>

Next, the configuration of the management device 10 will be described.

The management device 10 is a device that manages the radio network. For example, the management device 10 is a device that manages communication of the base station 20. When the core network is an Evolved Packet Core (EPC), the management device 10 is, for example, a device that functions as a Mobility Management Entity (MME). Furthermore, when the core network is a 5G Core network (5GC), the management device 10 is a device that functions as an Access and Mobility Management Function (AMF) and/or Session Management Function (SMT). As a matter of course, the functions of the management device 10 are not limited to the MME, the AMF, and the SMF. For example, when the core network is 5GC, the management device 10 may be a device that functions as a Network Slice Selection Function (NSSF), Authentication Server Function (AUSF), or Unified Data Management (UDM). Furthermore, the management device may be a device having a function as a Home Subscriber Server (HSS).

Note that the management device 10 may have a gateway function. For example, when the core network is EPC, the management device 10 may function as a Serving Gateway (S-GW) or a Packet Data Network Gateway (P-GW). Furthermore, when the core network is 5GC, the management device 10 may functions as a User Plane Function (UPF). Note that the management device 10 may not necessarily be a device constituting the core network. For example, it is assumed that the core network is a core network for Wideband Code Division Multiple Access (W-CDMA) or Code Division Multiple Access 2000 (cdma2000). At this time, the management device 10 may be a device that functions as a Radio Network Controller (RNC).

Figure 15:
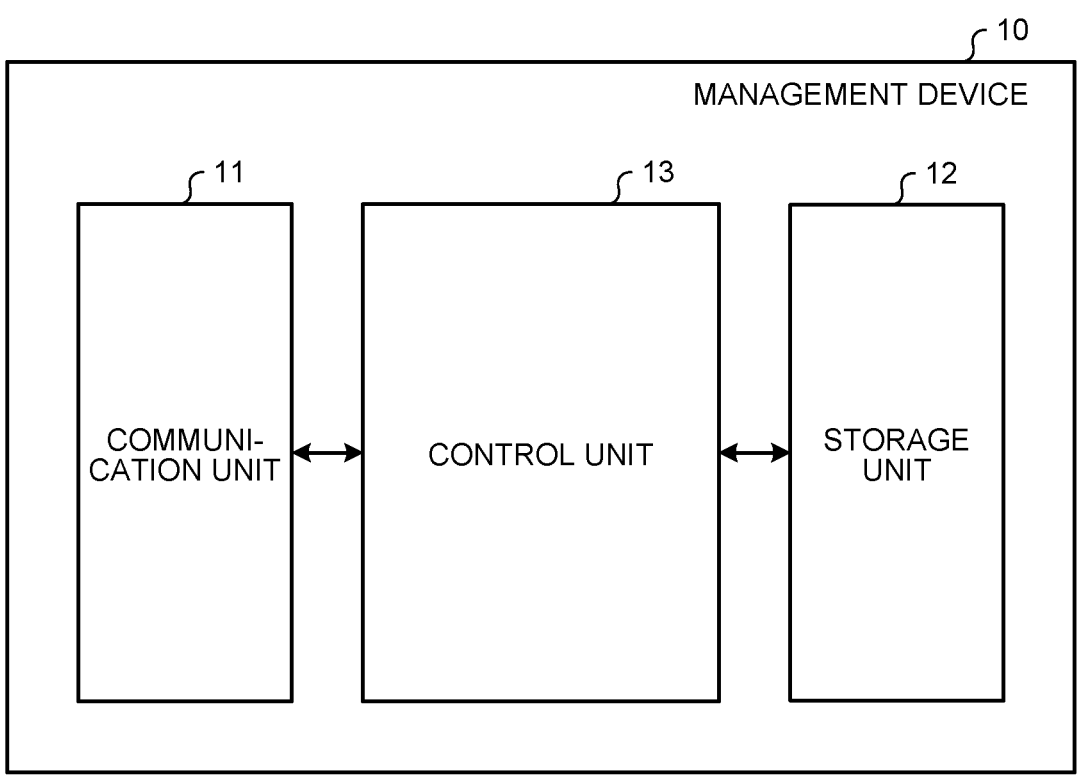
FIG. 15 is a diagram illustrating an exemplary configuration of a management device according to an embodiment of the present disclosure.

FIG. 15 is a diagram illustrating an exemplary configuration of the management device 10 according to an embodiment of the present disclosure. The management device 10 includes a communication unit 11, a storage unit 12, and a control unit 13. Note that the configuration illustrated in FIG. 15 represents a functional configuration, and a hardware configuration may be different from this functional configuration. Furthermore, the functions of the management device 10 may be statically or dynamically distributed, for implementation, to a plurality of physically separated configurations. For example, the management device 10 may be constituted by a plurality of server devices.

The communication unit 11 is a communication interface for communication with another device. The communication unit 11 may be a network interface or a device connection interface. For example, the communication unit 11 may be Local Area Network (LAN) interface such as Network Interface Card (NIC) or may be Universal Serial Bus (USB) interface including a USB host controller, a USB port, and the like. Furthermore, the communication unit 11 may be a wired interface or a wireless interface. The communication unit 11 functions as communication means for the management device 10. The communication unit 11 communicates with the base station 20 and the like according to the control of the control unit 13.

The storage unit 12 is a data readable/writable storage device such as Dynamic Random Access Memory (DRAM), Static Random Access Memory (SRAM), a flash memory, or a hard disk. The storage unit 12 functions as storage means for the management device 10. The storage unit 12 stores, for example, a connection state of the terminal device 40. For example, the storage unit 12 stores a state of Radio Resource Control (RRC), EPS Connection Management (ECM), or 5G System Connection Management (CM) of the terminal device 40. The storage unit 12 may function as home memory that stores position information of the terminal device 40.

The control unit 13 is a controller that controls the units of the management device 10. The control unit 13 is implemented by a processor such as Central Processing Unit (CPU) or Micro Processing Unit (MPU). For example, the control unit 13 is implemented by executing various programs stored in the storage device in the management device 10 by the processor, with Random Access Memory (RAM) or the like as a work area. Note that the control unit 13 may be implemented by an integrated circuit such as Application Specific Integrated Circuit (ASIC) or Field Programmable Gate Array (FPGA). The CPU, MPU, ASIC, and FPGA can all be regarded as the controllers.

<4-3. Configuration of Base Station>

Next, the configuration of the base station 20 will be described.

The base station 20 is a wireless communication device that wirelessly communicates with the terminal device 40. The base station 20 may be configured to wirelessly communicate with the terminal device 40 via the repeater device 30, or may be configured to directly communicate wirelessly with the terminal device 40.

The base station 20 is a type of communication device. More specifically, the base station 20 is a device corresponding to a wireless Base Station (Node B, eNB, gNB, etc.) or a wireless Access Point. The base station 20 may be a wireless relay station. Furthermore, the base station 20 may be an optical remote device called Remote Radio Head (RRH). Furthermore, the base station 20 may be a receiving station such as Field Pickup Unit (FPU). Furthermore, the base station 20 may be an Integrated Access and Backhaul (IAB) donor node or IAB relay node that provides a radio access network and a radio backhaul network by using time division multiplexing, frequency division multiplexing, or space division multiplexing.

Note that Radio Access Technology used by the base station 20 may be a cellular communication technology or a wireless LAN technology. As a matter of course, the Radio Access Technology used by the base station 20 is not limited thereto, and may be another Radio Access Technology. For example, the Radio Access Technology used by the base station 20 may be a Low Power Wide Area (LPWA) communication technology. As a matter of course, wireless communication used by the base station 20 may be millimeter wave wireless communication. Furthermore, wireless communication used by the base station 20 may be wireless communication using radio waves, or wireless communication using infrared or visible light (optical wireless communication).

The base station 20 may be configured to perform Non-Orthogonal Multiple Access (NOMA) communication with the terminal device 40. Here, NOMA communication is communication using a non-orthogonal resource (transmission, reception, or both). The base station 20 may be configured to perform NOMA communication with another base station 20. The non-orthogonal resource is a resource on an axis different from that of the orthogonal resource (time, frequency, and space), and is a radio resource capable of separating different signals by using, for example, scrambling, interleaving, a code (e.g., spreading code, sparse code, or the like), a power difference, and the like.

Note that the base stations 20 may be communicable with each other via a base station-core network interface (e.g., S1 Interface or the like). This interface may be wired or wireless. Furthermore, the base stations may be communicable with each other via an interface between the base stations (e.g., X2 Interface, S1 Interface, or the like). This interface may be wired or wireless.

Note that the base stations 20 may be communicable with each other via a base station-core network interface (e.g., NG Interface, S1 Interface, or the like). This interface may be wired or wireless. Furthermore, the base stations may be communicable with each other via an interface between the base stations (e.g., Xn Interface, X2 Interface, or the like). This interface may be wired or wireless.

Note that the concept of the base station includes not only a donor base station but also a relay base station (also referred to as relay station). Furthermore, the concept of the base station includes not only a Structure with a function of the base station but also a device installed at the Structure.

The Structure includes buildings such as a high-rise building, house, steel tower, station facility, airport facility, harbor facility, office building, school building, hospital, factory, commercial facility, and stadium. Note that the concept of the Structure includes not only the buildings but also Non-building structures such as a tunnel, bridge, dam, fence, and steel column, and facilities such as a crane, gate, and windmill. In addition, the concept of the Structure includes not only the structures on land (on the ground) or under the ground but also structures on the water such as a pier and megafloat, and structures under the water such as an ocean observation facility. The base station can be also referred to as an information processing device.

The base station 20 may be a donor station or a relay station. Furthermore, the base station 20 may be a fixed station or a mobile station. The mobile station is a wireless communication device (e.g., base station) configured to be movable. At this time, the base station 20 may be a device installed at a mobile object or the mobile object itself. For example, a relay station having Mobility can be regarded as the base station 20 as the mobile station. In addition, a device, such as a vehicle, Unmanned Aerial Vehicle (UAV) represented by a drone, or smartphone, that originally has Mobility and that has a function of the base station (at least part of the function of the base station) corresponds to the base station 20 as the mobile station, as well.

Here, the mobile object may be a mobile terminal such as a smartphone or mobile phone. Furthermore, the mobile object may be a mobile object (e.g., a vehicle such as an automobile, bicycle, bus, truck, motorcycle, train, or linear motor car) that moves on land (on the ground) or may be a mobile object (e.g., subway) that moves under the ground (e.g., in a tunnel).

Furthermore, the mobile object may be a mobile object (e.g., a ship such as a passenger ship, cargo ship, or hovercraft) that moves on the water or may be a mobile object (e.g., a submersible ship such as a submersible vessel, submarine boat, or unmanned submersible) that moves under water.

Note that the mobile object may be a mobile object (e.g., aircraft such as airplane, airship, or drone) that moves in the atmosphere.

Furthermore, the base station 20 may be a terrestrial base station (terrestrial station) that is installed on the ground. For example, the base station 20 may be a base station that is arranged in a Structure on the ground or a base station that is installed on a mobile object moving on the ground. More specifically, the base station 20 may be an antenna that is installed on a Structure such as a building and a signal processing device connected to the antenna. As a matter of course, the base station 20 may be the Structure or the mobile object itself. "On the ground" represents not only on land (on the ground) but also under the ground, on the water, and under the water in a broad sense. Note that the base station 20 is not limited to the terrestrial base station. For example, in a case where the communication system 1 is a satellite communication system, the base station 20 may be an aeronautical station. From the viewpoint of a satellite station, an aeronautical station located on the earth is the terrestrial station.

Note that the base station 20 is not limited to the terrestrial station. The base station 20 may be a non-terrestrial base station (non-terrestrial station) that is configured to float in the air or in space. For example, the base station 20 may be an aeronautical station or a satellite station.

The satellite station is a satellite station that is configured to float above the atmosphere. The satellite station may be a device mounted on a space vehicle such as an artificial satellite or may be the space vehicle itself. The space vehicle is a mobile object that moves above the atmosphere. Examples of the space vehicle include artificial celestial bodies such as an artificial satellite, spacecraft, space station, and probe.

A satellite serving as the satellite station may be any of a Low Earth Orbiting (LEO) satellite, Medium Earth Orbiting (MEO) satellite, Geostationary Earth Orbiting (GEO) satellite, and Highly Elliptical Orbiting (HEO) satellite. As a matter of course, the satellite station may be a device mounted on the Low Earth Orbiting satellite, Medium Earth Orbiting satellite, Geostationary Earth Orbiting satellite, and Highly Elliptical Orbiting satellite.

The aeronautical station is a wireless communication device that is configured to float in the atmosphere, such as an aircraft. The aeronautical station may be a device mounted on an aircraft or the like or may be the aircraft itself. Note that the concept of aircraft includes not only a heavier-than-air aircraft such as an airplane or glider, but also a lighter-than-air aircraft such as a balloon or airship. Furthermore, the concept of aircraft includes not only the heavier-than-air aircraft or lighter-than-air aircraft, but also a rotorcraft such as a helicopter or autogiro. Note that the aeronautical station (or an aircraft on which the aeronautical station is mounted) may include an unmanned aircraft such as a drone.

Note that the concept of the unmanned aircraft also includes Unmanned Aircraft Systems (UAS) and tethered UAS. Furthermore, the concept of the unmanned aircraft includes a Lighter than Air UAS (LTA) and a Heavier than Air UAS (HTA). In addition, the concept of the unmanned aircraft also includes High Altitude UAS Platforms (HAPs).

The base station 20 may provide large coverage, such as a macrocell, or small coverage, such as a picocell. As a matter of course, the base station 20 may provide extremely small coverage, such as a femtocell. Furthermore, the base station 20 may have beamforming capability. In this case, a cell or service area may be formed for each beam, in the base station 20. Therefore, the base station 20 may be configured to include an antenna array that includes a plurality of antenna elements to provide Advanced Antenna Technology represented by Multiple Input Multiple Output (MIMO) and beamforming.

Figure 16:
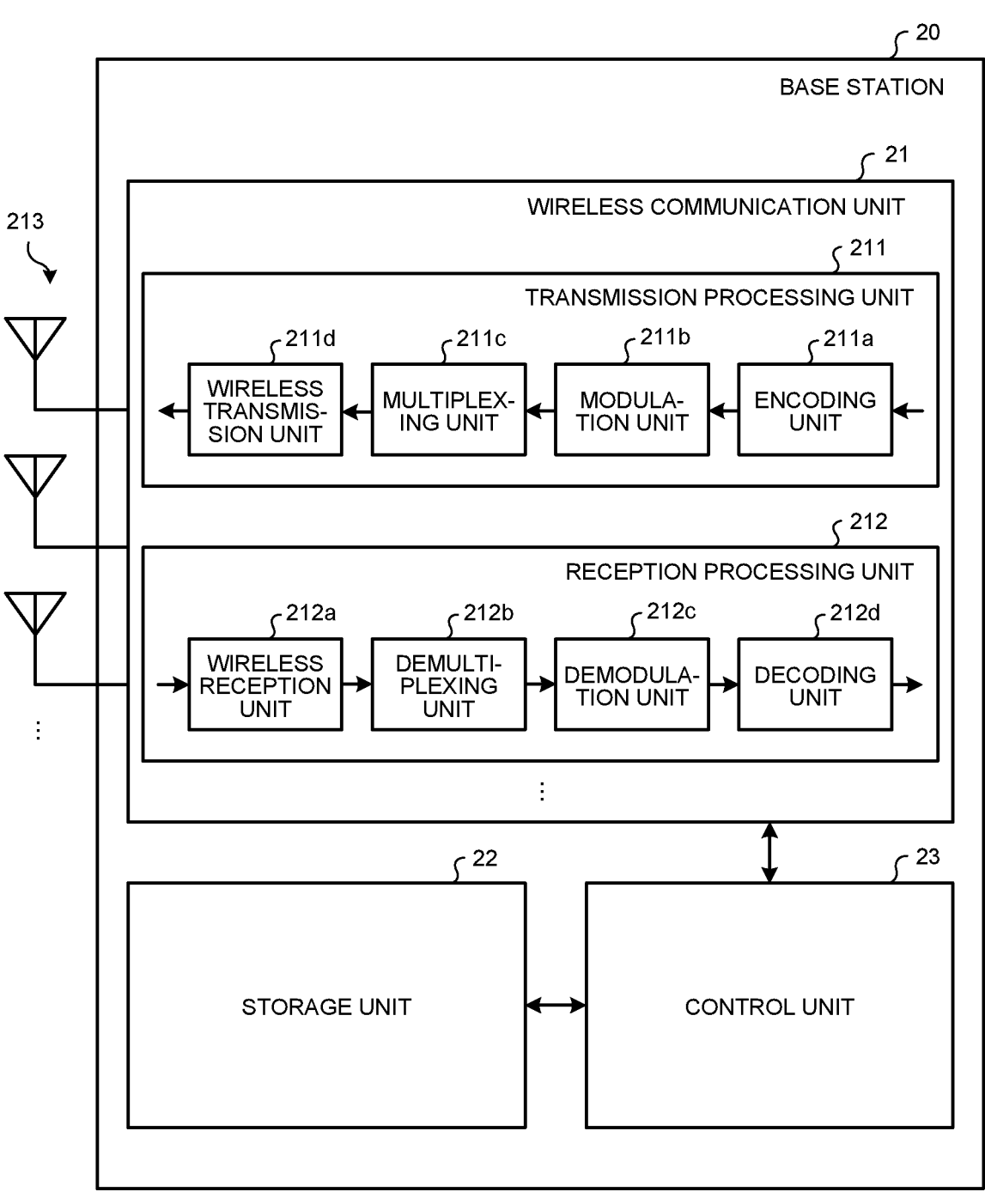
FIG. 16 is a diagram illustrating an exemplary configuration of a base station according to an embodiment of the present disclosure.

FIG. 16 is a diagram illustrating an exemplary configuration of the base station 20 according to an embodiment of the present disclosure. The base station 20 includes a wireless communication unit 21, a storage unit 22, and a control unit 23. Note that the configuration illustrated in FIG. 16 represents a functional configuration, and a hardware configuration may be different from this functional configuration. Furthermore, the functions of the base station 20 may be distributed, for implementation, to a plurality of physically separated configurations.

The wireless communication unit 21 is a signal processing unit for wireless communication with another wireless communication device (e.g., terminal device 40). The wireless communication unit 21 operates according to the control of the control unit 23. The wireless communication unit 21 supports one or more radio access methods. For example, the wireless communication unit 21 supports both of NR and LTE. The wireless communication unit 21 may support W-CDMA or cdma2000 in addition to NR and LTE. Furthermore, the wireless communication unit 21 may support an automatic retransmission technology such as Hybrid Automatic Repeat reQuest (HARQ).

The wireless communication unit 21 includes a transmission processing unit 211, a reception processing unit 212, and an antenna 213. The wireless communication unit 21 may include a plurality of the transmission processing units 211, the reception processing units 212, and the antennas 213. Note that in a case where the wireless communication unit 21 supports a plurality of the radio access methods, the units of the wireless communication unit 21 can be individually configured for each of the radio access methods. For example, the transmission processing units 211 and the reception processing unit 212 may be individually configured for each of the LTE and NR. Furthermore, the antenna 213 may include a plurality of antenna elements (e.g., a plurality of patch antennas). In this case, the wireless communication unit 21 may be configured to perform beamforming. The wireless communication unit 21 may be configured to perform polarization beamforming by using vertical polarization (V polarization) and horizontal polarization (H polarization).

The transmission processing unit 211 performs transmission processing for downlink control information and downlink data. For example, the transmission processing unit 211 encodes the downlink control information and the downlink data that are input from the control unit 23, by using an encoding method such as block coding, convolutional coding, or turbo coding. Note that, as the encoding, Polar Code encoding and Low Density Parity Check Code (LDPC) encoding may be performed. The transmission processing unit 211 modulates encoded bits by a predetermined modulation method such as BPSK, QPSK, 16QAM, 64QAM, 256QAM, or 1024QAM. In this case, signal points in a constellation do not necessarily need to be equidistant from each other. The constellation may be Non Uniform Constellation (NUC). Then the transmission processing unit 211 multiplexes a modulation symbol and a downlink reference signal on each channel so as to be arranged in a predetermined resource element. Then the transmission processing unit 211 performs various types of signal processing on a signal obtained by multiplexing. For example, the transmission processing unit 211 performs processing, such as conversion to a frequency domain by using fast Fourier transform, addition of a guard interval (cyclic prefix), generation of a baseband digital signal, conversion to an analog signal, quadrature modulation, up-convert, removal of an unnecessary frequency component, and amplification of power. A signal generated by the transmission processing unit 211 is transmitted from the antenna 213.

The reception processing unit 212 processes an uplink signal received via the antenna 213. For example, the reception processing unit 212 performs, on the uplink signal, down-convert, removal of an unnecessary frequency component, control of an amplification level, quadrature demodulation, conversion to a digital signal, removal of a guard interval (cyclic prefix), extraction of a frequency domain signal by using fast Fourier transform, and the like. Then the reception processing unit 212 demultiplexes an uplink channel, such as Physical Uplink Shared Channel (PUSCH) or Physical Uplink Control Channel (PUCCH), and the uplink reference signal, from the signal on which the above processing is performed. Furthermore, the reception processing unit 212 uses a modulation method such as Binary Phase Shift Keying (BPSK) or Quadrature Phase Shift Keying (QPSK) for a modulation symbol on the uplink channel to demodulate the received signal. The modulation method used for the demodulation may be 16 Quadrature Amplitude Modulation (QAM), 64QAM, 256QAM, or 1024QAM. In this case, signal points in a constellation do not necessarily need to be equidistant from each other. The constellation may be Non Uniform Constellation (NUC). Then the reception processing unit 212 performs decode processing on the demodulated encoded bits on the uplink channel. Uplink data and uplink control information that have been decoded are output to the control unit 23.

The antenna 213 is an antenna device (antenna unit) that mutually converts a current and a radio wave. The antenna 213 may include one antenna element (e.g., one patch antenna) or may include a plurality of antenna elements (e.g., a plurality of patch antennas). In a case where the antenna 213 includes the plurality of antenna elements, the wireless communication unit 21 may be configured to perform beamforming. For example, the wireless communication unit 21 may be configured to use the plurality of antenna elements to control the directivity of a radio signal and generate a directional beam. Note that the antenna 213 may be a dual-polarized antenna. When the antenna 213 is the dual-polarized antenna, the wireless communication unit 21 may use the vertical polarization (V polarization) and the horizontal polarization (H polarization) in transmitting radio signals. Then, the wireless communication unit 21 may control the directivity of the radio signals transmitted using the vertical polarization and the horizontal polarization.

The storage unit 22 is a data readable/writable storage device such as DRAM, SRAM, a flash memory, or hard disk. The storage unit 22 functions as storage means for the base station 20.

The control unit 23 is a controller that controls the units of the base station 20. The control unit 23 is implemented by a processor such as Central Processing Unit (CPU) or Micro Processing Unit (MPU). For example, the control unit 23 is implemented by executing various programs stored in the storage device in the base station 20 by the processor, with Random Access Memory (RAM) or the like as a work area. Note that the control unit 23 may be implemented by an integrated circuit such as Application Specific Integrated Circuit (ASIC) or Field Programmable Gate Array (FPGA). The CPU, MPU, ASIC, and FPGA can all be regarded as the controllers. Furthermore, the control unit 23 may be implemented by Graphics Processing Unit (GPU) in addition to or instead of CPU.

Furthermore, in some embodiments, the concept of the base station may include a set of a plurality of physical or logical devices. For example, in the present embodiment, the base station may be divided into a plurality of devices, such as Baseband Unit (BBU) and Radio Unit (RU). Then, the base station may be interpreted as an assembly of the plurality of devices. In addition, the base station may be either or both of BBU and RU. The BBU and the RU may be connected with a predetermined interface (e.g., enhanced Common Public Radio Interface (eCPRI)). Note that the RU may be referred to as Remote Radio Unit (RRU) or Radio DoT (RD). Furthermore, the RU may correspond to gNB Distributed Unit (gNB-DU) which is described later. Furthermore, the BBU may correspond to gNB Central Unit (gNB-CU) which is described later. Additionally, the RU may be a device integrally formed with an antenna. An antenna (e.g., the antenna integrally formed with RU) of the base station may adopt Advanced Antenna System and support MIMO (e.g., FD-MIMO) or beamforming. Furthermore, the antenna of the base station may include, for example, 64 transmission antenna ports and 64 reception antenna ports.

In addition, the antenna mounted on the RU may be an antenna panel that includes one or more antenna elements, and the RU may include one or more antenna panels. For example, the RU may include two types of antenna panels of a horizontally polarized antenna panel and a vertically polarized antenna panel, or two types of antenna panels of a right-hand circular polarization antenna panel and a left-hand circular polarization antenna panel. In addition, the RU may form and control a beam independent for each antenna panel.

Note that a plurality of the base stations may be connected to each other. One or more base stations may be included in Radio Access Network (RAN). In this configuration, the base stations may be simply referred to as RAN, a RAN node, Access Network (AN), or an AN node. Note that RAN in LTE may be referred to as Enhanced Universal Terrestrial RAN (EUTRAN). Furthermore, RAN in NR may be referred to as NGRAN. Furthermore, RAN in W-CDMA (UMTS) may be referred to as UTRAN.

Note that an LTE base station may be referred to as Evolved Node B (eNodeB) or eNB. At this time, EUTRAN includes one or more eNodeBs (eNBs). Furthermore, an NR base station may be referred to as gNodeB or gNB. At this time, NGRAN includes one or more gNBs. EUTRAN may include gNB (en-gNB) that is connected to a core network (EPC) in an LTE communication system (EPS). Likewise, NGRAN may include ng-eNB that is connected to a core network 5GC in a 5G communication system (5GS).

Note that in a case where the base station is eNB, gNB, or the like, the base station may be referred to as 3GPP Access. Furthermore, in a case where the base station is a wireless Access Point, the base station may be referred to as Non-3GPP Access. Furthermore, the base station may be an optical remote device called Remote Radio Head (RRH). Furthermore, in a case where the base station is gNB, the base station may have a combination of gNB-CU and gNB-DU which has been described above, or may be any one of the gNB-CU and the gNB-DU.

Here, the gNB-CU hosts a plurality of upper layers (e.g., RRC, SDAP, and PDCP) of Access Stratum, for communication with UE. Meanwhile, the gNB-DU hosts a plurality of lower layers (e.g., RLC, MAC, and PHY) of the Access Stratum. In other words, some of messages/pieces of information, which have been described above or which will be described later, may be generated as RRC signaling (semi-static notification) may be generated by the gNB CU, and the rest may be generated as MAC CE or DCI (dynamic notification) by the gNB-DU. Alternatively, of RRC configurations (some of the messages/pieces of information, which have been described above or which will be described later), for example, some of the configurations such as IE: cellGroupConfig may be generated by the gNB-DU, and the rest of the configurations may be generated by the gNB-CU. These configurations may be transmitted and received through an F1 interface which is described later.

Note that the base station may be configured to be communicable with another base station. For example, in a case where a plurality of base stations is eNBs or has a combination of eNB and en-gNB, the base stations may be connected via X2 interface. Furthermore, in a case where a plurality of base stations is gNBs or has a combination of gn-eNB and gNB, the devices may be connected via Xn interface. Furthermore, in a case where a plurality of base stations has a combination of gNB-CU and gNB-DU, the devices may be connected via F1 interface. A message/information (e.g., RRC signaling, MAC Control Element (MAC CE), or DCI) which is described later may be transmitted between a plurality of base stations, for example, via X2 interface, Xn interface, or F1 interface. A cell provided by the base station may be referred to as a serving cell. The concept of the serving cell includes Primary Cell (PCell) and Secondary Cell (SCell). In a case where dual connectivity is set for UE (e.g., terminal device 40), the PCell and zero or more SCells provided by Master Node (MN) may be referred to as Master Cell Group. Examples of the dual connectivity include EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity (NRDC).

Note that the serving cell may include PSCell (Primary Secondary Cell or Primary SCG Cell). In a case where the dual connectivity is set for UE, PSCell and zero or more SCells provided by Secondary Node (SN) may be referred to as Secondary Cell Group (SCG). Unless otherwise set (e.g., PUCCH on SCell), the Physical Uplink Control Channel (PUCCH) is transmitted on the PCell and PSCell, but is not transmitted on the SCell. Furthermore, Radio Link Failure is also detected on the PCell and the PSCell, but is not detected (may not be detected) on the SCell. As described above, the PCell and the PSCell that have special roles on the serving cell are also referred to as Special Cell (SpCell). In some embodiments, when a smart repeater (repeater device 30 which will be described later) manages a cell different from a cell managed by a base station 20 (i.e., the cell ID of a cell managed by the smart repeater (the repeater device 30 which will be described later) is different from the cell ID of a cell managed by the base station 20), the cell managed by the smart repeater (the repeater device 30 which will be described later) may be PCell or SCell of Carrier Aggregation, or Serving cell in MCG or SCG of Dual Connectivity. In this case, the other Serving cells may be cells managed by the base station 20. Alternatively, in some embodiments, when a cell managed by a smart repeater (repeater device 30 which will be described later) has a cell ID the same as that of a cell managed by a base station 20 (i.e., when a smart repeater (repeater device 30 which will be described later) functions as part of a cell managed by the base station 20), a restriction that the smart repeater (the repeater device 30 which will be described later) is not allowed to be connected, as a part of the SpCell, to the base station may be defined in a specification. In other words, a restriction that the smart repeater (repeater device 30 which will be described later) is used only for Secondary Cell (or PSCell with respect to PCell) may be defined in the specification.

One downlink component carrier and one uplink component carrier may be associated with one cell. Furthermore, a system bandwidth corresponding to one cell may be divided into a plurality of Bandwidth Parts (BWPs). In this configuration, one or more BWPs may be set to UE and one of the BWPs may be used for the UE, as Active BWP. In addition, radio resources (e.g., frequency band, numerology (subcarrier spacing), and a slot format (Slot configuration) that can be used by the terminal device 40 may be different between cells, component carriers, or BWPs. In some embodiments, of one or more BWPs that can be set for the terminal device 40, BWP in which the smart repeater is used may be limited. For example, the smart repeater may be used only in default BWP, Initial BWP, or a predetermined BWP (Active BWP) indicated by an RRC message.

<4-4. Configuration of Relay Station>

Next, the configuration of the repeater device 30 will be described.

The repeater device 30 is a device that serves as a relay station for the base station. The repeater device 30 is, for example, a smart repeater. The repeater device 30 is a layer 1 relay that further enables control at a Physical Layer (PHY) level relative to the conventional layer 1 relay. More specifically, the repeater device 30 terminates only C-Plane processing in Physical Layer. In other words, information of layers (upper layers) (e.g., MAC layer, RLC layer, PDCP layer, SDAP layer, and RRC layer) above Physical Layer is not terminated. Examples of Physical Layer level control include uplink/downlink resource allocation, beamforming control, and the like. As described above, Intelligent Surface can be regarded as a type of smart repeater. The repeater device 30 is not limited to the smart repeater as long as the following operation is performed.

Note that the relay station of the present embodiment may be a fixed device, a movable device, or a floatable device. Furthermore, the relay station of the present embodiment may provide coverage not limited to a specific size. For example, a cell covered by the relay station may be a macrocell, a microcell, or a small cell. As a matter of course, the repeater device 30 may provide extremely small coverage, such as a femtocell. Furthermore, the repeater device 30 may have beamforming capability. In this case, a cell or service area may be formed for each beam, in the repeater device 30.

Furthermore, the relay station of the present embodiment does not limit a device to which the relay station is mounted, as long as a relay function is satisfied. For example, the relay station may be mounted to a terminal device such as a smartphone, may be mounted on an automobile, train, or human-powered vehicle, may be mounted on a balloon, airplane, or drone, or may be mounted to a home appliance such as a TV set, game machine, air conditioner, refrigerator, or light device. Alternatively, the relay station may be provided on an outer wall of a construction (e.g., building). Providing the relay station on the outer wall of the building, even when there is an obstacle between a base station and a terminal device, a signal from a base station can be transferred by the relay station provided on the outer wall of the building, reaching the terminal device.

For example, the repeater device 30 may be a device installed at a mobile object or the mobile object itself, as in the base station 20 described above. As described above, the mobile object may be a mobile terminal such as a smartphone or a mobile phone. In addition, the mobile object may be a mobile object that moves on land (on the ground) or may be a mobile object that moves under the ground. As a matter of course, the mobile object may be a mobile object that moves on the water or may be a mobile object that moves under water. In addition, the mobile object may be a mobile object that moves in the atmosphere or may be a mobile object that moves above the atmosphere. Furthermore, the base station 20 may be a terrestrial station device or may be a non-terrestrial station device. At this time, the repeater device 30 may be an aeronautical station or a satellite station.

Figure 17:
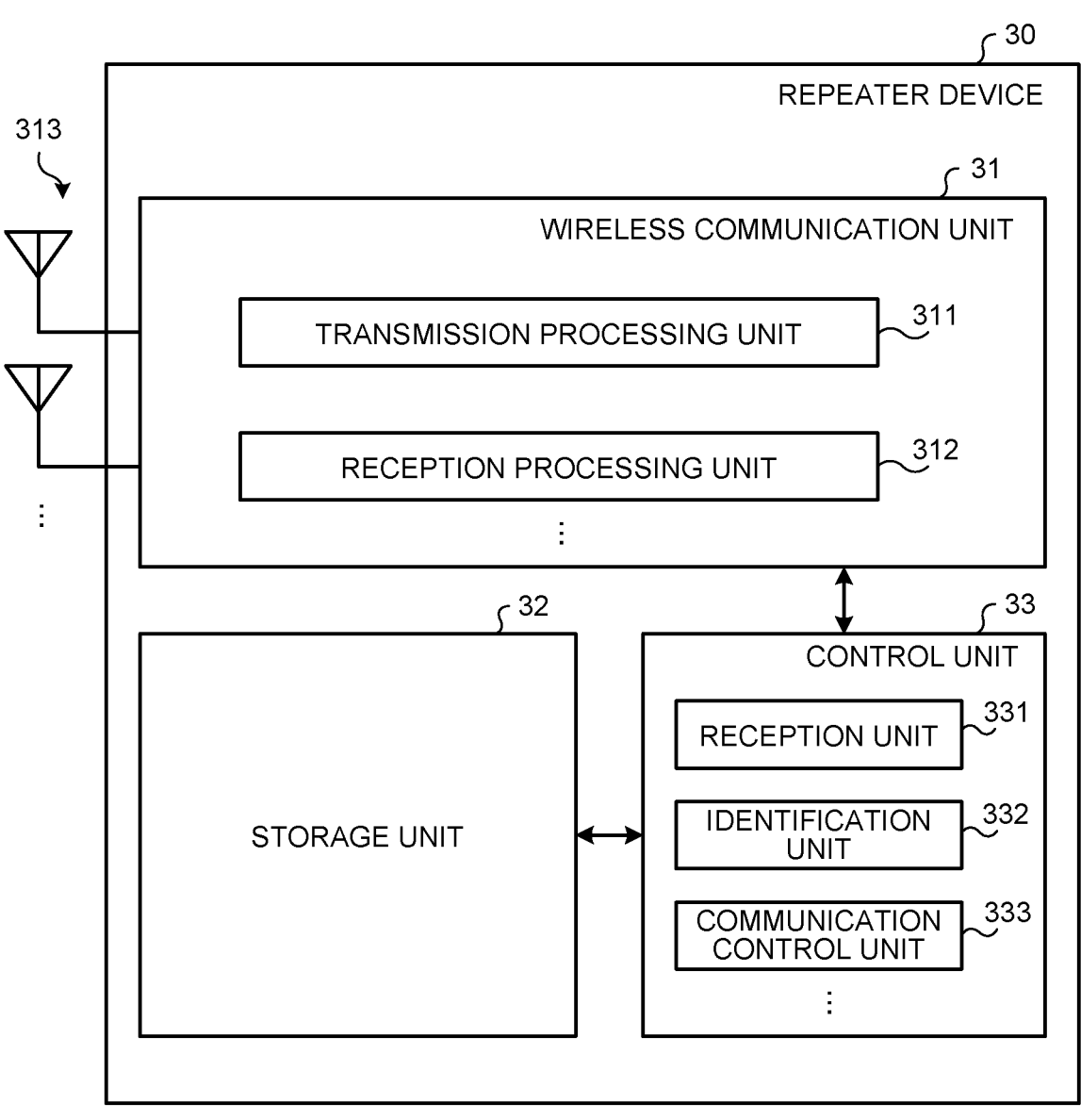
FIG. 17 is a diagram illustrating an exemplary configuration of a repeater device according to an embodiment of the present disclosure.

FIG. 17 is a diagram illustrating an exemplary configuration of the repeater device 30 according to an embodiment of the present disclosure. The repeater device 30 includes a wireless communication unit 31, a storage unit 32, and a control unit 33. Note that the configuration illustrated in FIG. 17 represents a functional configuration, and a hardware configuration may be different from this functional configuration. Furthermore, the functions of the repeater device 30 may be distributed, for implementation, to a plurality of physically separated configurations.

The wireless communication unit 31 is a wireless communication interface for wireless communication with other wireless communication devices (e.g., base station 20, terminal device 40, and another repeater device 30). The wireless communication unit 31 supports one or more radio access methods. For example, the wireless communication unit 31 supports both of NR and LTE. The wireless communication unit 31 may support W-CDMA or cdma3000 in addition to NR and LTE. The wireless communication unit 31 includes a transmission processing unit 311, a reception processing unit 312, and an antenna 313. The wireless communication unit 31 may include a plurality of the transmission processing units 311, the reception processing units 312, and the antennas 313. Note that in a case where the wireless communication unit 31 supports a plurality of the radio access methods, the units of the wireless communication unit 31 can be configured for each of the radio access methods. For example, the transmission processing unit 311 and the reception processing unit 312 may be individually configured for each of the LTE and NR. The configurations of the transmission processing unit 311, the reception processing unit 312, and the antenna 313 are similar to the configurations of the transmission processing unit 211, the reception processing unit 212, and the antenna 213 which are described above. Note that the wireless communication unit 31 may be configured to perform beamforming, as in the wireless communication unit 21.

The storage unit 32 is a data readable/writable storage device such as DRAM, SRAM, a flash memory, or hard disk. The storage unit 32 functions as storage means for the repeater device 30.

The control unit 33 is a controller that controls the units of the repeater device 30. The control unit 33 is implemented by a processor such as CPU or MPU. For example, the control unit 33 is implemented by executing various programs stored in the storage device in the repeater device 30 by the processor, with RAM or the like as a work area. Note that the control unit 33 may be implemented by an integrated circuit such as ASIC or FPGA. The CPU, MPU, ASIC, and FPGA can all be regarded as the controllers.

The control unit 33 includes a reception unit 331, an identification unit 332, and a communication control unit 333. Blocks (the reception unit 331 to the communication control unit 333) constituting the control unit 33 are functional blocks indicating functions of the control unit 33. These functional blocks may be software blocks or hardware blocks. For example, each of the functional blocks described above may be one software module implemented by software (including microprogram) or one circuit block on a semiconductor chip (die). As a matter of course, each functional block may be one processor or one integrated circuit. Note that the control unit 33 may be constituted by functional units different from the above functional blocks. Any configuration method is employed for the functional blocks.

<4-5. Configuration of Terminal Device>

Next, the configuration of the terminal device 40 will be described.

The terminal device 40 is a wireless communication device that wirelessly communicates with another communication device such as the base station 20, the repeater device 30, or the like. The terminal device is, for example, a mobile phone, smart device (smartphone or tablet), Personal Digital Assistant (PDA), or personal computer. Furthermore, the terminal device 40 may be a device, such as a business camera, provided with a communication function, or may be a motorcycle, a moving relay vehicle, or the like on which a communication device such as Field Pickup Unit (FPU) is mounted. Furthermore, the terminal device 40 may be a Machine to Machine (M2M) device or an Internet of Things (IoT) device.

Note that the terminal device 40 may be configured to perform NOMA communication with the base station 20. Furthermore, the terminal device 40 may be configured to use the automatic retransmission technology such as HARQ upon communication with the base station 20. Furthermore, the terminal device 40 may be configured to perform sidelink communication with another terminal device 40. The terminal device 40 may be configured to use the automatic retransmission technology such as HARQ upon the sidelink communication. Note that the terminal device 40 may be configured to perform NOMA communication also in communication (sidelink) with another terminal device 40. Furthermore, the terminal device 40 may be configured to perform LPWA communication with other communication devices (e.g., the base station 20, and another terminal device 40). In addition, wireless communication used by the terminal device 40 may be millimeter wave wireless communication. Note that wireless communication (including sidelink communication) used by the terminal device 40 may be wireless communication using radio waves or wireless communication using infrared or visible light (optical wireless communication).

Furthermore, the terminal device 40 may be a mobile device. Here, the mobile device is a movable wireless communication device. Furthermore, the terminal device 40 may be a wireless communication device installed on a mobile object or the mobile object itself. For example, the terminal device 40 may be Vehicle, such as an automobile, bus, truck, or motorcycle, moving on a road or may be Vehicle, such as train, moving on a track, or may be a wireless communication device mounted on such Vehicle. Note that the mobile object may be a mobile terminal, or may be a mobile object that moves on land (on the ground), under the ground, on the water, or under the water. Furthermore, the mobile object may be a mobile object that moves in the atmosphere, such as a drone or a helicopter, or may be a mobile object that moves above the atmosphere, such as an artificial satellite.

The terminal device 40 may be simultaneously connected to a plurality of base stations or a plurality of cells, for communication. For example, in a case where one base station supports a communication area via a plurality of cells (e.g., pCell and sCell), it is possible to combine the plurality of cells by a Carrier Aggregation (CA) technology, a Dual Connectivity (DC) technology, or a Multi-Connectivity (MC) technology, enabling communication between the base station 20 and the terminal device 40. Alternatively, it is also possible for the terminal device 40 and a plurality of the base stations 20 to perform communication with each other via cells of different base stations 20 by using a Coordinated Multi-Point Transmission and Reception (CoMP) technology.

Figure 18:
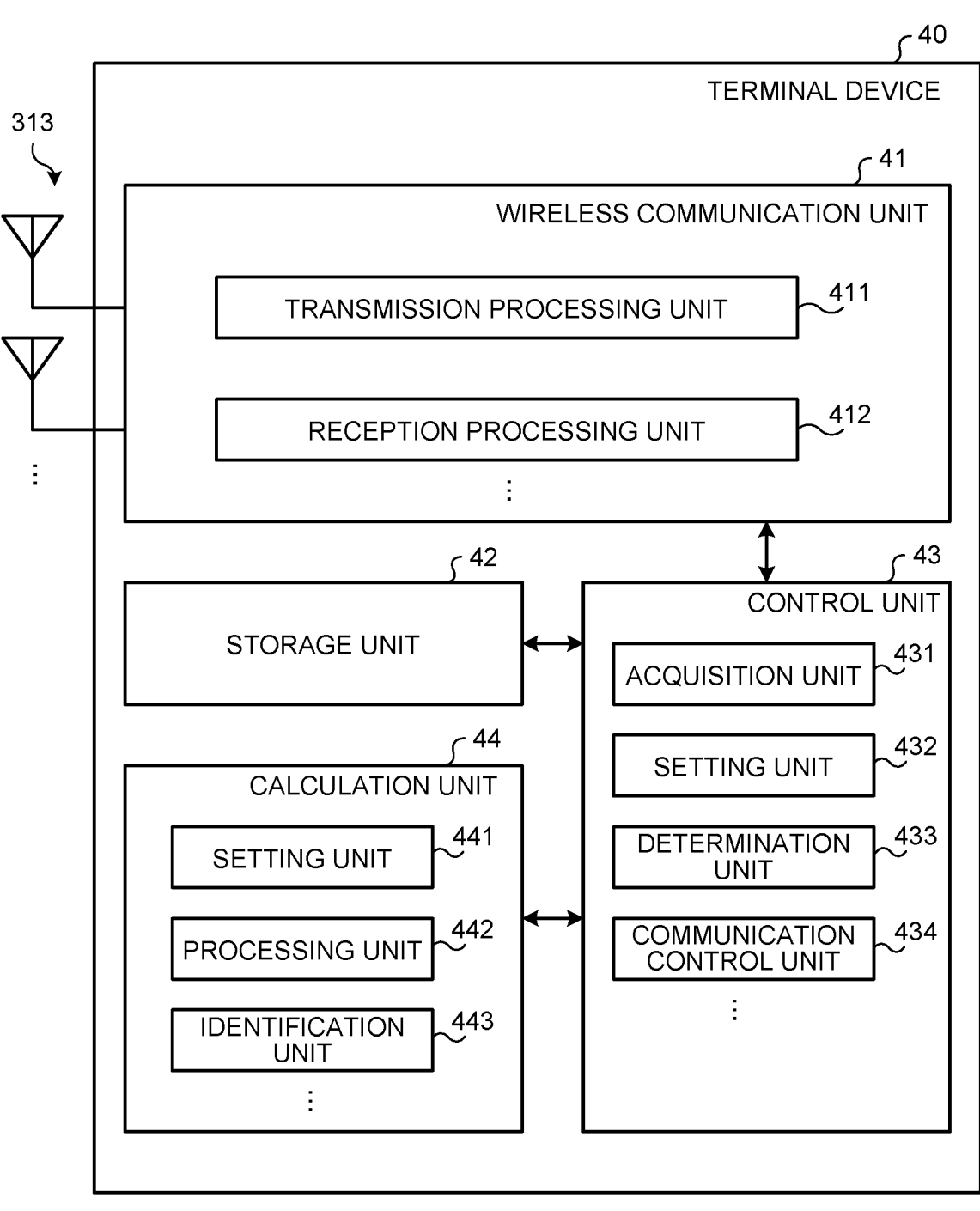
FIG. 18 is a diagram illustrating an exemplary configuration of a terminal device according to an embodiment of the present disclosure.

FIG. 18 is a diagram illustrating an exemplary configuration of the terminal device 40 according to an embodiment of the present disclosure. The terminal device 40 includes a wireless communication unit 41, a storage unit 42, and a control unit 43. Note that the configuration illustrated in FIG. 18 represents a functional configuration, and a hardware configuration may be different from this functional configuration. Furthermore, the functions of the terminal device 40 may be distributed, for implementation, to a plurality of physically separated configurations.

The wireless communication unit 41 is a signal processing unit for wireless communication with other wireless communication devices (e.g., the base station 20, the repeater device 30, and another terminal device 40). The wireless communication unit 41 operates according to the control of the control unit 43. The wireless communication unit 41 includes a transmission processing unit 411, a reception processing unit 412, and an antenna 413. The configurations of the wireless communication unit 41, the transmission processing unit 411, the reception processing unit 412, and the antenna 413 may be similar to those of the wireless communication unit 21, the transmission processing unit 211, the reception processing unit 212, and the antenna 213 of the base station 20. Furthermore, the wireless communication unit 41 may be configured to perform beamforming, as in the wireless communication unit 21.

The storage unit 42 is a data readable/writable storage device such as DRAM, SRAM, a flash memory, or hard disk. The storage unit 42 functions as storage means for the terminal device 40.

The control unit 43 is a controller that controls the units of the terminal device 40. The control unit 43 is implemented by a processor such as CPU or MPU. For example, the control unit 43 is implemented by executing various programs stored in the storage device in the terminal device 40 by the processor, with RAM or the like as a work area. Note that the control unit 43 may be implemented by an integrated circuit such as ASIC or FPGA. The CPU, MPU, ASIC, and FPGA can all be regarded as the controllers. Furthermore, the control unit 43 may be implemented by GPU in addition to or instead of CPU.

<4-6. NR Antenna Configuration>

Next, an NR antenna configuration will be described. In the following description, the NR antenna configuration will be described, taking the base station 20 as an example. Note that the NR antenna configuration described below is applicable not only to the base station 20 but also to the terminal device 40.

As the NR antenna configuration, a digital antenna configuration, an analog antenna configuration, and a hybrid antenna configuration are assumed. The hybrid antenna configuration is an antenna configuration in which the digital antenna configuration and the analog antenna configuration are combined. Hereinafter, these three antenna configurations will be described briefly.

(1) Digital Antenna Configuration

The digital antenna configuration is a configuration in which the antenna weight for each antenna element is controlled by a digital circuit (baseband region).

Figure 19:
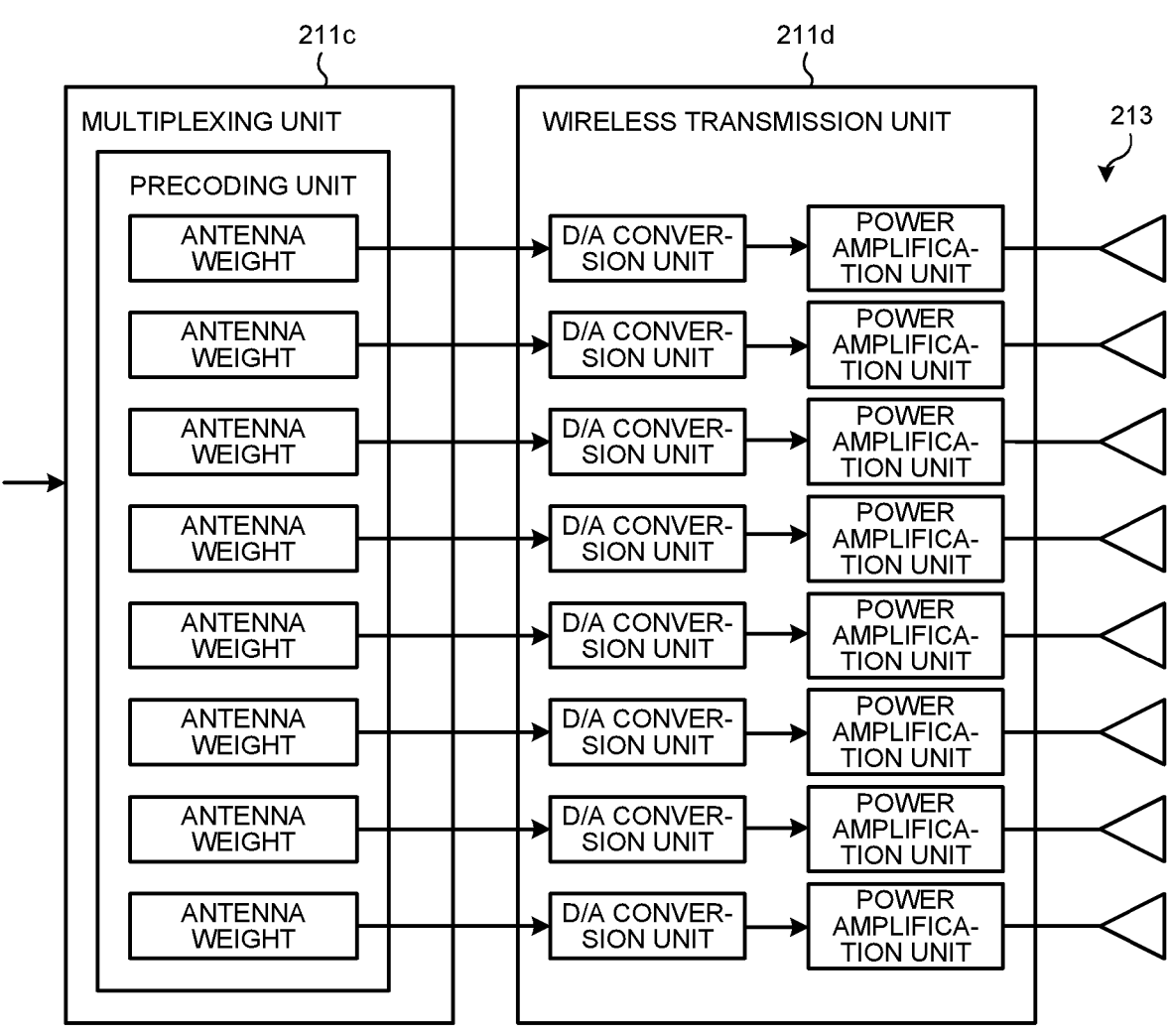
FIG. 19 is a block diagram illustrating a digital antenna configuration.

FIG. 19 is a block diagram illustrating the digital antenna configuration. FIG. 19 illustrates a multiplexing unit 211c, a wireless transmission unit 211d, and the antenna 213 in the configuration of the base station 20 of FIG. 16. Note that processing unnecessary for description of a basic configuration is omitted, but each unit includes the processing described in FIG. 16.

In the digital antenna configuration, the multiplexing unit 211c includes a precoding unit. The antenna weight is multiplied for each antenna element by the precoding unit, and a beam is formed.

In the digital antenna configuration, flexible phase control can be performed on each antenna element, generating different beams in a frequency domain. Meanwhile, the configuration is complicated.

(2) Analog Antenna Configuration

Figure 20:
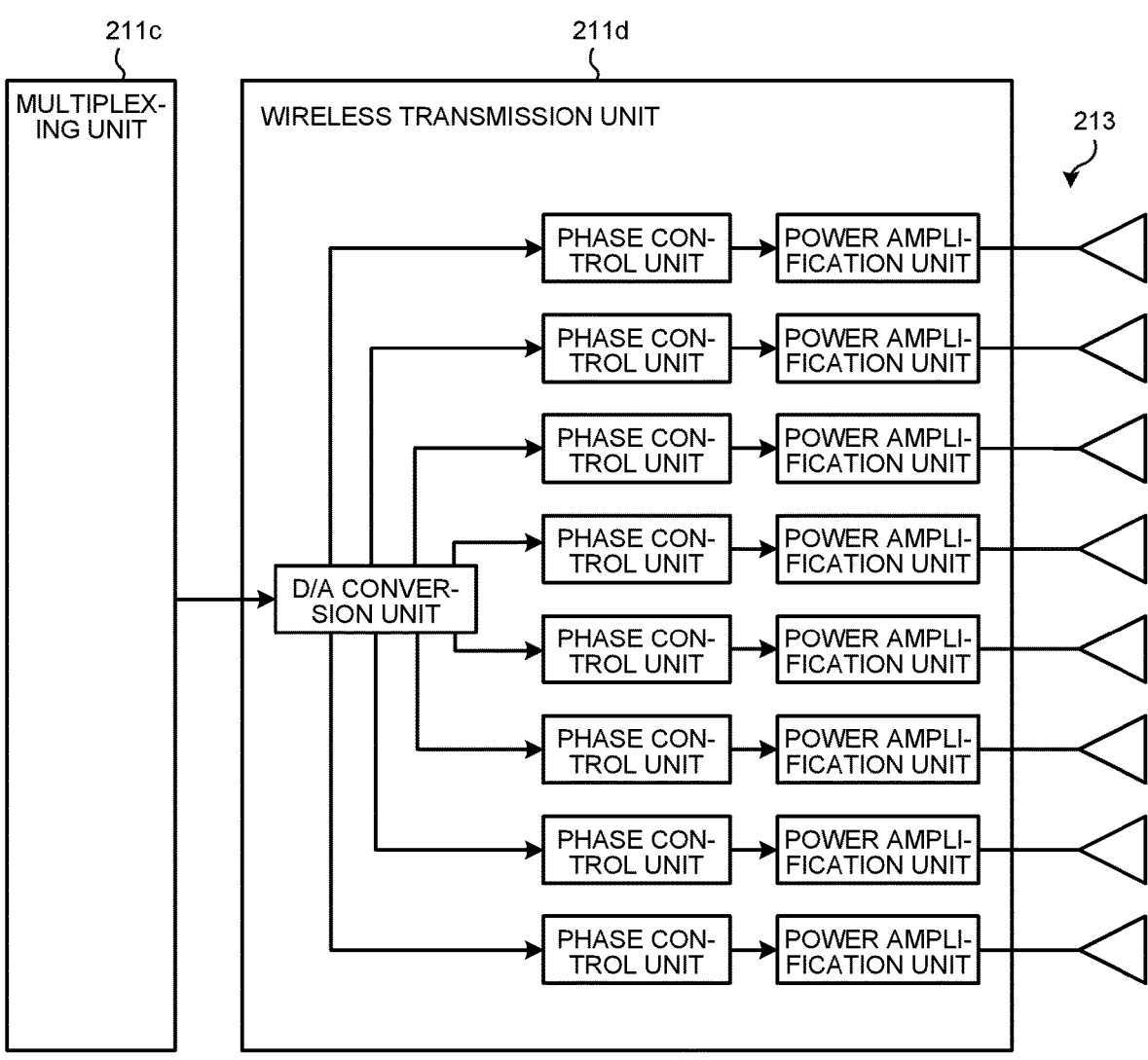
FIG. 20 is a block diagram illustrating an analog antenna configuration.

FIG. 20 is a block diagram illustrating the analog antenna configuration. FIG. 20 illustrates the multiplexing unit 211c, the wireless transmission unit 211d, and the antenna 213 in the configuration of the base station 20 of FIG. 16. Note that processing unnecessary for description of a basic configuration is omitted, but each unit includes the processing described in FIG. 16.

In the analog antenna configuration, the wireless transmission unit 211d includes a phase control unit. The phase control unit performs phase rotation for a signal in an analog domain (RF region), and a beam is formed. Control of the phase in the analog domain makes flexible beam control difficult, but the configuration is simplified. In one example, an antenna switching configuration is part of the analog antenna configuration.

(3) Hybrid Antenna Configuration

The hybrid antenna configuration is a configuration in which the digital antenna configuration and the analog antenna configuration are combined. The hybrid antenna configuration includes both of a phase control element in the analog domain and a phase control element in a digital domain. The hybrid antenna configuration has characteristics intermediate between the characteristics of the digital antenna configuration and the analog antenna configuration, in terms of beamforming performance and configuration complexity.

5. First Embodiment

The configuration of the communication system 1 has been described above. Next, the communication system 1 of the present embodiment will be described.

First, a first embodiment will be described. In the first embodiment, the base station 20 performs beam control for the repeater device 30. In the following description, the repeater device 30 is assumed to be a smart repeater. However, as described above, the repeater device 30 may be Intelligent Surface. The base station 20 is configured to communicate with the terminal device 40 via the repeater device 30. The repeater device 30 receives beam information from the base station 20. The beam information includes at least information about beam setting for access link (hereinafter, referred to as beam setting information or beam control information). In the present embodiment, the access link is a link between the repeater device 30 and the terminal device 40. The repeater device 30 controls an access link beam in the repeater device 30, on the basis of the beam setting information. Therefore, the access link beam from the repeater device 30 is appropriately controlled according to a communication environment between the repeater device 30 and the terminal device 40.

<5-1. Overview of Dynamic Beam Control for Access Link>

In the present embodiment, the access link beam from the repeater device 30 is dynamically controlled by Downlink Control Information (DCI) for the smart repeater. The DCI is a physical control signal and includes beam information for the access link. As described above, the beam information includes at least the beam setting information. The base station 20 transmits PDCCH to the repeater device 30 by using Fronthaul link. In the present embodiment, the Fronthaul link is a link between the base station 20 and the repeater device 30. PDCCH includes DCI including the beam setting information. The repeater device 30 decodes the PDCCH received from the base station 20 to acquire the beam setting information, and controls an access link beam, on the basis of the beam setting information.

Figure 21:
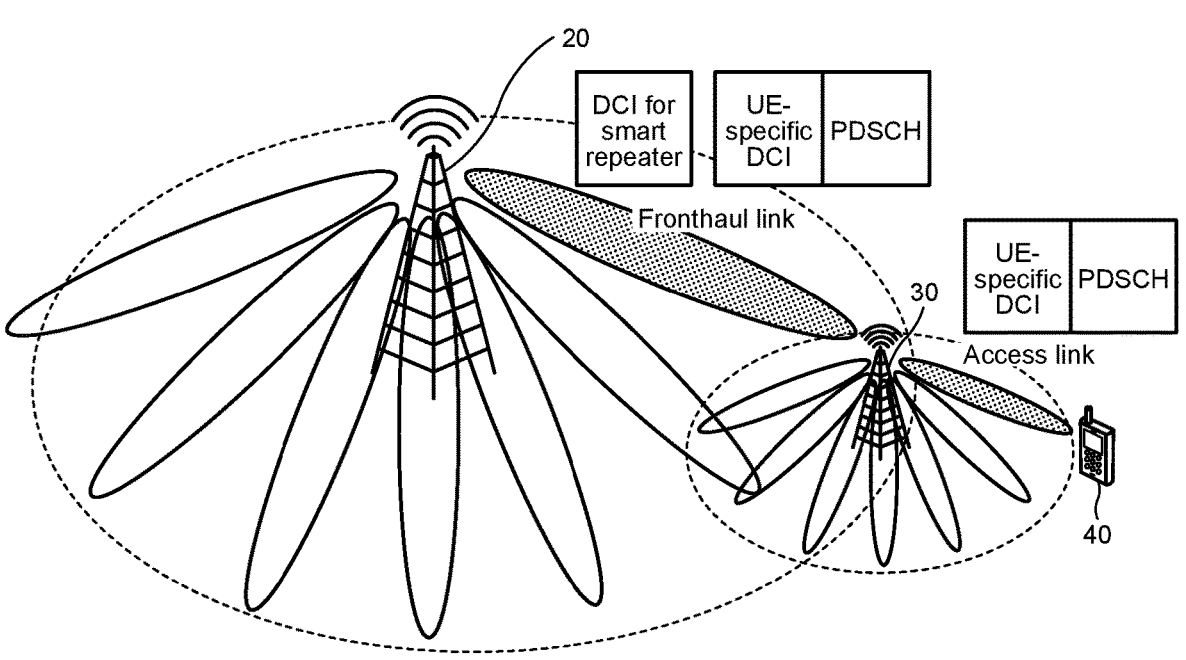
FIG. 21 is a diagram illustrating an example of access link beam control according to DCI.

FIG. 21 is a diagram illustrating an example of access link beam control according to DCI. The base station 20 transmits the DCI for the smart repeater, added to PDCCH, to the repeater device 30. The repeater device 30 acquires, from the received PDCCH, the beam setting information included in the DCI for the smart repeater. Then, the repeater device 30 receives, from the base station 20, PDCCH that includes terminal device-specific DCI and PDSCH that is scheduled with the terminal device-specific DCI. Then, the repeater device 30 transmits the received PDCCH and PDSCH to the terminal device 40 by using a beam based on the beam setting information.

<5-2. Dynamic Beam Control Sequence>

Although an overview of dynamic beam control for the access link has been described, a dynamic beam control sequence for the access link will be described below. The beam setting information transmitted from the base station 20 to the repeater device 30 includes at least one of beam information for the downstream access link and beam information for the upstream access link. The repeater device 30 performs dynamic beam control for downstream access link or upstream access link, on the basis of the beam setting information. Here, the downstream access link represents a downlink on the access link, and the upstream access link represents a downlink on the access link.

(1) Example of Dynamic Beam Control Sequence for Downstream Access Link

Figure 22:
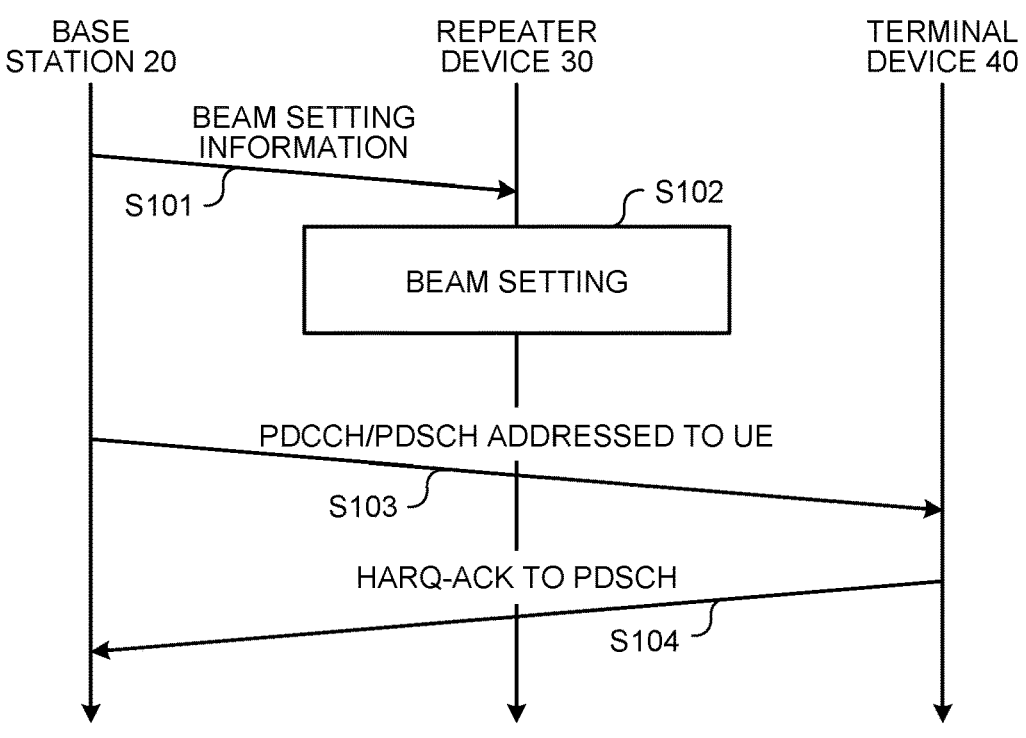
FIG. 22 is a diagram illustrating an example of a dynamic beam control sequence for a downstream access link.

First, a dynamic beam control sequence for the downstream access link will be described. FIG. 22 is a diagram illustrating an example of the dynamic beam control sequence for the downstream access link.

First, the base station 20 transmits the beam setting information for access link to the repeater device 30 (Step S101). The reception unit 331 of the repeater device 30 receives the beam setting information from the base station 20. The beam setting information includes beam setting information for the downstream access link. The beam setting information for the downstream access link may be added to the DCI and transmitted.

The repeater device 30 sets a beam for the downstream access link on the basis of the beam setting information received from the base station 20 (Step S102). The communication control unit 333 of the repeater device 30 controls the beam for the downstream access link on the basis of this setting.

Then, the base station 20 transmits PDCCH and PDSCH to the repeater device 30. Furthermore, the repeater device 30 transfers the PDCCH and PDSCH from the base station 20 to the terminal device 40 (Step S103).

The terminal device 40 receives the PDCCH and the PDSCH from the repeater device 30 and performs decoding. The terminal device 40 transmits HARQ-ACK to the smart repeater as a result of decoding the PDSCH. The repeater device 30 transfers the HARQ-ACK from the terminal device 40 to the base station 20 (Step S104).

(2) Example of Dynamic Beam Control Sequence for Upstream Access Link

Figure 23:
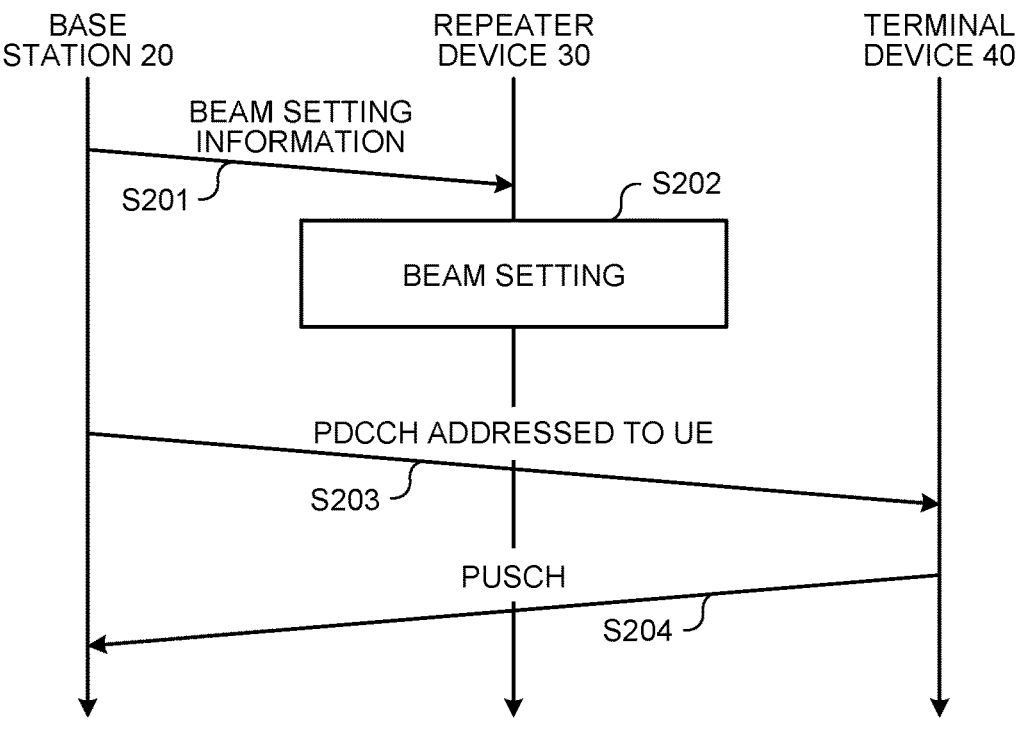
FIG. 23 is a diagram illustrating an example of a dynamic beam control sequence for a downstream access link link.

Next, a dynamic beam control sequence for the upstream access link will be described. FIG. 23 is a diagram illustrating an example of the dynamic beam control sequence for the downstream access link link.

First, the base station 20 transmits the beam setting information for access link to the repeater device 30 (Step S201). The reception unit 331 of the repeater device 30 receives the beam setting information from the base station 20. The beam setting information includes the beam information for the upstream access link. More specifically, the beam setting information includes beam setting information for the upstream access link. The beam setting information for the upstream access link may be included in DCI and transmitted. Furthermore, a DCI format including the beam setting information for the upstream access link may be different from a DCI format including the beam setting information for the downstream access link.

The repeater device 30 sets a beam for the upstream access link on the basis of the beam setting information received from the base station 20 (Step S202). The communication control unit 333 of the repeater device 30 controls the beam for the upstream access link on the basis of this setting.

Then, the base station 20 transmits PDCCH including an uplink grant to the repeater device 30. Furthermore, the repeater device 30 transfers the PDCCH including the uplink grant from the base station 20 to the terminal device 40 (Step S203).

The terminal device 40 receives the PDCCH including the uplink grant from the repeater device 30. The terminal device 40 transmits PUSCH to the repeater device 30 by using a resource indicated by the uplink grant. The repeater device 30 transfers the PUSCH from the terminal device 40 to the base station 20. (Step S204).

Figure 24:
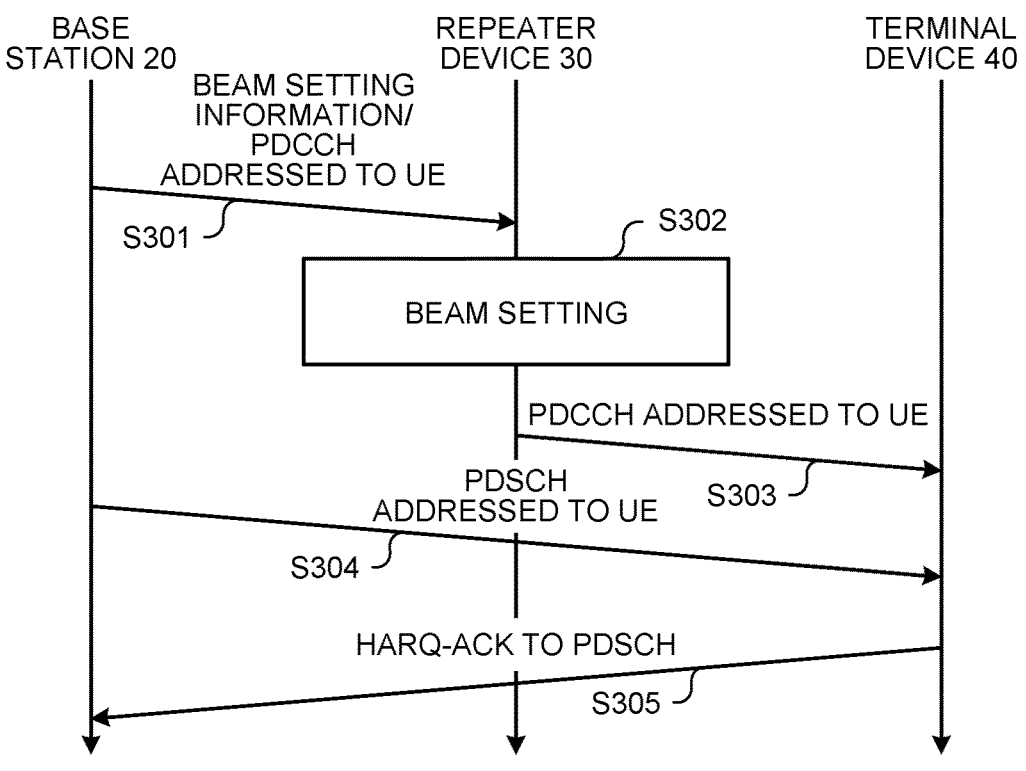
FIG. 24 is a diagram illustrating another example of the dynamic beam control sequence for a downstream access link.

(3) Another Example of Dynamic Beam Control Sequence for Downstream Access Link Next, another example of the dynamic beam control sequence for the downstream access link will be described. FIG. 24 is a diagram illustrating the another example of the dynamic beam control sequence for the downstream access link.

First, the base station 20 transmits the beam setting information for access link and PDCCH addressed to the terminal device 40, to the repeater device 30 (Step S101). The reception unit 331 of the repeater device 30 receives the beam setting information and the PDCCH addressed to the terminal device 40, from the base station 20. The beam setting information includes the beam information for the downstream access link. More specifically, the beam setting information includes the beam setting information for the downstream access link.

The repeater device 30 sets a beam for the downstream access link on the basis of the beam setting information received from the base station 20 (Step S102). The communication control unit 333 of the repeater device controls the beam for the downstream access link on the basis of this setting.

Then, the repeater device 30 transmits PDCCH addressed to the terminal device 40, to the terminal device (Step S303). In addition, the base station 20 transmits PDSCH scheduled by the PDCCH addressed to the terminal device 40, to the repeater device 30 (Step S304).

The repeater device 30 transfers the PDSCH from the base station 20 to the terminal device 40 (Step S305).

Figure 25:
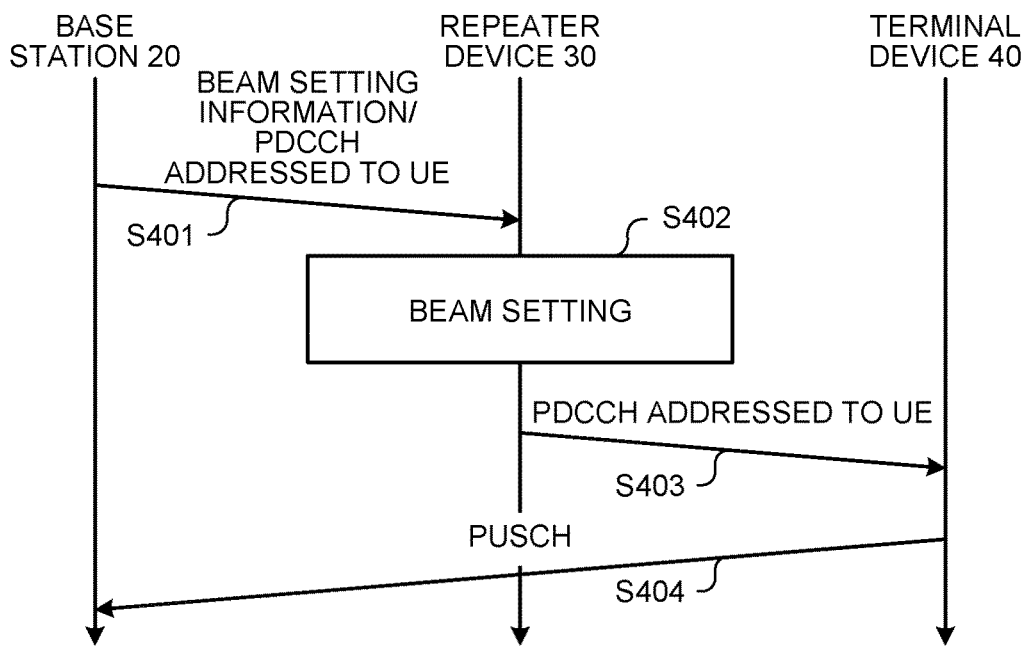
FIG. 25 is a diagram illustrating another example of the dynamic beam control sequence for a downstream access link link.

(4) Another Example of Dynamic Beam Control Sequence for Upstream Access Link Next, another example of the dynamic beam control sequence for the upstream access link will be described. FIG. 25 is a diagram illustrating the another example of the dynamic beam control sequence for downstream access link link.

First, the base station 20 transmits the beam setting information for access link and PDCCH including an uplink grant addressed to the terminal device 40, to the repeater device 30 (Step S401). The reception unit 331 of the repeater device 30 receives the beam setting information and the PDCCH including the uplink grant addressed to the terminal device 40, from the base station 20. The beam setting information includes the beam information for the upstream access link. More specifically, the beam setting information includes beam setting information for the upstream access link.

The repeater device 30 sets a beam for the upstream access link on the basis of the beam setting information received from the base station 20 (Step S402). The communication control unit 333 of the repeater device 30 controls the beam for the upstream access link on the basis of this setting.

Then, the repeater device 30 transmits the PDCCH including the uplink grant addressed to the terminal device 40, to the terminal device 40. (Step S403).

The terminal device 40 receives the PDCCH including the uplink grant from the repeater device 30. The terminal device 40 transmits PUSCH to the repeater device 30 by using a resource indicated by the uplink grant. The repeater device 30 transfers the PUSCH from the terminal device 40 to the base station 20. (Step S404).

<5-3. DCI for Smart Repeater>

Next, the DCI for the smart repeater will be described. The DCI for the smart repeater is defined by (1) terminal device-specific DCI (UE-specific DCI), (2) terminal group common DCI (UE-group common DCI), and the like.

(1) Terminal Device-Specific DCI

An example of the DCI for the smart repeater includes terminal device-specific DCI (smart repeater-specific DCI). The terminal device-specific DCI may include beam information about one or more beams.

In one example, information about one beam is included in the terminal device-specific DCI. The access link beam in the repeater device 30 is controlled on the basis of the beam information about one beam and the timing for beam application which is described later.

In another example, as shown in FIG. 26, beam information about beams corresponding to a plurality of slots is included in one terminal device-specific DCI. FIG. 26 is a diagram illustrating an exemplary configuration of the beam setting information according to the terminal device-specific DCI. In the present example, the beam setting information for slot #1 is inserted into a predetermined field at the head, and then, the beam setting information for each smart repeater (repeater device 30) corresponding to each field is sequentially inserted.

The types of the terminal device-specific DCI will be described.

(1-1) Downlink Assignment DCI

As an example of the terminal device-specific DCI for the smart repeater, downlink assignment DCI can be assumed. Specifically, for the terminal device-specific DCI, it can be assumed to use DCI format 1_0, DCI format 1_1, or DCI format 1_2. Note that, for the terminal device-specific DCI, DCI having the same number of bits as that of the DCI format 1_0, DCI format 1_1, or DCI format 1_2 may be used. Furthermore, a new DCI format (e.g., DCI format 1_3) may be used for the terminal device-specific DCI.

The downlink assignment DCI for the smart repeater includes at least information about a transmission beam used for transmission of PDCCH addressed to the terminal device 40 in the access link and PDSCH scheduled by the PDCCH, and/or a reception beam used for reception of PUCCH or PUSCH including HARQ-ACK corresponding to the PDSCH. The repeater device 30 uses these pieces of beam setting information to control the access link beam. Note that the downlink assignment DCI for the smart repeater may include resource information about PDSCH transmitted from the base station 20 to the repeater device 30.

The downlink assignment DCI for the smart repeater is arranged in a terminal device common search space (Common Search Space: CSS) or a terminal device-specific search space (UE-specific Search Space: USS). Smart Repeater-specific Search Space (SSS) may be defined so that the downlink assignment DCI may be arranged therein.

In one example, the downlink assignment DCI may be transmitted exclusively to the smart repeater. In a case where the DCI is transmitted exclusively to the smart repeater, at least one of Radio Network Temporary Indicator (RNTI), search space, and COntrol REsource Set (CORESET), different from that of the terminal device 40, is used. In this case, the downlink assignment DCI for the terminal device 40 is transmitted separately.

In another example, the downlink assignment DCI may be downlink assignment DCI for the terminal device 40. In this case, the downlink assignment DCI for the terminal device 40 includes beam setting information for access link of the repeater device 30, in addition to scheduling information for the terminal device 40.

(1-2) Uplink Grant DCI

As an example of the terminal device-specific DCI for the smart repeater, uplink grant DCI can be assumed. Specifically, for the terminal device-specific DCI, it can be assumed to use DCI format 0_0, DCI format 0_1, or DCI format 0_2. Note that, for the terminal device-specific DCI, DCI having the same number of bits as that of the DCI format 0_0, DCI format 0_1, or DCI format 0_2 may be used. Furthermore, a new DCI format (e.g., DCI format 0_3) may be used as the terminal device-specific DCI.

The uplink grant DCI for the smart repeater includes at least information about a transmission beam used for transmission of PDCCH addressed to the terminal device in the access link and/or a reception beam used for reception of PUSCH scheduled by the PDCCH. The repeater device 30 uses these pieces of beam setting information to control the access link beam. Note that the uplink grant DCI for the smart repeater may include resource information about PUSCH transferred from the smart repeater to the base station 20.

The uplink grant DCI for the smart repeater is arranged in the terminal device common search space (CSS: Common Search Space) or the terminal device-specific search space (USS: UE-specific Search Space). Note that the Smart Repeater-specific search space (SSS: Smart Repeater-specific Search Space) may be defined so that the uplink grant DCI may be arranged therein.

In one example, the uplink grant DCI may be transmitted exclusively to the smart repeater. In a case where the DCI is transmitted exclusively to the smart repeater, at least one of RNTI, search space, and CORESET, different from that of the terminal device 40, is used. In this case, the uplink grant DCI for the terminal device 40 is transmitted separately from the DCI dedicated to the smart repeater.

In another example, the uplink grant DCI may be uplink grant DCI for the terminal device 40. In this case, the uplink grant DCI for the terminal device 40 includes the beam setting information for access link of the repeater device 30, in addition to the scheduling information for the terminal device 40.

(2) Terminal Device Group Common DCI

An example of the DCI for the smart repeater includes terminal device group common DCI (smart repeater group common DCI). The terminal device group common DCI may include beam information about one or more beams for one or more smart repeaters.

In one example, as illustrated in FIG. 27, beam information addressed to a plurality of smart repeaters is included in one DCI. FIG. 27 is a diagram illustrating an exemplary configuration of beam setting information according to the terminal device group common DCI. In the present example, control information about a beam for a smart repeater #1 is inserted into a predetermined field at the head, and then, the beam setting information for each smart repeater (repeater device 30) corresponding to each field is sequentially inserted.

As an example of the terminal device group common DCI for the smart repeaters, a DCI format 2_0 can be assumed. The DCI format 2_0 carries Slot Format Indicator (SFI). The SFI specifies a downlink symbol, an uplink symbol, or a flexible symbol for a symbol in one or more slots. In the present example, SFI of the access link with the repeater device 30 is carried by the DCI format 2_0. In addition, the beam setting information for access link of the repeater device 30 is carried by the DCI format 2_0.

Note that, in one example, in the beam setting information for access link of the repeater device 30, the beam information for the access link of the smart repeater may be applied to all symbols, regardless of a direction indicated by the SFI.

Furthermore, in another example, the beam setting information for access link of the repeater device 30 may include a beam for the downlink and a beam for the uplink. Depending on a direction indicated by the SFI, the beam setting information for the upstream access link or downstream access link with the smart repeater may be applied.

Furthermore, in another example, the beam information for the access link with the smart repeater may be defined in association with one or more symbols or slots. For example, DCI may include beam information about 14 beams. The beam information about each beam corresponds to 14 symbols in a slot. For example, the DCI includes beam information about 10 beams. The beam information about each beam corresponds to 10 slots in a radio frame.

As an example of terminal group common DCI for the smart repeater, a new DCI format (e.g., DCI format 2_x (x is any integer)) can be assumed. The new DCI format is defined to control an access link beam in the repeater device 30. The new DCI format common to the terminal device groups includes at least beam setting information for access link.

(3) Sidelink DCI

As an example of the DCI for the smart repeater, sidelink DCI (e.g., DCI format 3_x (x is any integer)) is assumed. The sidelink DCI is used when a link between the base station 20 and the repeater device 30 is defined as a sidelink. The sidelink DCI includes at least beam setting information for the link between the repeater device 30 and the terminal device 40.

(4) Fronthaul Link DCI

As an example of the DCI for the smart repeater, DCI dedicated to the smart repeater (e.g., DCI format 4_x (x is any integer)) is assumed. The DCI dedicated to the smart repeater is used for a link (fronthaul link) between the base station 20 and the repeater device 30. The DCI dedicated to the smart repeater includes at least beam setting information for access link.

Note that the CRC scrambled by C-RNTI or by RNTI dedicated to the smart repeater (e.g., Smart Repeater (SR)-RNTI) is preferably added to the DCI transmitted to the repeater device 30. This configuration makes it possible for only predetermined one or more repeater devices 30 to receive the beam setting information, not controlling the other inappropriate terminal devices 40 and repeater devices 30 according to the beam setting information.

<5-4. Definition of Beam Information>

The beam information is defined as the following information. Note that the beam information includes the beam setting information for access link of the repeater device 30. The repeater device 30 determines an access link beam, on the basis of the beam setting information included in DCI.

(1) Beam Information for the Downstream Access Link

First, examples of beam information for the downstream access link will be described. Note that in the present embodiment, the beam for the downstream access link is a transmission beam from the repeater device 30 to the terminal device 40. The following (1-1) to (1-6) can be assumed as the beam information for the downstream access link.

(1-1) Information about Spatial Transmitter Characteristic

Transmission beam information about the repeater device 30 is defined as Spatial Transmitter characteristic. Specification of an index corresponding to the Spatial Transmitter characteristic makes it possible for the base station 20 to indicate a beam for the downstream access link for the repeater device 30. The repeater device 30 determines the beam for downstream access link on the basis of the information about the Spatial Transmitter characteristic.

As an example of the definition of the Spatial Transmitter characteristic, the direction (elevation angle and azimuth angle) and the width (half width and beam lobe) of the main lobe of a beam are assumed. Note that the direction of the main lobe may be determined by absolute coordinates based on a predetermined direction (e.g., North Pole, South Pole, etc.), or may be determined by relative coordinates based on a predetermined orientation (e.g., orientation of the antenna, orientation of the base station 20, etc.) of the repeater device 30.

As another example of the definition of the Spatial Transmitter characteristic, Transmitter (Tx) Beam peak direction is assumed. The Transmission Beam Peak direction may be defined as a direction in which a total component of Equivalent Isotropically Radiated Power (EIRP) is maximum.

In the present example, the repeater device 30 is configured to report the Spatial Transmitter characteristics of the repeater device 30 to the base station 20, as capability information. Examples of the capability information about the Spatial Transmitter characteristic include the number of beams, a beam shape (beam peak direction and beam width), beam pattern information, spherical coverage, and the like.

Furthermore, the repeater device 30 is configured so that valid Spatial Transmitter characteristic and invalid Spatial Transmitter characteristic are set by the base station 20. The base station 20 is configured to set the validity or invalidity of the beam corresponding to the Spatial Transmitter characteristic of the repeater device 30 by DCI, MAC CE, and/or RRC signaling. In a case where the Spatial Transmitter characteristic is indicated to be valid (enabled or activated), the repeater device 30 is allowed to use a transmission beam corresponding to the valid Spatial Transmitter characteristic for the downstream access link. On the other hand, when the Spatial Transmitter characteristic is indicated to be invalid (disabled or deactivated), the repeater device 30 is not allowed to use a transmission beam corresponding to the invalid Spatial Transmitter characteristic for the downstream access link.

(1-2) TCI (Transmission Configuration Indication)

The transmission beam information about the repeater device 30 is defined as Transmission Configuration Indication (TCI). For example, as the transmission beam information about the repeater device 30, a preset SS/PBCH block for the repeater device 30 or a QCL relationship between a CSI-RS port in the NZP CSI-RS resource and a beam is set. With the indication of the TCI state, the repeater device 30 determines the transmission beam for the access link.

The TCI state may be defined in the specification, may be set upon installing the repeater device 30, or may be set by the base station 20 by the RRC signaling. Here, the TCI state indicates QCL between the downlink reference signal (SS/PBCH block and CSI-RS port in NZP CSI-RS resource) from the repeater device 30 and another reference signal or physical channel DMRS.

(1-3) SS/PBCH Block Index

The transmission beam information about the repeater device 30 is defined on the basis of an SS/PBCH block index. For example, the repeater device 30 uses, on the basis of indication of a preset SS/PBCH block index for the repeater device 30 received from the base station 20, a beam identical to a SS/PBCH block corresponding to the index (having a QCL relationship), as the transmission beam for the access link.

In one example, it is possible for the repeater device 30 to report SS/PBCH block setting information about the repeater device 30 to the base station 20. Examples of the SS/PBCH block setting information about the repeater device 30 include a period of an SS/PBCH block, information about a valid or invalid SS/PBCH block in an SS/PBCH block burst, information about the SS/PBCH block and information about the transmission beam, and the like.

In another example, it is possible for the repeater device 30 to report capability information about the SS/PBCH block for the repeater device 30 to the base station 20. Then, the base station 20 is allowed to set the SS/PBCH block for the repeater device 30, on the basis of the capability information. Specifically, the base station 20 is allowed to set the period of the SS/PBCH block, the validity or invalidity of the SS/PBCH block in the SS/PBCH block burst, and/or a relationship (QCL) between the SS/PBCH block and the transmission beam, for the repeater device 30.

(1-4) NZP CSI-RS Resource ID

The transmission beam information about the repeater device 30 is defined on the basis of an NZP CSI-RS resource ID. For example, the repeater device 30 uses, on the basis of indication of a preset NZP CSI-RS resource ID received from the base station 20, a beam identical to a CSI-RS port in the NZP CSI-RS resource corresponding to the ID (having a QCL relationship), as the transmission beam for the access link.

In one example, it is possible for the repeater device 30 to report setting information about the NZP CSI-RS resource for the repeater device 30 to the base station 20. Examples of the setting information about the NZP CSI-RS resource for the repeater device 30 include a period of the NZP CSI-RS resource, arrangement of the NZP CSI-RS resource, information about the NZP CSI-RS port, information about the NZP CSI-RS port and information about the transmission beam, and the like.

In another example, it is possible for the repeater device 30 to report capability information about the NZP CSI-RS resource for the repeater device 30 to the base station 20. Then, on the basis of the capability information, the base station 20 is allowed to set the NZP CSI-RS resource for the repeater device 30.

(1-5) Antenna Port

The transmission beam information about the repeater device 30 is defined on the basis of an antenna port for the downlink reference signal. In the antenna ports for the downlink reference signals, CSI-RSs are defined starting with 3000, and SS/PBCH blocks are defined starting from 4000. For example, on the basis of indication of a preset SS/PBCH block for the repeater device 30 or antenna port number of NZP CSI-RS or an index associated with an antenna port number, received from the base station 20, the repeater device 30 uses a beam identical to the SS/PBCH block or NZP CSI-RS corresponding to the antenna port (having a QCL relationship), as the transmission beam for the access link.

(1-6) Information Specifying Terminal Device

The transmission beam information about the repeater device 30 is defined as information specifying a terminal device 40 (hereinafter, terminal specification information). The base station 20 notifies the repeater device 30 of the terminal specification information. The repeater device 30 sets an appropriate transmission beam on the basis of the received terminal specification information. The appropriate transmission beam may be preset, may be estimated by the repeater device 30, or may be indicated by the base station 20. Examples of the terminal specification information include C-RNTI and the like.

Note that, in a case where channel reciprocity holds and Spatial Transmitter characteristic and Spatial Receiver characteristic have a correspondence (beam correspondence), information about the transmission beam (beam for downstream access link) can be used to indicate the reception beam (beam for upstream access link). For example, the channel reciprocity holds at least in a TDD band, an unlicensed band, uplink and downlink the same in center frequency and bandwidth, an uplink channel and downlink channel having a correlation in characteristics, or the like.

(2) Beam Information for the Upstream Access Link

Next, examples of beam information for the upstream access link will be described. Note that in the present embodiment, the beam for upstream access link is a reception beam from the repeater device 30 to the terminal device 40. The following (2-1) to (2-3) can be assumed as the beam information for the downstream access link.

(2-1) Information about Spatial Receiver Characteristic

Reception beam information about the repeater device 30 is defined as Spatial Receiver characteristic. Specification of an index corresponding to the Spatial Receiver characteristic makes it possible to indicate a beam for upstream access link for the repeater device 30. The repeater device 30 determines the beam for upstream access link on the basis of the information about the Spatial Receiver characteristic.

As an example of the definition of the Spatial Receiver characteristic, the direction (elevation angle and azimuth angle) and the width (half width and beam lobe) of the main lobe of a beam are assumed. Note that the direction of the main lobe may be determined by absolute coordinates based on a predetermined direction (e.g., North Pole, South Pole, etc.), or may be determined by relative coordinates based on a predetermined orientation (e.g., orientation of the antenna, orientation of the base station 20, etc.) of the repeater device 30.

As another example of the definition of the Spatial Receiver characteristic, Receiver (Rx) Beam peak direction is assumed. The Receiver Beam peak direction is defined as a direction in which a total component of Equivalent Isotropically Radiated Power (EIRP) is maximum.

In the present example, the repeater device 30 is configured to report the Spatial Receiver characteristic of the repeater device 30 to the base station 20, as the capability information. Examples of the capability information about the Spatial Receiver characteristic include the number of beams, a beam shape (beam peak direction and beam width), beam pattern information, spherical coverage, and the like.

Furthermore, the repeater device 30 is configured so that valid Spatial Receiver characteristic and invalid Spatial Receiver characteristic are set by the base station 20. The base station 20 is configured to set the validity or invalidity of the beam corresponding to the Spatial Receiver characteristic of the repeater device 30 by DCI, MAC CE, and/or RRC signaling. In a case where the Spatial Receiver characteristic is indicated to be valid (enabled or activated), a transmission beam corresponding to the valid Spatial Receiver characteristic is allowed to be used for the upstream access link. On the other hand, when the Spatial Receiver characteristic is indicated to be invalid (disabled or deactivated), the reception beam corresponding to the invalid Spatial Receiver characteristic is not used for transmission on the upstream access link.

(2-2) SRI (SRS Resource Indicator)

The reception beam information about the repeater device 30 is defined by SRI. For example, on the basis of indication of an SRS index for the terminal device 40 received from the base station 20, the repeater device 30 uses a beam identical to SRS corresponding to the index (having a QCL relationship), as the reception beam for the access link.

(2-3) Information Specifying Terminal Device

The reception beam information about the repeater device 30 is defined as information specifying a terminal device 40. The base station 20 notifies the repeater device 30 of the information specifying a terminal device 40. The repeater device 30 sets an appropriate reception beam on the basis of the received information specifying a terminal device 40. The appropriate reception beam may be preset, may be estimated by the repeater device 30, or may be indicated by the base station 20. Examples of the information specifying a terminal device 40 include C-RNTI and the like.

Note that, in a case where channel reciprocity holds and Spatial Transmitter characteristic and Spatial Receiver characteristic have a correspondence (beam correspondence), information about the reception beam (beam for upstream access link) can be used to indicate the transmission beam (beam for downstream access link). For example, the channel reciprocity holds at least in a TDD band, an unlicensed band, uplink and downlink the same in center frequency and bandwidth, an uplink channel and downlink channel having a correlation in characteristics, or the like.

<5-5. Application Duration where Beam Setting is Applied>

For a beam indicated by DCI, an application duration where beam setting is applied may be provided. The repeater device 30 applies beam setting (transmission beam setting and/or reception beam setting) indicated by the DCI, to this application duration. In the other application durations, the repeater device 30 does not apply the beam setting indicated by the DCI. The control relating to application of beam setting is performed by, for example, the communication control unit 333 of the repeater device 30. Therefore, beam management in the access link by the base station 20 is facilitated, enabling more efficient operation of wireless communication.

Examples of a specifying method for the application duration where beam setting is applied, according to DCI information will be described below. As the specifying method, the following can be assumed: (1) specifying the application duration where beam setting is applied, according to the DCI information; and (2) specifying the application duration where beam setting is applied, on the basis of DCI transmission timing and a parameter.

(1) Specifying Application Duration where Beam Setting is Applied, According to DCI Information The base station 20 specifies the application duration where beam setting is applied, according to the DCI information. The DCI includes information explicitly or implicitly specifying the application duration where beam setting is applied (hereinafter, also referred to as information indicating the application duration where beam setting is applied). The identification unit 332 of the repeater device 30 identifies the application duration where beam setting is applied, on the basis of the information included in the DCI. The communication control unit 333 of the repeater device 30 applies a transmission beam and/or a reception beam specified by the base station 20, only for the identified duration.

Hereinafter, specific examples of the information indicating the application duration where beam setting is applied, included in DCI will be described. Note that the information indicating the application duration where beam setting is applied can be regarded as a type of beam information.

(1-1) Information Specifying One or More Consecutive Slots and/or Symbols

As an example of the information indicating the application duration where beam setting is applied, included in DCI, information specifying one or more consecutive slots and/or symbols can be considered. DCI includes information indicating consecutive slots and/or symbols. To a section indicated by the information indicating consecutive slots and/or symbols, the repeater device 30 applies the transmission beam and/or the reception beam specified by the base station 20. In the other durations, the repeater device 30 does not apply the beam specified by the base station 20.

Figure 28:
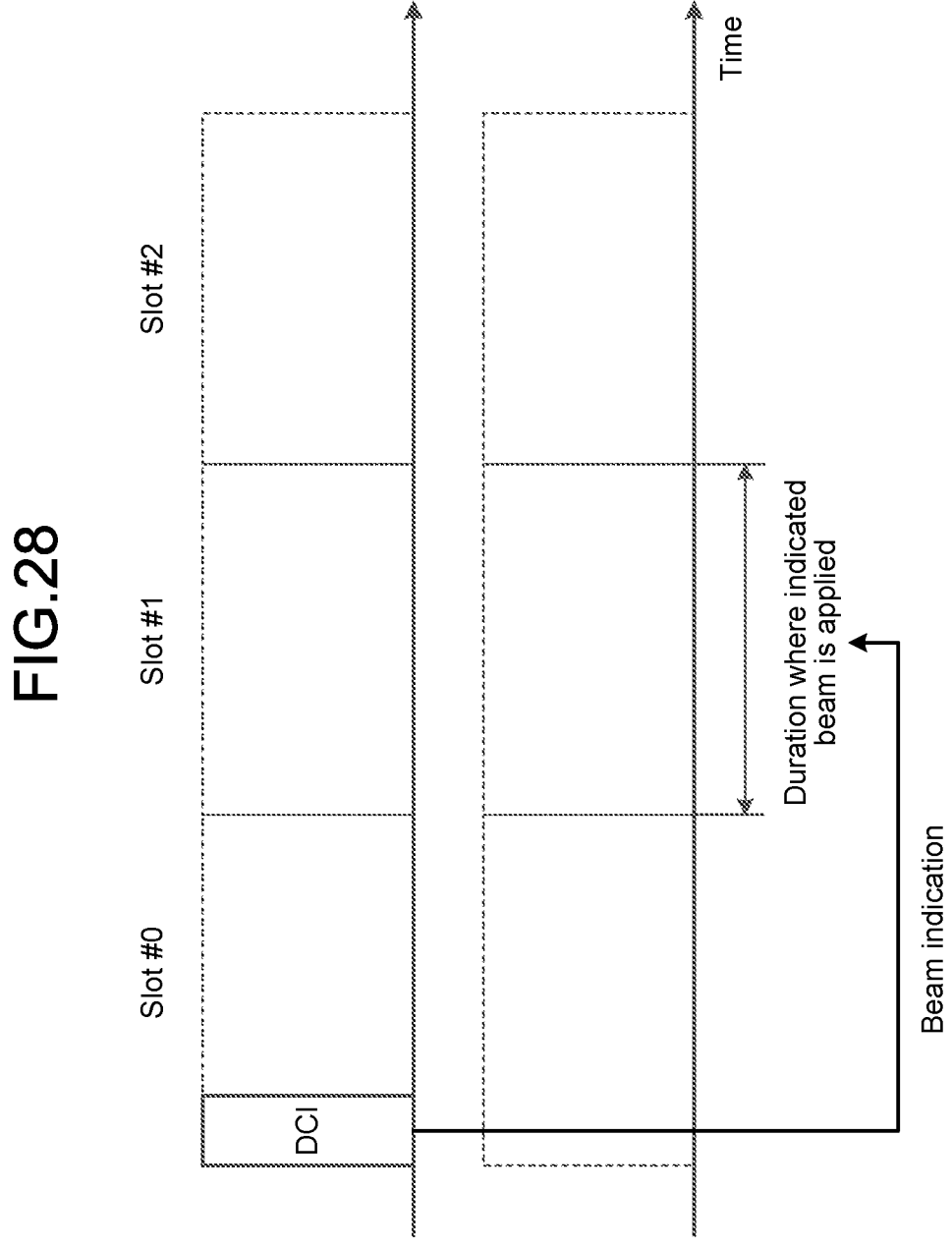
FIG. 28 is a diagram illustrating an example of information indicating an application duration where beam setting is applied, according to DCI.

FIG. 28 is a diagram illustrating an example of information indicating the application duration where beam setting is applied according to DCI. In the example of FIG. 28, the DCI including the beam setting information and information about the beam application duration where slot #1 is indicated is transmitted in slot #0. The repeater device 30 receives the DCI and applies the beam indicated in the slot

1. In slots other than the slot #1 (here, slot #0 and slot #2), the indicated beam is not applied.

(1-2) Duration where Physical Channel Including Control Information and Data to be Transferred is Allocated As another example of the information indicating the application duration where beam setting is applied according to DCI, information about a duration where a physical channel including the control information and data to be transferred is allocated is considered.

(1-2-1) Specific Example 1

The information indicating the application duration where beam setting is applied according to DCI may be information about a duration where PDCCH and PDSCH to be transferred to the access link are allocated and a duration where PUCCH or PUSCH including HARQ-ACK corresponding to the PDSCH is allocated. DCI for the repeater device 30 includes information about a transmission duration of the PDCCH to be transferred and a transmission duration of the PDSCH to be transferred. Information about the transmission duration of the PDCCH to be transferred is, for example, information about a slot to which the PDCCH to be transferred is transmitted and CORESET in which the PDCCH to be transferred is positioned (the number of symbols of CORESET). The information about the transmission duration of the PDSCH to be transferred is, for example, information about PDSCH time domain resource allocation (TDRA). Information about TDRA is expressed by Start and length Indicator Value (SLIV) that is information indicating a combination of a start symbol and a symbol length.

Figure 29:
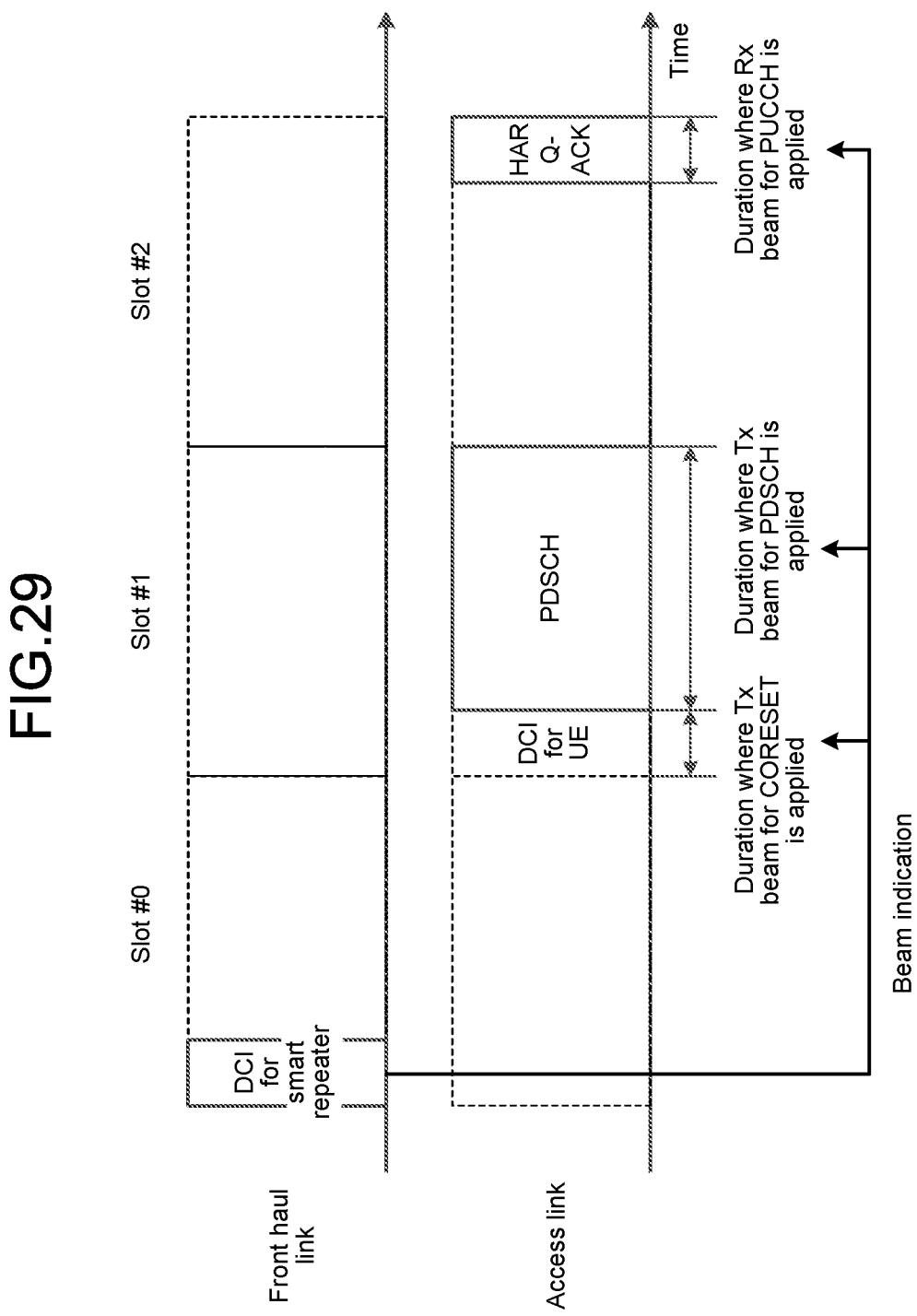
FIG. 29 is a diagram illustrating another example of information indicating an application duration where beam setting is applied, according to DCI.

FIG. 29 is a diagram illustrating another example of the information indicating the application duration where beam setting is applied according to DCI. In the example of FIG. 29, the base station 20 transmits DCI including at least one of the following (A1) to (A6) to the repeater device 30 in slot #0.

(A1) Beam setting information corresponding to CORESET in which PDCCH including DCI addressed to the terminal device 40 is arranged (A2) Beam setting information corresponding to PDSCH (A3) Beam setting information corresponding to PUCCH including HARQ-ACK (A4) CORESET resource information (A5) PDSCH scheduling information (A6) PUCCH resource information The repeater device 30 receives DCI and applies beams indicated in the following durations (B1) to (B5). The repeater device 30 does not apply a beam indicated by the base station 20, in a duration other than these durations.

(B1) A duration of CORESET in which PDCCH including DCI addressed to the terminal device 40, scheduled in slot #1 is arranged (B2) A duration of PDSCH addressed to the terminal device 40 scheduled in slot #1

(B3) A duration of PUCCH including HARQ-ACK scheduled in slot #2

(1-2-1) Specific Example 2

The information indicating the application duration where beam setting is applied according to DCI may be information about a duration where PDCCH to be transferred to the access link is allocated and a duration where PUSCH is allocated. DCI for the smart repeater includes the information about the transmission duration of the PDCCH to be transferred and a reception duration of PUSCH to be transferred. The transmission duration of the PDCCH to be transferred is, for example, information about a slot to which the PDCCH to be transferred is transmitted and CORESET in which the PDCCH to be transferred is positioned (the number of symbols of CORESET). The reception period of the PUSCH to be transferred is, for example, information about PUSCH time domain resource allocation (TDRA).

Figure 30:
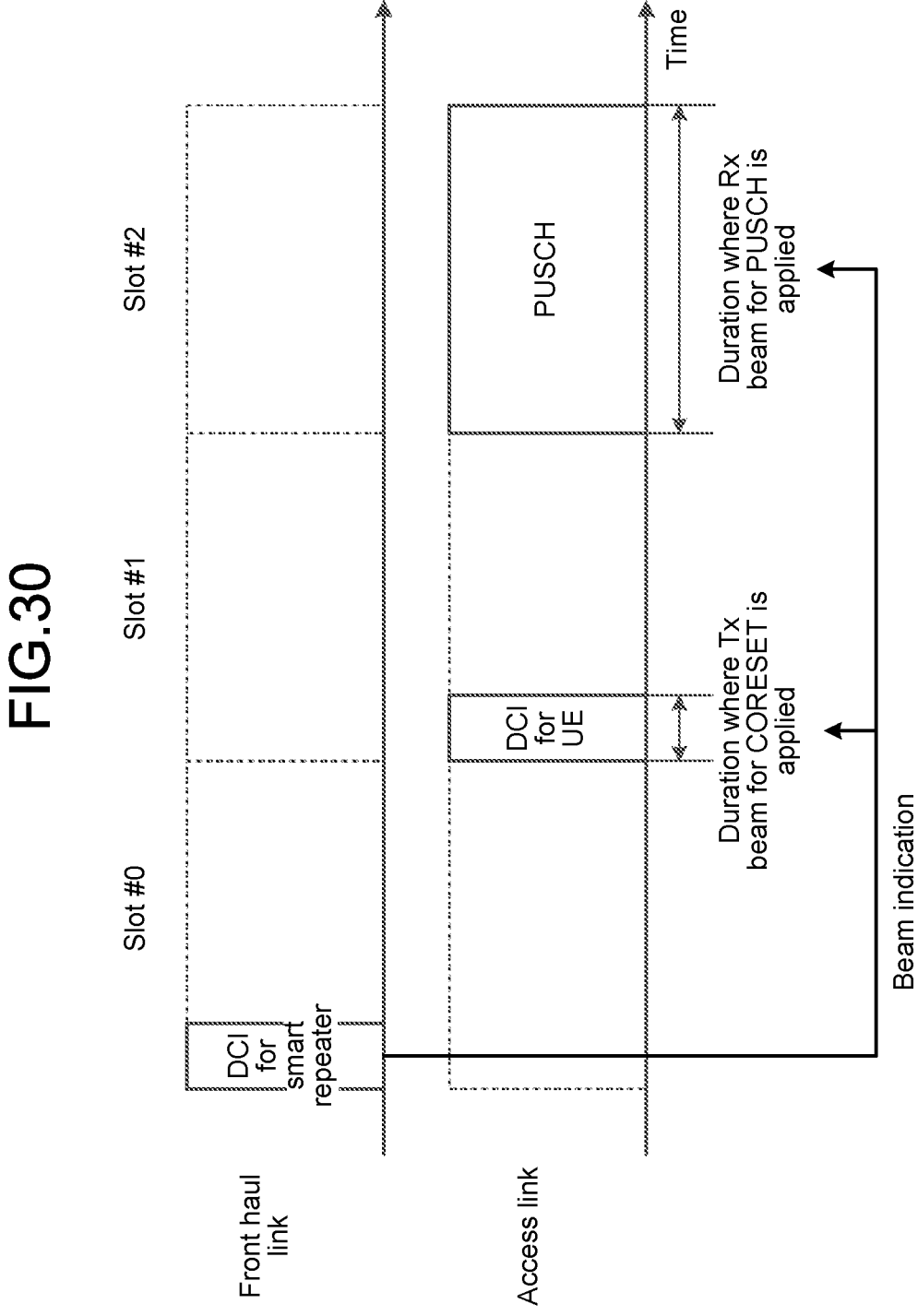
FIG. 30 is a diagram illustrating an example of information indicating an application duration where beam setting is applied according to DCI.

FIG. 30 is a diagram illustrating an example of information indicating the application duration where beam setting is applied according to DCI. In the example of FIG. 30, the base station 20 transmits DCI including at least one of the following (C1) to (C6) to the repeater device 30 in slot #0.

(C1) Beam setting information corresponding to CORESET in which PDCCH including DCI addressed to the terminal device 40 is arranged (C2) Beam setting information corresponding to PUSCH (C3) CORESET resource information (C4) PUSCH scheduling information The repeater device 30 receives DCI and applies beams indicated in the following durations (D1) to (D2). The repeater device 30 does not apply a beam indicated, in a duration other than these durations.

(D1) A duration of CORESET in which PDCCH including DCI addressed to the terminal device 40, scheduled in slot #1 is arranged (D2) A duration of PUSCH of the terminal device 40 scheduled in slot #2

(2) Specifying Application Duration where Beam Setting is Applied, Based on DCI Transmission Timing and Parameter The application duration where beam setting is applied can also be specified on the basis of DCI transmission timing and another parameter. The identification unit 332 of the repeater device 30 identifies the application duration where beam setting is applied, on the basis of the DCI transmission timing and the another parameter. The communication control unit 333 of the repeater device 30 applies a transmission beam and/or a reception beam indicated by the DCI, only in the identified period. The repeater device 30 does not apply the transmission beam and/or the reception beam indicated by the DCI in the other durations.

Hereinafter, specific examples of a method of specifying the application duration where beam setting is applied, on the basis of DCI transmission timing and a parameter are described.

(2-1) Specifying Application Duration where Beam Setting is Applied by Timer The application duration where beam setting is applied is specified on the basis of the DCI transmission timing and a timer. The repeater device 30 starts the timer after receiving the DCI including the beam setting information. Alternatively, the repeater device 30 starts the timer after a predetermined offset duration from the reception of the DCI including the beam setting information. The predetermined offset duration may be 0. The repeater device 30 applies a beam indicated by the DCI for a duration from the start of the timer to the expiration of the timer. On the other hand, the repeater device 30 does not apply the beam indicated by the DCI after the expiration of the timer.

The timer for determining the application duration where beam setting is applied is reduced in predetermined units. The predetermined unit may be a time unit. For example, the predetermined unit may be a radio frame unit, a subframe unit, a slot unit, or a symbol unit. Furthermore, the predetermined unit may be the number of times. For example, the predetermined unit may be the number of CORESET occasions or the number of times of arrangement in the search space. The initial value of the timer for determining the application duration where beam setting is applied may be preset, or may be set by an upper layer (e.g., RRC signaling).

The timer for determining the application duration where beam setting is applied may be a dedicated timer defined for determining the application duration where beam setting is applied. For example, the timer may be a beam setting timer or a beam inactive timer. In addition, the timer for determining the application duration where beam setting is applied may be a timer used for the other applications. For example, the timer may be a Bandwidth Part (BWP) inactive timer or a Search Space (SS) switching timer. Note that the BWP inactive timer determines the application duration where beam setting is applied at the same time as an application duration of Active BWP. With the start of the BWP inactive timer, the BWP is switched to a predetermined BWP. Then, the access link beam in the corresponding repeater device 30 is applied in the switched BWP. When the BWP inactive timer expires, the switched BWP falls back to a default BWP and the application of the specified beam setting is stopped.

When new beam setting information is received while the timer for determining the application duration where beam setting is applied is running, the beam setting is updated, and the value of the timer for determining the application duration where beam setting is applied is initialized.

Figure 31:
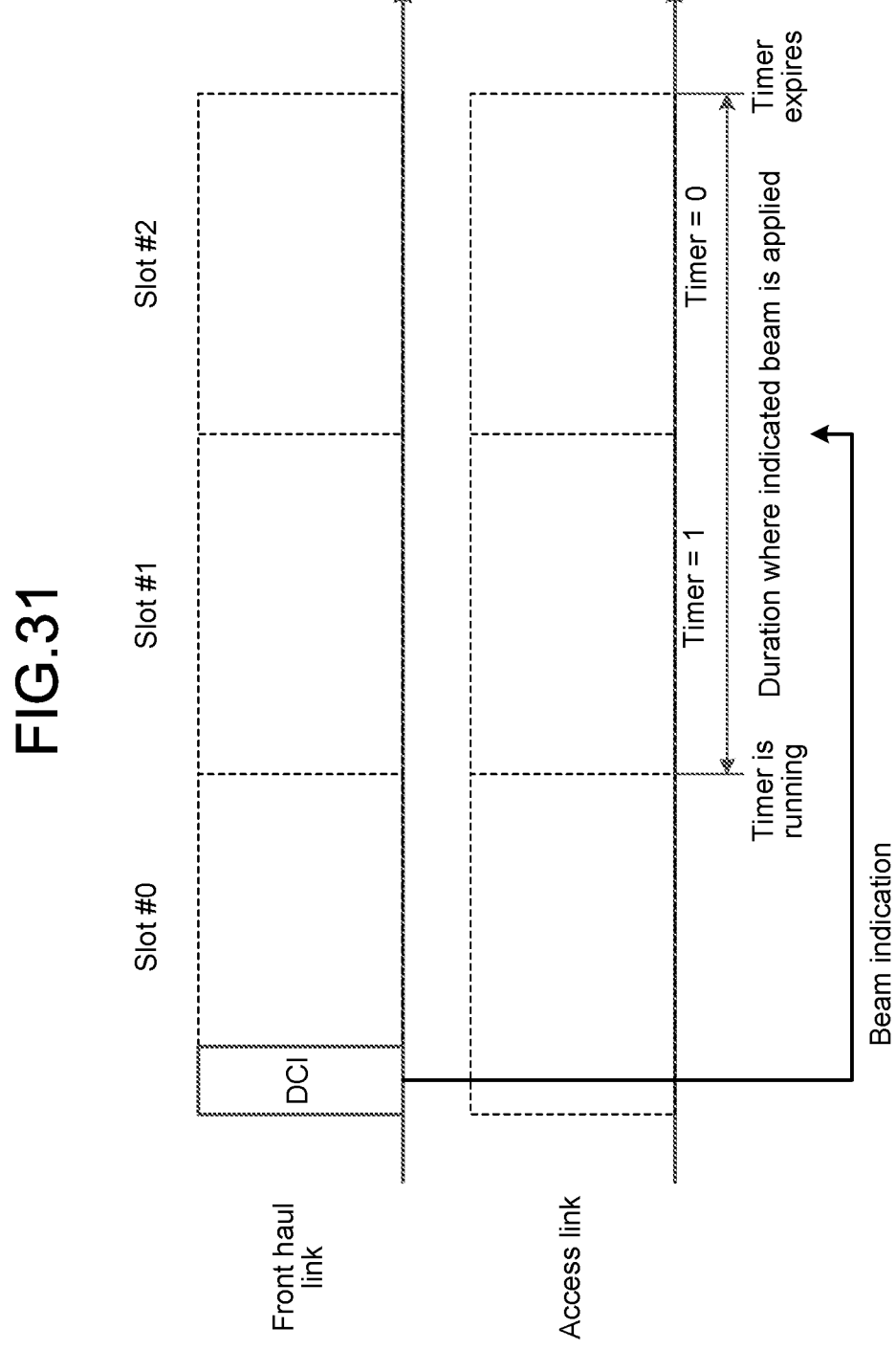
FIG. 31 is a diagram illustrating how an application duration where beam setting is applied is specified on the basis of DCI transmission timing and a parameter.

FIG. 31 is a diagram illustrating how the application duration where beam setting is applied is specified on the basis of the DCI transmission timing and a parameter. After receiving the DCI including the beam setting information, the repeater device 30 starts application of the beam setting and starts the timer after a predetermined period. In the example of FIG. 31, after receiving the DCI including the beam setting information in slot #0, the repeater device 30 starts application of the beam setting and starts the timer in the beginning of slot #1 that is the next slot. In the example of FIG. 31, the timer starts at 1 and decreases by one in each slot. Then, the repeater device 30 stops the application of the beam setting behind slot #2 that is a slot in which the timer becomes zero (slot in which the timer expires).

(2-2) Specifying Application Duration where Beam Setting is Applied Based on Predetermined Timing The application duration where beam setting is applied is indicated on the basis of the DCI transmission timing and predetermined timing. The repeater device 30 applies a beam indicated by the DCI, in a duration between reception of the DCI including the beam setting information and the predetermined timing determined in advance. Alternatively, the repeater device 30 applies the beam indicated by the DCI, in a duration from the time after a predetermined offset duration subsequent to reception of the DCI including the beam setting information to the predetermined timing determined in advance. The predetermined offset duration may be 0. On the other hand, in the other durations, the repeater device 30 does not apply the beam indicated by the DCI.

Hereinafter, specific examples of specifying the application duration where beam setting is applied, on the basis of predetermined timing will be described.

(2-2-1) from Reception of DCI Including Beam Information to Reception of DCI Including Next Beam Information In a duration from the time after a predetermined offset duration subsequent to reception of DCI including the beam setting information to a time after a predetermined offset duration subsequent to reception of DCI including next beam information, the repeater device 30 applies the beam indicated by the DCI previously received. In other words, the beam indicated by the DCI previously received is continuously applied until the DCI including the next beam information is received.

Figure 32:
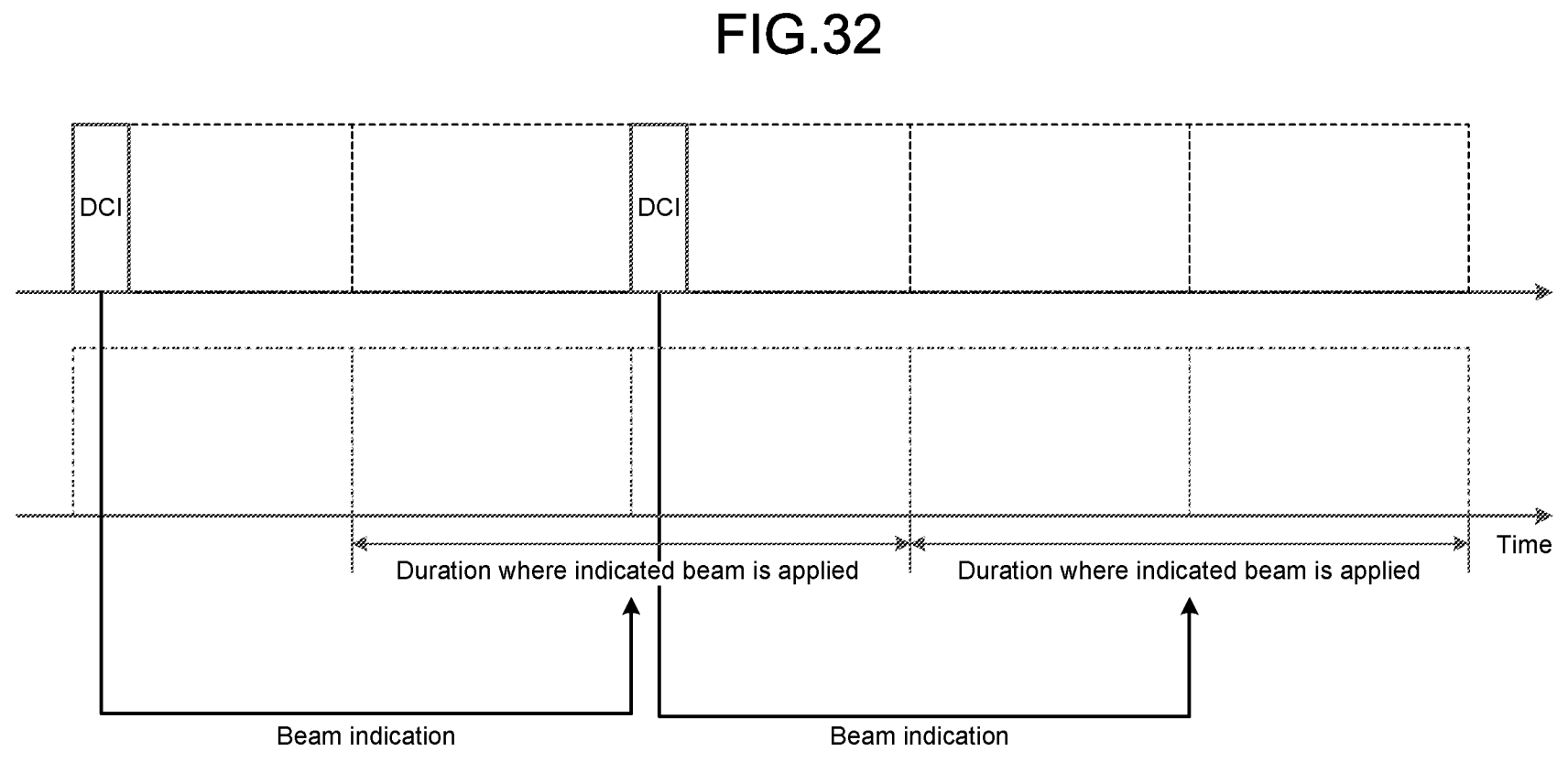

FIG. 32 is a diagram illustrating how an application duration where beam setting is applied is specified on the basis of DCI transmission timing. DCI including the beam setting information is transmitted in slot #0. The repeater device 30 controls the beam in the beginning of the slot #1, on the basis of the beam setting information received in the slot #0. Next, DCI including the next beam setting information is transmitted in slot #2. The repeater device 30 applies the beam setting previously received, until the beginning of the slot #2 that is the application timing of the next beam setting information. Thereafter, the repeater device 30 controls the beam on the basis of the beam setting information received in the slot #2.

(2-2-2) from Reception of DCI Including Beam Setting Information to PDCCH Monitoring Occasion for DCI Including Next Beam Setting Information In a duration from the time after a predetermined offset duration subsequent to reception of DCI including the beam setting information to a PDCCH monitoring occasion for the DCI including the next beam setting information, the repeater device 30 applies the beam indicated by the DCI previously received. In other words, regardless of whether to receive the next beam setting information, the beam indicated by the DCI previously received is continuously applied until the next PDCCH monitoring occasion.

The PDCCH monitoring occasion for the DCI including the beam setting information is an occasion in which the DCI including the beam setting information can be received. The PDCCH monitoring occasion is preferably set on the basis of a PDCCH monitoring period and time offset (e.g., monitoringSlotPeriodicityAndOffset). The PDCCH monitoring period may be set by using CORESET through which the DCI including the beam setting information is transmitted, or may be set by using setting information about the search space. For example, when a DCI format that can be included in the beam setting information is set in the setting information related to the search space, the beam setting information is applied on the basis of the PDCCH monitoring occasion.

Figure 33:
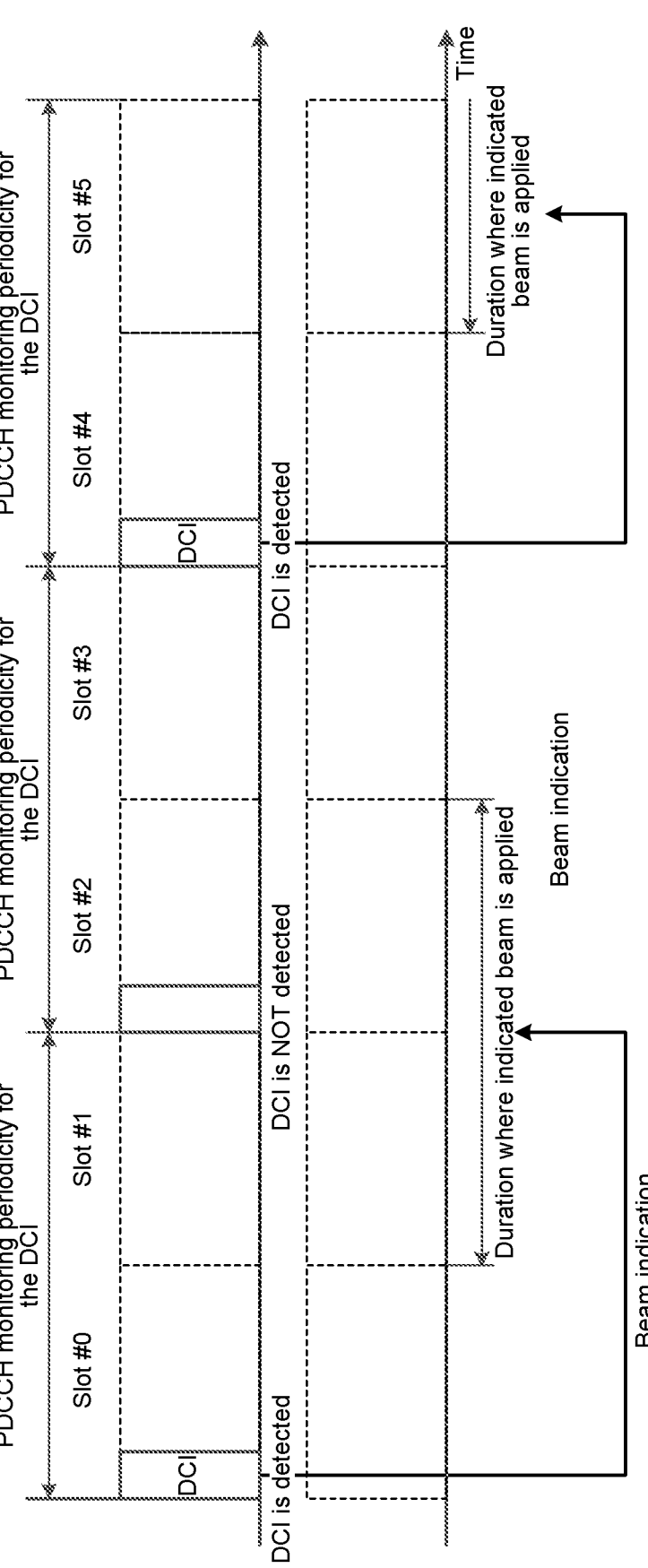
FIG. 33 is a diagram illustrating how an application duration where beam setting is applied is specified on the basis of a PDCCH monitoring period.

FIG. 33 is a diagram illustrating how the application duration where beam setting is applied is specified on the basis of the PDCCH monitoring period. DCI including the beam setting information is transmitted in slot #0. The repeater device 30 controls the beam in the beginning of the slot #1, on the basis of the beam setting information received in the slot #0. The beam to which the setting is applied is applied until the beginning of slot #3 in which an indication can be started on the basis of the next PDCCH monitoring occasion, regardless of whether to receive the DCI including the next beam setting information.

(2-2-3) from Reception of DCI Including Beam Setting Information to Fixed Timing The repeater device 30 applies a beam indicated by the DCI, in a duration between a time after the predetermined offset duration subsequent to reception of the DCI including the beam setting information to fixed timing. Examples of the fixed timing include a radio frame boundary, a half frame boundary, a subframe boundary, a slot boundary, and the like. After the fixed timing, the beam indicated by the DCI is not applied.

The fixed timing may be set in advance, may be defined in the specification, or may be set by an upper layer (RRC signaling). The fixed timing is preferably set on the basis of the period and the time offset, independently of PDCCH monitoring.

<5-6. Relay Timing>

Downlink physical signal/physical channel reception timing in the Fronthaul link and downlink physical signal/physical channel transmission timing in the access link may be independently indicated. In addition, uplink physical signal/physical channel transmission timing in the Fronthaul link and uplink physical signal/physical channel reception timing in the access link may also be indicated independently. In this configuration, the repeater device includes a buffer that holds the received downlink physical signal/physical channel and uplink physical signal/physical channel until the transmission timing.

Figure 34:
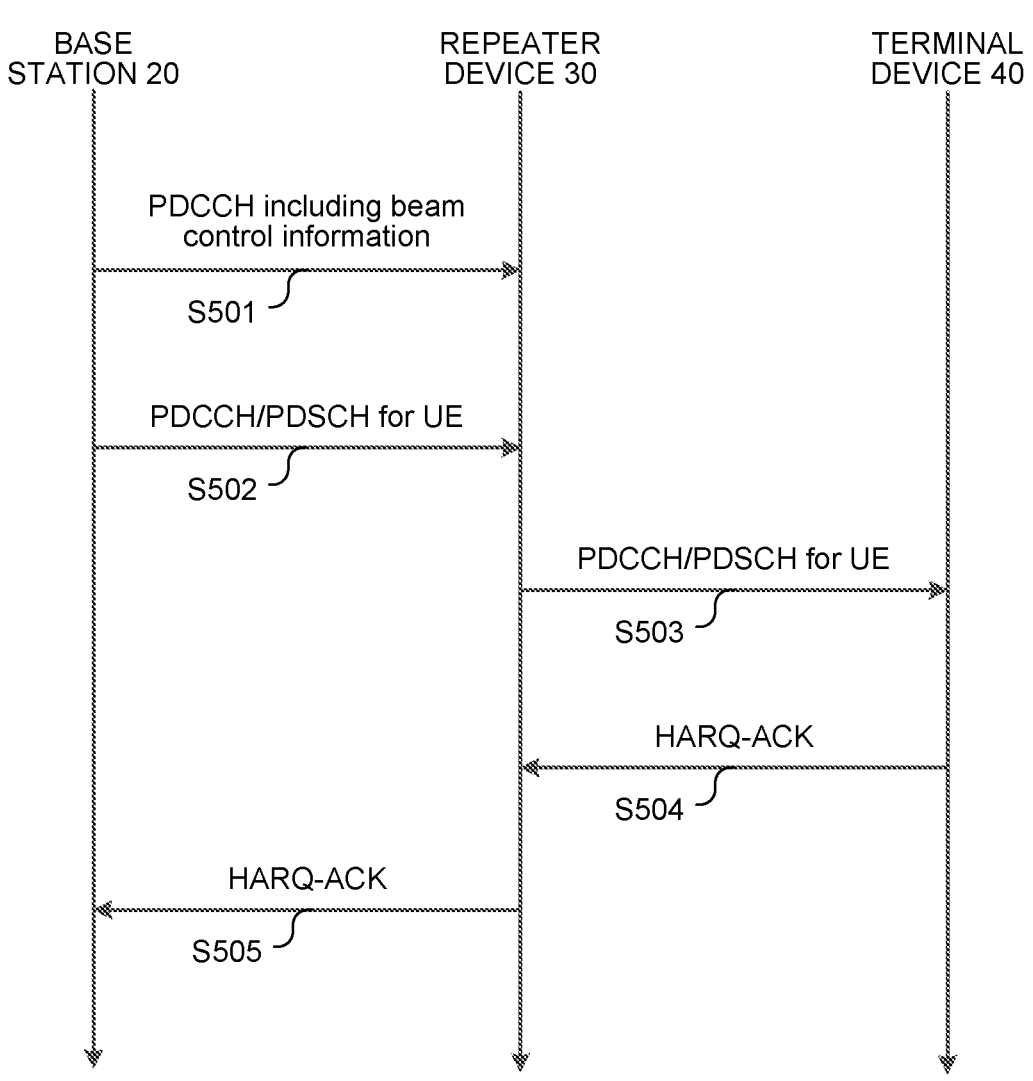
FIG. 34 is a sequence diagram illustrating physical signal/physical channel relay timing.

FIG. 34 is a sequence diagram illustrating physical signal/physical channel relay timing. After transmitting beam control information (beam setting information) to the repeater device 30 (Step S501), the base station 20 further transmits PDCCH/PDSCH addressed to the terminal device 40 to the repeater device 30 (Step S502). The repeater device 30 transmits the PDCCH/PDSCH addressed to the terminal device 40 to the terminal device at predetermined timing (Step S503). Upon receiving the PDCCH/PDSCH, the terminal device 40 transmits HARQ-ACK to the repeater device 30 (Step S504). The repeater device 30 transmits the HARQ-ACK to the base station 20 at predetermined timing (Step S505).

As illustrated in FIG. 34, the repeater device 30 may not immediately transfer the physical signal/physical channel received from the base station 20 to the terminal device 40. In other words, the timing at which the repeater device 30 receives the PDCCH/PDSCH addressed to the terminal device 40 from the base station 20 may be different from the timing at which the repeater device 30 transmits the PDCCH/PDSCH addressed to the terminal device to the terminal device 40. Furthermore, the timing at which the repeater device 30 receives the HARQ-ACK from the terminal device 40 may be different from the timing at which the repeater device 30 transmits the HARQ-ACK to the base station 20.

Relay timing may be indicated by the base station 20. For example, the reception unit 331 of the repeater device 30 receives information about indication of the relay timing (hereinafter, referred to as relay timing indication information) from the base station 20. Then, the communication control unit 333 of the repeater device relays information (physical signal/physical channel) at timing identified on the basis of the relay timing indication information.

Hereinafter, specific examples of the physical signal/physical channel relay timing will be described.

(1) Downlink Physical Signal/Physical Channel Reception Timing in Fronthaul Link In one example, the downlink physical signal/physical channel reception timing in the Fronthaul link may be indicated by DCI including the beam setting information. For example, a slot for reception of the PDCCH and/or PDSCH addressed to the terminal device 40 in the Fronthaul link is indicated by the DCI including the beam setting information.

In another example, the downlink physical signal/physical channel reception timing in the Fronthaul link may be indicated by DCI different from the DCI including the beam setting information. As a specific example, a slot for reception of PDSCH addressed to the terminal device 40 in the Fronthaul link may be specified by DCI addressed to the terminal device 40. In this case, the repeater device 30 is allowed to decode the PDCCH addressed to the terminal device 40. As another specific example, a slot for reception of PDCCH and PDSCH addressed to the terminal device 40 in the Fronthaul link may be specified by DCI addressed to the repeater device 30.

In another example, the downlink physical signal/physical channel reception timing in the Fronthaul link may be during an application duration where transmission beam setting is applied in the access link.

In another example, the downlink physical signal/physical channel reception timing in the Fronthaul link is timing at which downlink is indicated in the TDD configuration in the Fronthaul link.

(2) Downlink Physical Signal/Physical Channel Transmission Timing in Access Link In one example, the downlink physical signal/physical channel transmission timing in the Fronthaul link may be indicated by the DCI including the beam setting information. For example, a slot for transmission of PDCCH in the access link may be indicated by the DCI including the beam setting information.

In another example, the downlink physical signal/physical channel transmission timing in the access link may be indicated by DCI different from the DCI including the beam setting information. For example, a slot for transmission of PDSCH in the access link may be indicated by DCI addressed to the terminal device 40. In this case, the repeater device 30 is allowed to decode the PDCCH addressed to the terminal device 40.

In another example, the downlink physical signal/physical channel transmission timing in the access link may be during the application duration where transmission beam setting is applied in the access link.

In another example, the downlink physical signal/physical channel transmission timing in the access link may be a downlink resource immediately after timing at which the downlink physical signal/physical channel has been received, of resources indicated as downlink in the TDD configuration in the access link.

In another example, the downlink physical signal/physical channel transmission timing in the access link may be substantially the same as timing of receiving the downlink physical signal/physical channel in the Fronthaul link. For example, a slot for reception of the downlink physical signal/physical channel in the Fronthaul link and a slot for transmission of the downlink physical signal/physical channel in the access link may be the same.

Note that it is preferable not to perform downlink transmission in the access link at timing other than the above timing.

(3) Uplink Physical Signal/Physical Channel Transmission Timing in the Fronthaul Link In one example, the uplink physical signal/physical channel transmission timing in the Fronthaul link may be indicated by the DCI including the beam setting information. For example, a slot for transmission of PUSCH in the Fronthaul link may be indicated by the DCI including the beam setting information.

In another example, the uplink physical signal/physical channel transmission timing in the Fronthaul link may be indicated by DCI different from the DCI including the beam setting information. As a specific example, a slot for transmission of PUSCH from the terminal device 40 in the Fronthaul link may be specified by DCI addressed to the terminal device 40. In this case, the repeater device 30 is allowed to decode the PDCCH addressed to the terminal device 40. As a specific another example, a slot for transmission of PUSCH from the terminal device 40 in the Fronthaul link may be specified by DCI addressed to the repeater device 30.

In another example, the uplink physical signal/physical channel transmission timing in the Fronthaul link may be during an application duration where reception beam setting is applied in the access link.

In another example, the uplink physical signal/physical channel transmission timing in the Fronthaul link may be an uplink resource immediately after timing at which the uplink physical signal/physical channel has been received, of resources indicated as uplink in the TDD configuration in the Fronthaul link.

Note that it is preferable not to perform uplink transmission in the Fronthaul link at timing other than the above timing.

(4) Uplink Physical Signal/Physical Channel Reception Timing in Access Link In one example, the uplink physical signal/physical channel reception timing in the Fronthaul link may be indicated by the DCI including the beam setting information. For example, a slot for reception of PUSCH in the access link may be indicated by the DCI including the beam setting information.

In another example, the uplink physical signal/physical channel reception timing in the access link may be indicated by DCI different from the DCI including the beam setting information. For example, a slot for reception of PUSCH in the access link may be indicated by DCI addressed to the terminal device 40. In this case, the repeater device 30 is allowed to decode the PDCCH addressed to the terminal device 40.

In another example, the uplink physical signal/physical channel reception timing in the access link may be during the application duration where reception beam setting is applied in the access link.

In another example, the uplink physical signal/physical channel reception timing in the access link may be timing at which uplink is indicated in the TDD configuration in the access link.

In another example, the uplink physical signal/physical channel reception timing in the access link may be substantially the same as timing of transmitting the uplink physical signal/physical channel in the Fronthaul link. For example, a slot for transmission of the uplink physical signal/physical channel in the Fronthaul link and a slot for reception of the uplink physical signal/physical channel in the access link may be the same.

<5-7. Priority Handling>

In the Fronthaul link, when transmission of the uplink physical signals/physical channels are requested from a plurality of terminal devices 40 at the same time, it is difficult to transmit all the uplink physical signals/physical channels due to uplink resource collision and the limitation of transmission power. In that case, a high-priority uplink physical signal/physical channel is transmitted. Note that a low-priority uplink physical signal/physical channel may not be transmitted, may be transmitted with a low transmission power, or may be transmitted in another uplink transmission opportunity.

Figure 35:
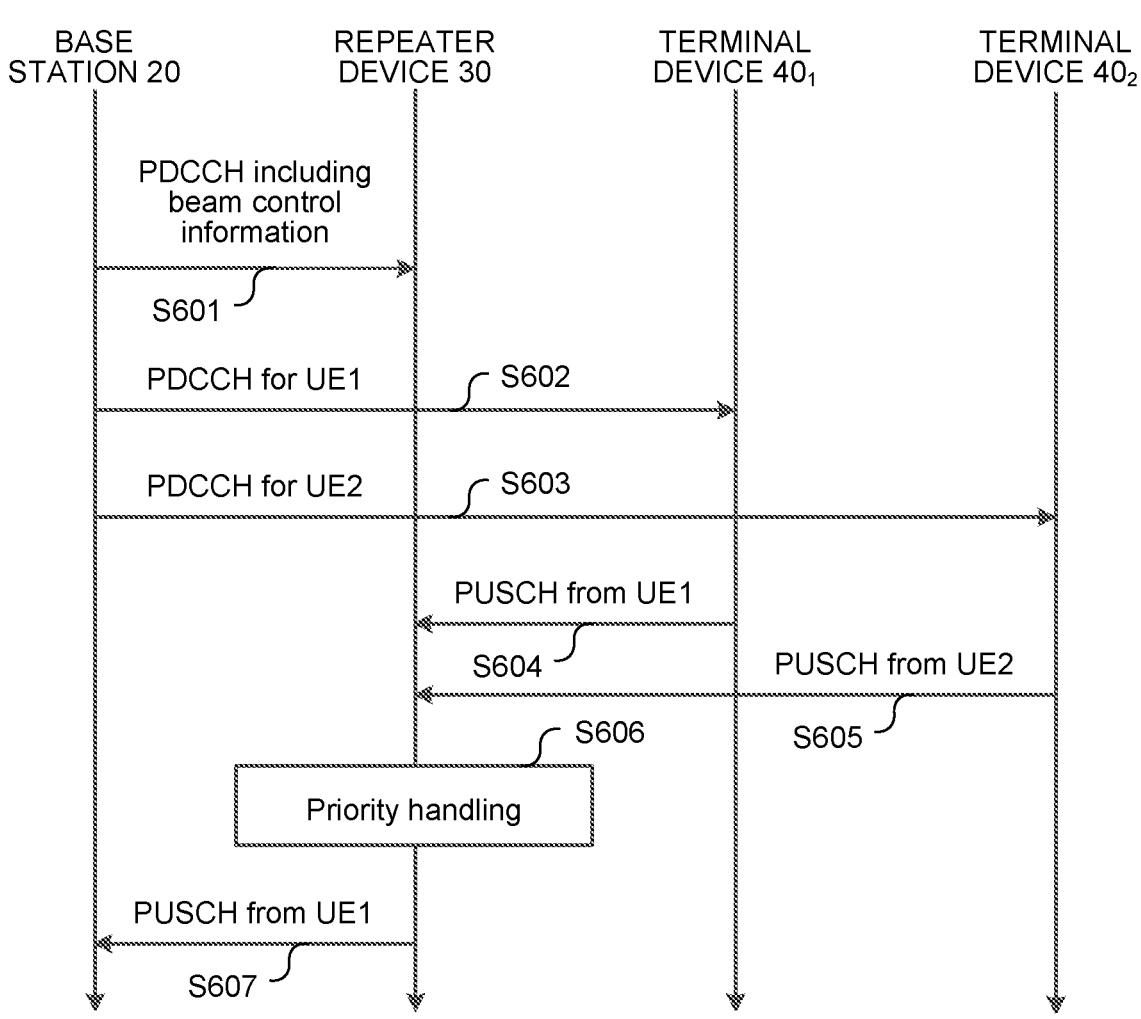
FIG. 35 is a diagram illustrating an example of priority handling in uplink physical signal/physical channel between terminal devices.

FIG. 35 is a diagram illustrating an example of priority handling in uplink physical signal/physical channel between terminal devices 40. In the example of FIG. 35, the terminal device $40_1$ is UE 1, and the terminal device $40_2$ is UE 2. The base station 20 transmits beam control information (beam setting information) to the repeater device 30 (Step S601). Then, the base station 20 transmits PDCCH addressed to the terminal device $40_1$ to the terminal device $40_1$ via the repeater device 30 (Step S602). In addition, the base station 20 transmits PDCCH addressed to the terminal device 4012 to the terminal device $40_2$ via the repeater device 30 (Step S603). Upon receiving the PDCCH, the terminal device $40_1$ transmits PUSCH to the repeater device 30 (Step S604). Furthermore, when receiving the PDCCH, the terminal device $40_2$ transmits PUSCH to the repeater device 30 (Step S605). The repeater device 30 determines whether that it is difficult to transfer the two PUSCHs to the base station 20. When it is difficult to transfer the two PUSCHs to the base station 20, the repeater device 30 performs a priority handling process (Step S606). The repeater device 30 transfers only the PUSCH from the terminal device $40_1$ to the base station 20, on the basis of the priority handling process (Step S607).

An example of an element for determining the priority in the uplink physical signal/physical channel includes the type of physical signal/physical channel. For example, the priority may be set as PRACH>PUCCH>PUSCH>SRS.

Example of the element for determining the priority in the uplink physical signal/physical channel include whether the control information is included and the type of the control information. For example, the priority may be set as PUSCH with UCI>PUSCH without UCI. In addition, the priority may be set as a physical channel with UCI carrying HARQ-ACK>a physical channel with UCI not carrying HARQ-ACK. In addition, the priority may be set as a physical channel with UCI carrying Link Recovery Request (LRR)>a physical channel with UCI not carrying LRR.

An example of the element for determining the priority in the uplink physical signal/physical channel includes the type of the serving cell. For example, the priority may be set as the uplink physical signal/physical channel of a primary cell>uplink physical signal/physical channel of a secondary cell. Furthermore, the priority may be set as the uplink physical signal/physical channel of a serving cell belonging to Master Cell Group (MCG)>the uplink physical signal/physical channel of a serving cell belonging to Secondary Cell Group (SCG).

An example of the element for determining the priority in the uplink physical signal/physical channel includes L1 priority. For example, the priority may be set as PUSCH indicated as high priority by a priority index>PUSCH indicated as low priority by a priority index.

An example of the element of determining the priority in the uplink physical signal/physical channel includes a received order. For example, the priority may be set as previously received physical signal/physical channel>subsequently received physical signal/physical channel.

As an example of the element for determining the priority in the uplink physical signal/physical channel includes Quality of Service (QoS). For example, priority may be set as PUSCH carrying data to which 5QI defined as delay critical Guaranteed Bit Rate (GBR) is mapped>the other PUSCHs.

<5-8. BWP Switching>

BWP (e.g., BWP #0) for receiving DCI including the beam setting information is desirably different from BWP (e.g., BWP #1) for transferring the DCI to the terminal device 40. Specifically, the BWP #0 desirably has a narrower band than that of the BWP #1. In this case, the DCI including the beam setting information includes information (bandwidth part indicator) for switching BWP. Therefore, power consumption required for PDCCH monitoring of the DCI including the beam setting information can be suppressed.

The BWP for the Fronthaul link and the BWP for the access link of the repeater device 30 may be the same or different.

In one example, the repeater device 30 is configured to simultaneously switch the BWP for the Fronthaul link and the BWP for the access link. At this time, the BWP for the Fronthaul link and the BWP for the access link may be changed according to the DCI including the beam setting information.

In another example, the repeater device 30 is configured to independently switch the BWP for the Fronthaul link and the BWP for the access link. At this time, the BWP for the Fronthaul link may be changed according to the DCI including the beam setting information, and the BWP for the access link may be changed according to the DCI of the PDCCH addressed to the terminal device 40.

Figure 36:
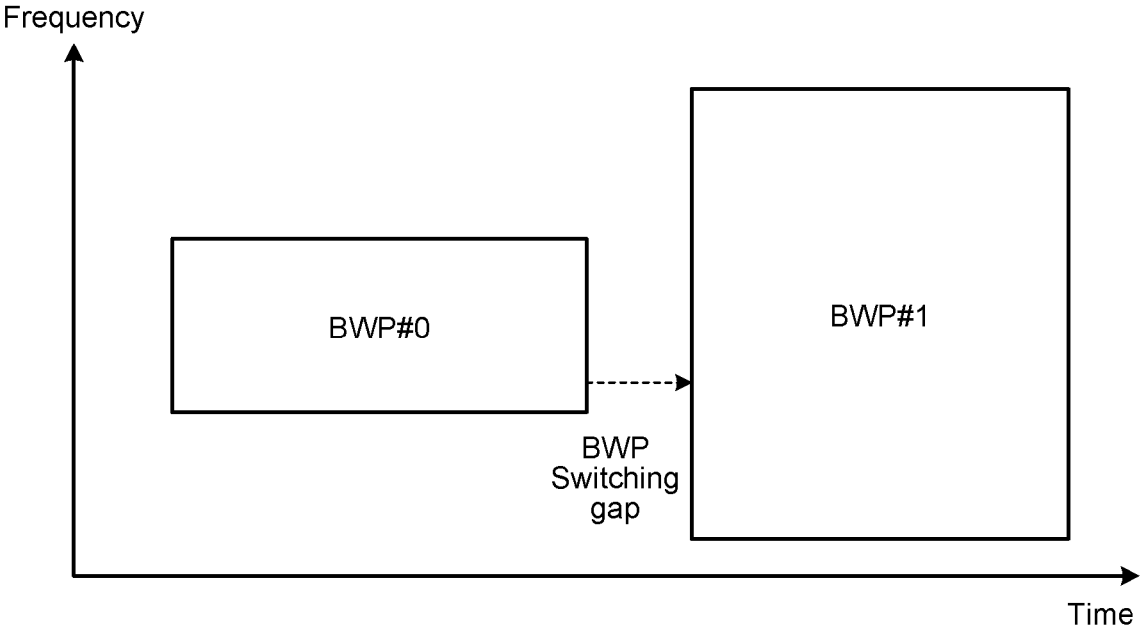
FIG. 36 is a diagram illustrating an example of BWP switching according to DCI including beam setting information in the repeater device.

FIG. 36 is a diagram illustrating an example of bandwidth part (BWP) switching according to the DCI including the beam setting information in the repeater device 30. The repeater device 30 monitors PDCCH of the DCI including the beam setting information in the BWP #0. Then, the repeater device 30 receives the DCI including the beam setting information and information for switching the BWPs. On the basis of the information for switching the BWPs, the repeater device 30 provides a predetermined switching gap, performs switching to a second BWP, and then transfers the physical signal/physical channel addressed to the terminal device 40.

<5-9. Downlink Transmission Power Control>

Furthermore, the base station 20 is configured to control the transmission power in the downstream access link in addition to the access link beam control. The control of the transmission power may be performed by controlling the repeater device 30 by the base station 20 according to the DCI including the beam setting information. For example, the base station 20 specifies transmission power for PDCCH and PDSCH addressed to the terminal device 40 to be transmitted later to the repeater device 30, according to information about downlink transmission power included in the DCI including the beam setting information.

In one example, the information about downlink transmission power may be a value of transmission power in the access link.

In one example, the information about downlink transmission power may be a ratio (signal amplification amount) between reception power in the Fronthaul link and the transmission power in the access link.

In one example, the information about downlink transmission power may be a ratio between transmission power of an access link SSB or CSI-RS and transmission power of DMRSs of an access link PDCCH and PDSCH.

6. Second Embodiment

Next, the communication system 1 according to a second embodiment will be described.

<6-1. Semi-Static Beam Control for Access Link>

In the first embodiment, the access link beam in the repeater device 30 is dynamically controlled, but in the second embodiment, the access link beam is semi-statically controlled. For example, the base station 20 sets beam pattern information for the repeater device 30 by the RRC signaling (System Information Block (SIB) or dedicated RRC signaling), MAC CE, and/or DCI. The repeater device 30 controls the access link beam in the repeater device 30 on the basis of the set beam pattern information. Here, the beam pattern includes a plurality of beams arranged on a time axis, and the beam pattern information is a set of beam information about the plurality of beams. Note that the beam information may be the beam setting information (beam control information) described in the first embodiment. In this case, the beam pattern information may include a plurality of pieces of beam setting information. The base station 20 transmits the beam pattern information for the access link, to the repeater device 30 via the Fronthaul link. The repeater device 30 controls the access link beam, on the basis of the beam pattern information.

This semi-static beam control is preferably applied to a physical channels/physical signals to which resources are periodically allocated. Examples of the physical channels/physical signals to which the resources are periodically allocated include SSB (SS/PBCH block), CSI-RS, PRACH, periodic PUCCH, periodic SRS, Semi-Persistent Scheduling (SPS)-PDSCH, or Configured Grant (CG)-PUSCH, PDCCH, and CORESET.

<6-2. Method of Setting Beam Pattern>

When the beam pattern is set, the beam setting information constituting the beam pattern information is associated with the time resource.

Figure 37:
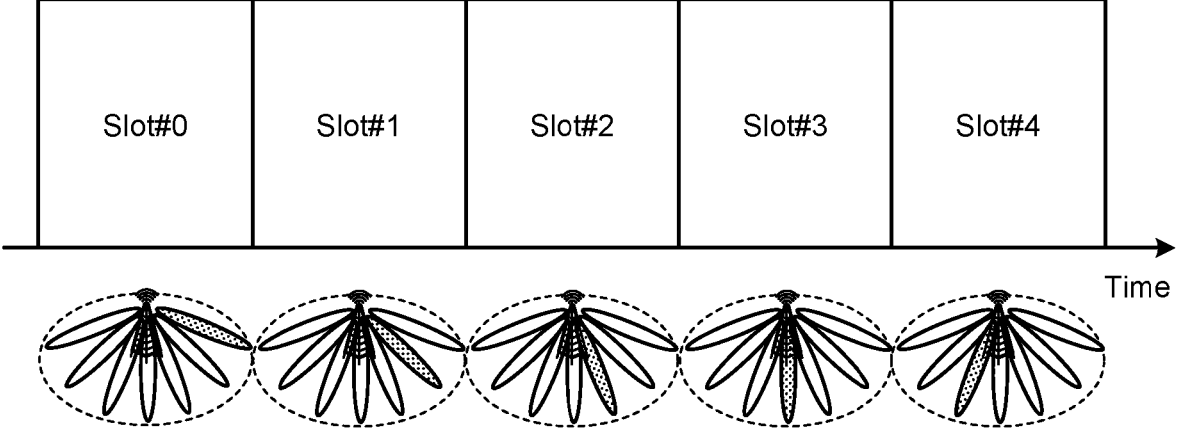
FIG. 37 is a diagram illustrating an example of a relevance between access link beams in a repeater device and slots.

In one example, each piece of beam setting information constituting the beam pattern information is associated with, for example, a slot. FIG. 37 is a diagram illustrating an example of a relevance between access link beams in a repeater device 30 and slots. For example, the beam pattern information includes five pieces of beam setting information. The first beam setting information corresponds to the slot #0, the second beam setting information corresponds to the slot #1, the third beam setting information corresponds to the slot #2, the fourth beam setting information corresponds to the slot #3, and the fifth beam setting information corresponds to slot #4. In each slot, the repeater device 30 applies the transmission beam and/or the reception beam for the access link, on the basis of associated beam setting information. The beam pattern has periodicity, and five pieces of beam setting information are repeatedly applied after slot #5.

Notification means of the beam setting information constituting the beam pattern information includes the RRC signaling (SIB or dedicated RRC signaling), MAC CE, and/or terminal device group common DCI. These notification means may be applied in combination. For example, a set of a plurality of beam patterns may be set in advance by the RRC signaling so that one of the set of the plurality of beam patterns is specified by DCI.

Furthermore, the first embodiment and the second embodiment may be applied in combination. For example, in the repeater device 30, the beam pattern may be semistatically set, and beam setting may be overwritten sometimes by the beam setting information notified of by DCI, at times.

7. Others

Hereinafter, functions and operations applicable to the above embodiments (the first embodiment and the second embodiment) will be described.

<7-1. Default Operation for Access Link Beam Control>

Default setting may be prepared as beam setting for the access link. Here, the default setting is the setting of a default operation for access link beam control. The default operation for the access link beam will be described below.

<7-1-1. Application Scene of Default Setting>

When the current state is brought into a predetermined state, the repeater device 30 applies the default setting. For example, when one or more of the following states occur, the repeater device 30 changes the beam setting for the access link to the default setting.

(1) Case of Fail in Decoding of PDCCH or PDSCH Including Beam Setting Information In a case where decoding of PDCCH or PDSCH including the beam setting information fails, the repeater device 30 applies the default setting. (1) can be applied in a case where the repeater device 30 knows in advance transmission of the PDCCH or PDSCH including the beam setting information. As a specific example of knowing the condition in advance by the repeater device 30, previous notification of transmission of the PDCCH or PDSCH by another PDCCH or PDSCH, or periodic occasions are considered.

(2) Case of Reception of No Beam Setting Information for Predetermined Period or Predetermined Number of Times The repeater device 30 applies the default setting when no beam setting information has been received for a predetermined period or a predetermined number of times. The predetermined duration is determined by, for example, a slot or a radio frame. The predetermined number of times is determined, for example, on the basis of the PDCCH monitoring occasion. A predetermined duration or predetermined number of times may be set by the upper layer.

(3) Case of Expiration of Timer for Application of Beam Setting

The repeater device 30 applies the default setting when the timer (e.g., a beam setting timer or BWP inactive timer) for application of beam setting expires.

(4) Case of Resource Specified by Base Station, which Is Out of Beam Application Section The repeater device 30 applies the default setting, when the resource specified by the base station 20 is a resource outside a beam application section.

<7-1-2. Specific Example of Default Operation>

As the default operation for access link beam control, for example, the following operations can be assumed.

(1) Stop of Transmission and Reception of Access Link

As the default operation, stopping transmission and/or reception of an access link is assumed. Upon application of the default setting, the repeater device 30 stops the transmission of the access link and transfers no downlink physical signal/physical channel. In addition, upon application of the default setting, the repeater device 30 stops reception of the access link and transfers no uplink physical signal/physical channel.

Note that, in a case where the repeater device 30 is Intelligent Surface, the repeater device 30 may perform an operation of reflecting a radio wave in a direction in which interference is not given as the default operation. Specific examples of the reflection direction of the radio wave, not causing the interference, include reflection in the arrival direction, reflection toward the sky or the ground, reflection in a direction set in advance and less likely to cause the interference, and the like. Alternatively, in a case where the repeater device 30 is the Intelligent Surface, the repeater device 30 may perform, as the default operation, an operation of absorbing radio waves so as not to cause interference, an operation of diffusing reflected radio waves by phase control to weaken the reflected radio waves, or an operation of transmitting or absorbing incident radio waves.

(2) Application of Beam Set in Past

The repeater device 30 may perform an operation of applying a beam set in the past, as the default operation. In other words, the repeater device 30 may perform an operation of continuously using the last set access link beam as the default operation.

(3) Application of Beam Pattern Set in Advance

The repeater device 30 may perform, as the default operation, an operation of applying a beam pattern set in advance as a default beam pattern. The default beam pattern may be set when the repeater device 30 is installed, or may be set in an upper layer.

<7-2. How to Transmit HARQ-ACK in Intelligent Surface Including Only Receiver>

In the Intelligent Surface including only a receiver, a beam reflected in a direction of the base station 20 at HARQ-ACK timing is formed, in a case where PDSCH is ACK (or NACK). The base station 20 transmits a predetermined signal to the Intelligent Surface at that timing. When a reflection response to the predetermined signal is received, the base station 20 determines that the PDSCH transmitted to the Intelligent Surface is ACK (or NACK). The predetermined signal is preferably a signal shorter than a propagation delay time.

Alternatively, in the Intelligent Surface including only the receiver, modulation of amplitude, frequency, phase, or polarized wave is performed for the uplink physical signal transmitted from the terminal device 40 to superimpose the information of HARQ-ACK, in a case where the PDSCH is ACK (or NACK).

<7-3. Application to Sidelink>

The first embodiment and the second embodiment are also applicable to beam control in the sidelink between terminal devices 40 by replacing the smart repeater of the first embodiment and the second embodiment with a terminal device 40.

In one specific example, in a communication system in which the terminal device $40_1$ and the terminal device $40_2$ communicate with each other via the sidelink (PC5), the base station 20 can provide the beam setting information for controlling the transmission beam and/or reception beam in the sidelink, to the terminal devices 40, by DCI (DCI format 3_x (x is any integer)). Provision of the beam setting information and setting of the beam setting information can be implemented by using the method described in first embodiment.

The effects obtained in the first embodiment or the second embodiment are obtained in the sidelink as well.

8. Modifications

The embodiments described above are merely examples, and various modifications and applications are possible.

For example, a control device that controls the management device 10, the base station 20, the repeater devices 30, and the terminal device 40 according to the present embodiment may be implemented by a dedicated computer system or a general-purpose computer system.

For example, communication programs for executing the above-described operations are stored in a computer-readable recording medium such as an optical disk, semiconductor memory, magnetic tape, or flexible disk, for distribution. Then, for example, the programs are installed on the computer to perform the processes described above, and the control device is configured. At this time, the control device may be a device (e.g., personal computer) outside the management device 10, base station 20, repeater device 30, and terminal device 40. Furthermore, the control device may be a device (e.g., the control unit 13, control unit 23, the control unit 33, or control unit 43) inside the management device 10, base station 20, repeater device 30, or terminal device 40.

Furthermore, the communication program may be stored in a disk device included in a server device on a network such as the Internet so as to be, for example, downloaded to the computer. Furthermore, the functions described above may be implemented by cooperation between Operating System (OS) and application software. In this configuration, the portion other than the OS may be stored in a medium so as to be distributed, or the portion other than the OS may be stored in the server device so as to be downloaded or the like to the computer.

Furthermore, of the processes described in the above embodiments, all or some of the processes described to be performed automatically may be performed manually, or all or some of processes described to be performed manually may be performed automatically by a known method. In addition, the processing procedures, specific names, and information including various data and parameters, which are described in the above description or illustrated in the drawings, can be appropriately changed unless otherwise specified. For example, various information illustrated in the drawings are not limited to the illustrated information.

Furthermore, the component elements of the devices are illustrated as functional concepts and are not necessarily required to be physically configured as illustrated. In other words, specific forms of distribution or integration of the devices are not limited to those illustrated, and all or some of the devices may be configured by being functionally or physically distributed or integrated in appropriate units, according to various loads or usage conditions. Note that a configuration formed by the distribution or integration may be performed dynamically.

Furthermore, the embodiments described above can be appropriately combined within a range consistent with the contents of the processing. Furthermore, the order of the steps illustrated in the flowchart of the embodiments described above can be changed appropriately.

Furthermore, for example, the present embodiment can be implemented as all configurations constituting a device or a system, such as a processor as a system Large Scale Integration (LSI) or the like, a module using a plurality of processors or the like, a unit using a plurality of modules or the like, and a set (i.e., a configuration of part of the device) obtained by further adding other functions to the unit.

Note that, in the present embodiment, the system means an aggregation of a plurality of component elements (devices, modules (parts), etc.), and it does not matter whether all the component elements are in the same housing. Therefore, a plurality of devices that is housed in separate housings and connected via a network, and one device in which a plurality of modules is housed in one housing are both systems.

Furthermore, for example, the present embodiment can adopt a configuration of cloud computing in which one function is shared between a plurality of devices via a network to perform processing by the plurality of devices in cooperation.

9. Conclusion

As described above, according to an embodiment of the present disclosure, the repeater device 30 is a communication device (e.g., smart repeater) that relays communication between the base station 20 and the terminal device 40. The repeater device 30 receives, from the base station 20, the physical control signal (DCI) that includes information about the beam (i.e., access link beam) used for communication between the repeater device 30 and the terminal device 40 and used for control of the Physical Layer of the repeater device 30. The repeater device 30 controls the beam used for communication between the repeater device 30 and the terminal device 40, on the basis of the beam information. Introduction of the repeater device 30 of the present embodiment improves the performance of communication relay between the base station 20 and the terminal device 40. In addition, the coverage can be inexpensively and readily expanded, and efficient operation of wireless communication can be performed.

Although the embodiments of the present disclosure have been described above, the technical scope of the present disclosure is not limited to the embodiments described above and various modifications can be made without departing from the spirit and scope of the present disclosure. Moreover, the component elements of different embodiments and modifications may be suitably combined with each other.

Furthermore, the effects in the embodiments described herein are merely examples, the present invention is not limited to these effects, and other effects may also be provided.

Note that the present technology can also have the following configurations.

(1)

A communication device, the communication device relaying communication between a base station and a terminal device, the communication device comprising:

a reception unit that receives, from the base station, a physical control signal used to control a physical layer of the communication device, the physical control signal including beam information about a beam used for communication between the communication device and the terminal device; and a communication control unit that controls a beam used for communication between the communication device and the terminal device based on the beam information.

(2)

The communication device according to (1), wherein the beam information includes information about beam setting between the communication device and the terminal device, and the information about beam setting includes at least one of information about a downlink beam being a beam from the communication device to the terminal device and information about an uplink beam being a beam from the terminal device to the communication device.

(3)

The communication device according to (2), wherein the information about a downlink beam is at least one of information about Spatial Transmitter characteristic, and information specifying Transmission Configuration Indication (TCI), an SS/PBCH block index, an NZP CSI-RS resource ID, an antenna port for a downlink reference signal, and a terminal device.

(4)

The communication device according to (2) or (3), wherein the information about an uplink beam is information about Spatial Receiver characteristic and information specifying SRS resource indicator (SRI) or a terminal device.

(5)

The communication device according to any one of (2) to (4), wherein the beam information includes information indicating an application duration where the beam setting is applied, and the communication control unit performs control based on a duration identified based on the information indicating an application duration where the beam setting is applied, and the beam setting.

(6)

The communication device according to (5), wherein the information indicating the application duration where the beam setting is applied includes, as the application duration where the beam setting is applied, information specifying at least any of one or more consecutive slots and one or more consecutive symbols.

(7)

The communication device according to (5), wherein the information indicating the application duration where the beam setting is applied includes, as the duration where beam setting is applied, information specifying a duration where a physical channel including transfer information to the base station or the terminal device is allocated.

(8)

The communication device according to (7), wherein the information indicating the application duration where the beam setting is applied includes information about at least one of a duration where PDCCH and PDSCH to be transferred to the access link are allocated and a duration where PUCCH or PUSCH including HARQ-ACK corresponding to the PDSCH is allocated, the access link being a link between the communication device and the terminal device.

(9)

The communication device according to (7), wherein information indicating the application duration where the beam setting is applied includes information about at least one of a duration where PDCCH to be transferred to the access link is allocated and a duration where PUSCH is allocated.

(10)

The communication device according to any one of (2) to (4), further comprising an identification unit that identifies the application duration where the beam setting is applied, based on at least one of transmission timing of the physical control signal and a parameter, wherein the communication control unit performs control based on the duration identified by the identification unit and the beam setting.

(11)

The communication device according to (10), wherein the identification unit identifies the application duration where the beam setting is applied based on a timer.

(12)

The communication device according to (10), wherein the identification unit identifies the application duration where the beam setting is applied based on the transmission timing of the physical control signal.

(13)

The communication device according to (12), wherein the identification unit identifies, as the application duration where the beam setting is applied, a duration after reception of the physical control signal including the information about the beam setting, or a duration from the time after a predetermined offset duration subsequent to the reception of the physical control signal to the time after reception of the physical control signal including information about the next beam setting, or a duration from reception of the physical control signal to the time after a predetermined offset duration.

(14)

The communication device according to (12), wherein the identification unit identifies, as the application duration where the beam setting is applied, a duration after reception of the physical control signal including the information about the beam setting, or a duration from the time after a predetermined offset duration subsequent to the reception of the physical control signal to a PDCCH monitoring occasion for the physical control signal including information about the next beam setting.

(15)

The communication device according to (12), wherein the identification unit identifies, as the application duration where the beam setting is applied, a duration after reception of the physical control signal including the information about the beam setting, or a duration from the time after a predetermined offset duration subsequent to the reception of the physical control signal to fixed timing.

(16)

The communication device according to any one of (1) to (15), wherein the reception unit receives information about indication of relay timing, and the communication control unit relays information at timing identified based on the information about indication of the relay timing.

(17)

The communication device according to any one of (1) to (16), wherein when transmission of information is requested of the base station from a plurality of the terminal devices at the same timing, the communication control unit transmits information of any of the plurality of the terminal devices in priority to information of another terminal device, according to a predetermined specification.

(18)

The communication device according to any one of (1) to (17), wherein

BWP for receiving the physical control signal including the beam information is different from BWP for transferring the physical control signal to the terminal device;

the physical control signal including the beam information includes information for switching the BWPs; and the communication control unit switches the BWPs based on information for switching the BWPs.

(19)

The communication device according to any one of (1) to (18), wherein the physical control signal including the beam information includes information about downlink transmission power, and the communication control unit controls the downlink transmission power based on the information about the downlink transmission power.

(20)

A communication method performed by a communication device relaying communication between a base station and a terminal device, the method comprising:

receiving, from the base station, a physical control signal used to control a physical layer of the communication device, the physical control signal including beam information about a beam used for communication between the communication device and the terminal device; and controlling a beam used for communication between the communication device and the terminal device based on the beam information.

(21)

A base station comprising:

a transmission unit; and a control unit, wherein the control unit is configured to, via the transmission unit, transmit a physical control signal to a communication device, the physical control signal being used for control of a physical layer of the communication device and including beam information about a beam used for communication between the communication device and the terminal device, the communication device relaying communication between the base station and the terminal device, and perform communication with the terminal device via the communication device, and a beam is controlled based on the beam information, the beam being used for communication between the communication device and the terminal device, in the communication with the terminal device.

(22)

A method performed by a base station comprising:

transmitting a physical control signal to a communication device, the physical control signal being used for control of a physical layer of the communication device and including beam information about a beam used for communication between the communication device and the terminal device, the communication device relaying communication between the base station and the terminal device; and performing communication with the terminal device via the communication device, a beam being controlled based on the beam information, the beam being used for communication between the communication device and the terminal device, in the communication with the terminal device.

REFERENCE SIGNS LIST

1 COMMUNICATION SYSTEM
10 MANAGEMENT DEVICE
20 BASE STATION
30 REPEATER DEVICE
40 TERMINAL DEVICE
11 COMMUNICATION UNIT
21, 31, 41 WIRELESS COMMUNICATION UNIT
12, 22, 32, 42 STORAGE UNIT
13, 23, 33, 43 CONTROL UNIT
211, 311, 411 TRANSMISSION PROCESSING UNIT
212, 312, 412 RECEPTION PROCESSING UNIT
213, 313, 413 ANTENNA
331 RECEPTION UNIT
332 IDENTIFICATION UNIT
333 COMMUNICATION CONTROL UNIT

The invention claimed is:

1. A communication device to relay communication between a base station and a terminal device, the communication device comprising:

a reception unit configured to receive a first physical control signal from the base station, wherein the first physical control signal is to control a physical layer of the communication device, and the first physical control signal includes beam setting information to set a beam for communication between the communication device and the terminal device;

an identification unit configured to identify, as an application duration for application of the beam setting information, a first duration based on a transmission timing of the first physical control signal, wherein the first duration is from a first time to a Physical Downlink Control Channel (PDCCH) monitoring occasion associated with a second physical control signal, the second physical control signal includes beam setting information to set a next beam for the communication between the communication device and the terminal device, and the first time is after a specific offset duration subsequent to the reception of the first physical control signal; and a communication control unit configured to control the beam based on the beam setting information of the first physical control signal and the application duration.

2. The communication device according to claim 1, wherein the beam setting information of the first physical control signal includes at least one of first information associated with a downlink beam or second information associated with an uplink beam, the uplink beam is from the terminal device to the communication device, and the downlink beam is from the communication device to the terminal device.

3. The communication device according to claim 2, wherein the first information includes at least one of information associated with a Spatial Transmitter characteristic of the communication device, or information that specifies at least one of a Transmission Configuration Indication (TCI), a Synchronization Signal (SS)/Physical Broadcast Channel (PBCH) block index, a Non-Zero-Power (NZP) Channel State Information-Reference Signal (CSI-RS) resource ID, an antenna port for a downlink reference signal, or the terminal device.

4. The communication device according to claim 2, wherein the second information includes information associated with a Spatial Receiver characteristic of the communication device, and information that specifies a Sounding Reference Signal (SRS) resource indicator (SRI) or the terminal device.

5. The communication device according to claim 2, wherein the beam setting information of the first physical control signal further includes third information that indicates the application duration, and the identification of the first duration is further based on the third information.

6. The communication device according to claim 5, wherein the third information includes information that specifies at least one of one or more consecutive slots or one or more consecutive symbols.

7. The communication device according to claim 5, wherein the third information includes information that specifies a second duration where a physical channel is allocated, and the physical channel includes at least one of transfer information for the base station or transfer information for the terminal device.

8. The communication device according to claim 7, wherein the second duration includes at least one of a third duration where a PDCCH and a Physical Downlink Shared Channel (PDSCH), which are transferrable to an access link, are allocated, or a fourth duration where a Physical Uplink Control Channel (PUCCH) or a Physical Uplink Shared Channel (PUSCH) is allocated, the PUCCH or the PUSCH includes a Hybrid Automatic Repeat reQuest Acknowledgment (HARQ-ACK) corresponding to the PDSCH, and the access link is between the communication device and the terminal device.

9. The communication device according to claim 7, wherein the second duration includes a third duration where a PDCCH, which is transferrable to the access link, is allocated, and a fourth duration where a Physical Uplink Shared Channel (PUSCH) is allocated.

10. The communication device according to claim 1, wherein the identification unit is further configured to identify the application duration based on a timer.

11. The communication device according to claim 1, wherein the identification unit is further configured to identify, as the application duration, a second duration, the second duration is from the first time to a second time, and the second time is after reception of the second physical control signal.

12. The communication device according to claim 1, wherein the identification unit is further configured to identify, as the application duration, a second duration from the first time.

13. The communication device according to claim 1, wherein the reception unit is further configured to receive information that indicates a relay timing, and the communication control unit is further configured to:

identify a timing based on the received information; and relay information at the identified timing.

14. The communication device according to claim 1, wherein the first physical control signal further includes information associated with a downlink transmission power, and the communication control unit is further configured to control the downlink transmission power based on the information associated with the downlink transmission power.

15. A communication method, the communication method comprising:

in a communication device that relays communication between a base station and a terminal device:

receiving, from the base station, a first physical control signal, wherein the first physical control signal is to control a physical layer of the communication device, and the first physical control signal includes beam setting information to set a beam for communication between the communication device and the terminal device;

identifying, as an application duration for application of the beam setting information, a specific duration based on a transmission timing of the first physical control signal, wherein the specific duration is from a specific time to a Physical Downlink Control Channel (PDCCH) monitoring occasion associated with a second physical control signal, the second physical control signal includes beam setting information to set a next beam for the communication between the communication device and the terminal device, and the specific time is after a specific offset duration subsequent to the reception of the first physical control signal; and controlling the beam based on the beam setting information of the first physical control signal and the application duration.

16. A base station, comprising:

a transmission unit; and a control unit configured to;

transmit, via the transmission unit, a first physical control signal to a communication device, wherein the first physical control signal is for control of a physical layer of the communication device, the first physical control signal includes beam setting information to set a beam for communication between the communication device and a terminal device, the communication device identifies, as an application duration for application of the beam setting information, a specific duration based on a transmission timing of the first physical control signal, the specific duration is from a specific time to a Physical Downlink Control Channel (PDCCH) monitoring occasion associated with a second physical control signal, the second physical control signal includes beam setting information to set a next beam for the communication between the communication device and the terminal device, and the specific time is after a specific offset duration subsequent to the reception of the first physical control signal; and execute communication with the terminal device via the communication device, wherein the execution of the communication with the terminal device is via the transmission unit, and the communication device:

controls the beam based on the beam setting information of the first physical control signal and the application duration, and relays, based on the control of the beam, communication between the base station and the terminal device.

17. A method, comprising:

in a base station:

transmitting a first physical control signal to a communication device, wherein the first physical control signal is for control of a physical layer of the communication device, the first physical control signal includes beam setting information to set a beam for communication between the communication device and a terminal device, the communication device identifies, as an application duration for application of the beam setting information, a specific duration based on a transmission timing of the first physical control signal, the specific duration is from a specific time to a Physical Downlink Control Channel (PDCCH) monitoring occasion associated with a second physical control signal, the second physical control signal includes beam setting information to set a next beam for the communication between the communication device and the terminal device, and the specific time is after a specific offset duration subsequent to the reception of the first physical control signal; and executing communication with the terminal device via the communication device, wherein the communication device:

controls the beam based on the beam setting information of the first physical control signal and the application duration, and relays, based on the control of the beam, communication between the base station and the terminal device.

* * * * *